US006567226B2

(12) United States Patent
Fuse

(10) Patent No.: US 6,567,226 B2
(45) Date of Patent: *May 20, 2003

(54) METHOD FOR DESIGNING A REFRACTIVE OR REFLECTIVE OPTICAL SYSTEM AND METHOD FOR DESIGNING A DIFFRACTION OPTICAL ELEMENT

(75) Inventor: Keiji Fuse, Osaka (JP)

(73) Assignee: Sumitomo Electric Industries, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,587

(22) Filed: Mar. 1, 1999

(65) Prior Publication Data

US 2002/0183994 A1 Dec. 5, 2002

(30) Foreign Application Priority Data

Mar. 3, 1998 (JP) .......................................... 10-069480
Feb. 12, 1999 (JP) .......................................... 11-034012

(51) Int. Cl.[7] ........................... G02B 27/44; G05B 13/00
(52) U.S. Cl. ....................... 359/900; 359/565; 359/566; 700/36
(58) Field of Search ................................ 359/558, 565, 359/566, 569, 573, 900; 700/36

(56) References Cited

U.S. PATENT DOCUMENTS 5,067,067 A    11/1991  Estelle et al. ................. 700/36
5,075,800 A  * 12/1991  Hasman et al. ............... 359/558
5,218,471 A  *  6/1993  Swanson et al. .............. 359/565

FOREIGN PATENT DOCUMENTS

JP    10-21275    1/1998    .......... G06F/17/50
JP    11-223764   8/1999    .......... G02B/13/00

* cited by examiner

*Primary Examiner*—Audrey Chang
(74) *Attorney, Agent, or Firm*—McDermott, Will & Emery

(57) ABSTRACT

In the design of a lens system, lens parameters are determined by minimizing a merit function which is a sum of squares of ray aberrations or wavefront errors at many sampling points. Prior methods often select the parameters which give very narrow tolerances to production errors. The small tolerance increases the difficulty of production. In order to increase the tolerances, states which allot errors $\pm\delta$ to some chosen parameters are considered. Merit functions corresponding the error-allotted states are made. An integrated merit function is produced by adding the error-allotted merit functions to the non-error allotted normal merit function. Parameters are determined by minimizing the integrated merit function. The optimized parameters will give wider tolerances for the error-allotted parameters. DOE (diffraction optical elements) design includes the steps of considering error-allotted states $S_1, S_2, \ldots$ in addition to a non-error state $S_0$, making merit functions $E_1, E_2, \ldots$ for $S_1, S_2, \ldots$ besides $E_0$ for $S_0$, defining an integrated merit function $E = \Sigma w_k E_k$ by multiplying the merit function with weights and summing up, minimizing the integrated merit function and determining optimum variables for the DOE.

7 Claims, 32 Drawing Sheets

Lens design aspherical lens

3 Rings  R= 0.3357, 0.7071, 0.9420
6 Arms   =0, 60, 120, 180, 240, 300degrees

● w=0.048481  12spots

⊙ w=0.07757   6spots

Fig.20
16degrees    8degrees    0degree
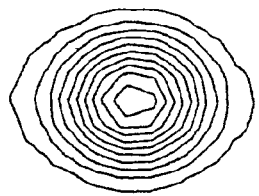 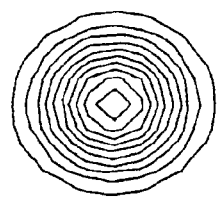 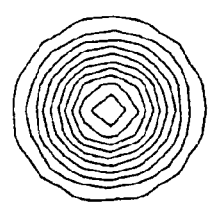
Fig.21
16degrees    8degrees    0degree
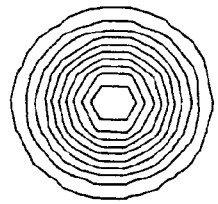 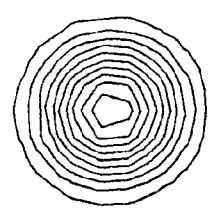 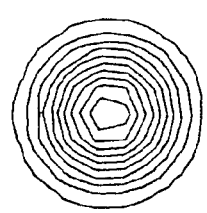

Fig.22
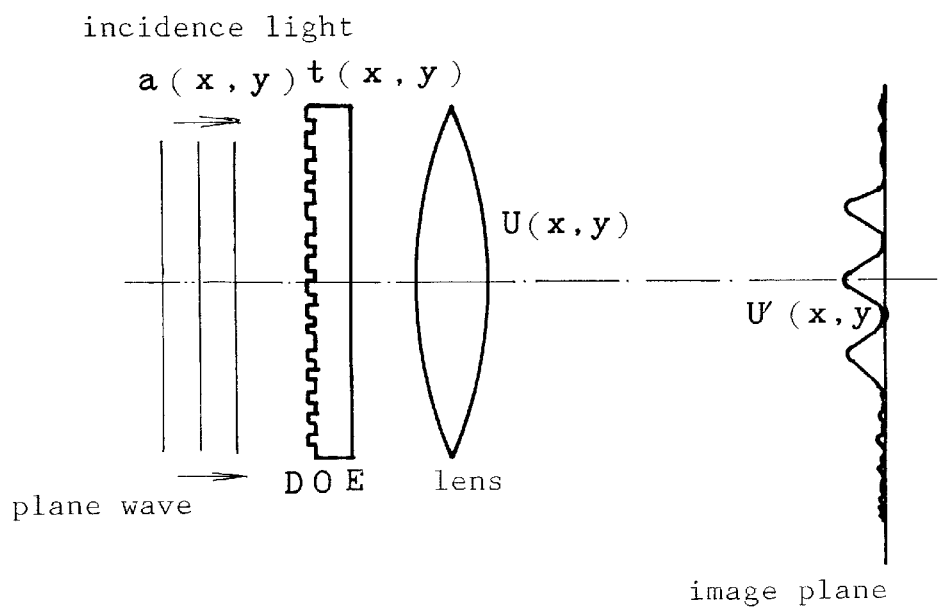
Fig.23
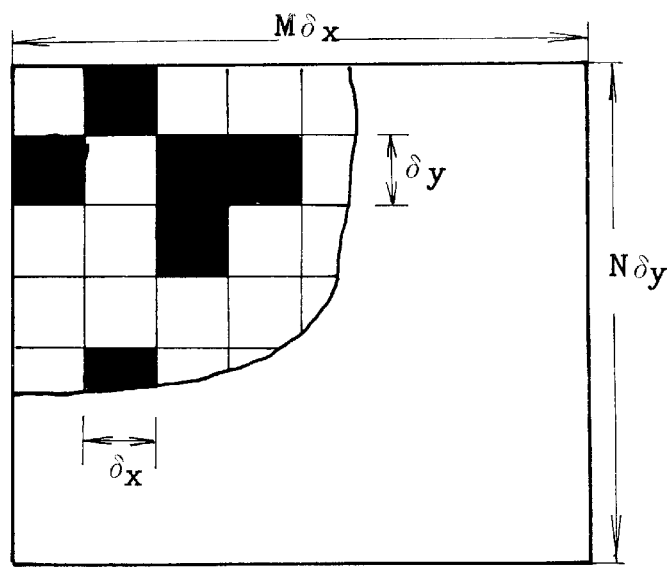
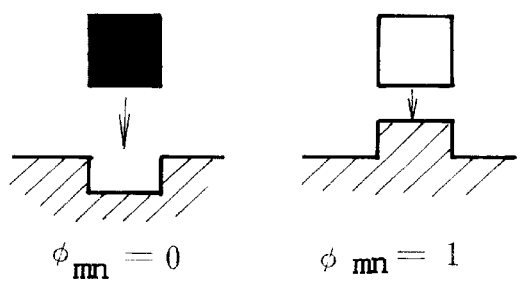

quadruple phase steps errors binary phase steps errors (non-allotting error)
unit pattern Embodiment 1 (allotting ±10% step height errors)

unit pattern

Embodiment 1 (allotting ±10% step height errors)

Embodiment 2 (allotting 5%, 10% step height fluctuation errors)

unit pattern

Embodiment 2 (allotting 5%, 10% step height fluctuation errors)

Embodiment 2 (allotting 5%, 10% step height fluctuation errors)

METHOD FOR DESIGNING A REFRACTIVE OR REFLECTIVE OPTICAL SYSTEM AND METHOD FOR DESIGNING A DIFFRACTION OPTICAL ELEMENT

BACKGROUND OF THE INVENTION

1. Field of the Invention

This invention relates to a method of designing a lens system or an optical system. Further, this invention relates to a design of diffractive optical elements.

2. Introduction

Design of a lens requires setting up equations defining the relations among optical parameters of the lens, solving the equations and obtaining solutions for determining the parameters. In many cases, the set of equations cannot be solved exactly, because some equations are non-linear or too complicated. The set of equations often leads to a plurality of solutions which contain errors. When the equations are solved, the solution must be estimated by some method, whether or not the solution is valid. A "merit function(or cost function)" is sometimes adopted for estimating the validity of the solution. The merit function is defined as a sum of squares of some errors, for example, a sum of position errors or wavefront errors at points in an imaging region. These errors, termed "aberration errors", appear only in calculation. If aberration errors at individual points are smaller, the merit function is also smaller. Then, a smaller merit function means smaller errors in the solution as a whole. If the merit function is the smallest, the aberration errors should be the smallest. The parameters of lens assemblies or optics are designed by the merit function yielding the minimum value. The function can estimate the validity of the solution as designed parameters. The solutions yielding the merit function of minimum value should realize the most suitable parameters.

In addition to the aberration errors of the solution on the optical equations, production errors appear when the lens assemblies or optical parts are actually manufactured. Production errors hinder the manufacturer from making a lens or optical part having the exact parameters just given by the solution. A production error is defined to be a difference between the designed (calculated) value and the actual value of the product. For simplicity, the word "lens" is used to express both a "lens" and an "optical part" hereafter. A large production error degrades the produced lens and sometimes segregates the produced lens into a classification of inferior goods. Allowable scope of manufacturing errors is beforehand determined for satisfying the requisites for the lens. The maximum of an allowable production error is called "tolerance". A large tolerance facilitates production; it is easier to manufacture a lens which is defined by parameters with bigger tolerances. A small tolerance imposes a heavy burden on the manufacturer; it is difficult to make a lens having designed parameters with small tolerances. Thus, tolerance is a measure of ease of production.

A solution gives a set of optimum values and tolerances of the parameters. Although a solution gives excellent performance to the lens having the exact parameters which are equal to the solution values, the solution is not necessarily the best solution. If the parameter tolerances of the solution are small, it is difficult to make lens having errors of parameters within tolerance. The performance of the lens which has parameters equal to the designed values is called the "best performance" for the solution. Even if a solution has an excellent and best performance, the solution is not an optimum solution if tolerances are narrow. People believe that the best solution is a solution which gives the highest performance to the product, but this is not necessarily true. If tolerances are small, production is difficult, even though the solution gives the best performance. The best solution is not the solution giving the best performance but should be the solution which gives "wide tolerances" as well as "best performance". Wide tolerance is more important than best performance. A purpose of the present invention is to provide a method of designing lens assemblies or optical parts which gives parameters large tolerances for facilitating production.

Words are clarified by defining the exact meanings. There are various parameters which define lenses or optical parts. The parameters can be classified by two standpoints. One standpoint is classification into the parameters which are treated as variables in calculation seeking optimum designs for lenses and into the parameters which are treated as constant values in the same calculation. In the case of designing an optical system having a plurality of lenses, variable parameters are, e.g., the thicknesses of lenses, the curvatures of both surfaces of the lenses, and the distances between the lenses for which calculation is done for seeking optimum values which satisfy the required conditions. Other parameters are treated as constants keeping predetermined values in the calculation. For example, constant parameters are the distance between the light source and the lens, the thickness and the curvature (=0) of a window, the shape of some lenses and the distance between selected lenses. The physical constants, for instance, refractive index of lenses or dispersion are treated as constant parameters in the calculation, since they are previously determined by the materials of the lenses. The number of lenses is also a constant parameter, when the number is preliminary determined. The predetermined requirements assign some parameters either to variable parameters or constant parameters. Thus the number of lenses or the material of lenses can be a variable parameter in other case which allows the material and the number to change. Thus, the distinction between variable parameters and constant parameters is the first standpoint of classification.

The other classification of parameters is the parameters to which allocated-errors are given and the parameters to which allocated-errors are not given. The "allocated-error" is not a known concept but is a quite novel concept. The allocated-errors play a central role in the present invention. The classification of parameters by the allocated-error is a key idea of the invention. Above explanation of parameters clarifies the first classification into variable parameters and constant parameters and the second classification into error-allocated parameters and non-error-allocated error parameters. Another important distinction relates to the kinds of errors. There are three errors for a parameter: the first one is an aberration-error, the second is a production error, and the third an allocated-error.

All the parameters have production errors which are the deviations of parameters of the product from the parameters given by the solution. Production errors accompany both variable parameters and constant parameters. A solution gives optimum values for variable parameters, for instance, thicknesses of lenses, curvatures of surfaces and distances between lenses. When a manufacturer produces an optical part, the variable parameters deviate from the designed values. The deviations are the production errors of variable parameters.

Constant parameters which are preliminary determined are also suffering from production errors. Thus, there are extra parameters which exclusively denote production errors themselves. Wedge, decenter, tilt, surface irregularity, and refractive index non-uniformity(inhomogeneity) are the words signifying production errors which should be 0 in an ideal product. Design of lenses premises that the errors are 0. Then, these parameters can be named error parameters. Error parameters are defined as differences between constant parameters and the actual values of a product. Error parameters accompany not variable parameters but constant parameters. Wedge denotes an inclination between a front surface and a rear surface of a lens. Decenter means a vertical difference between central axes of lenses. Tilt is an inclination of a lens to a plane perpendicular to the axis. Surface irregularity is a deviation of a product surface from a designed surface. Non-uniformity of refractive index denotes the spatial fluctuation of refractive index of a lens. This invention intends optimization processing by selecting parameters suffering from large production errors among all parameters and positively giving errors to the selected parameters. One feature of the invention is positively to allot errors to parameters. The parameters to which errors are allotted are called error-allocated parameters. The error-allocated parameters can be either the variable parameters which are treated as variables in calculation or the constant parameters which are treated as constants. Further the error parameters, e.g., wedge, decenter, tilt and so on can be the parameters to which errors are assigned. Namely, all three kinds of parameters, i.e., variable parameters, constant parameters and error parameters, can be candidates of error-allocated parameters.

If a parameter P is allocated with errors $\pm\delta$, the parameter comes to have three values, $P-\delta$, P and $P+\delta$. Namely, the parameter has the maximum value $P+\delta$ and the minimum value $P-\delta$ as well as the middle value P. Such an allotment of errors is common both to the constant parameters and the variable parameters. In the case of a variable parameter, when the optimum processing calculations change the value of the parameter, the errors $\pm\delta$ will be allocated to a new value P'. Then the parameters are $P'-\delta$, P' and $P'+\delta$. When thickness of a lens is a variable parameter which should be allocated with errors $\pm 0.5$ mm and the thickness happens to be 10 mm in calculation, the thickness should be treated as a parameter having three values 10 mm, 9.5 mm and 10.5 mm. When the thickness is changed from 10 mm to 11 mm in the series of calculations, the thickness will have the three values of 10.5 mm, 11 mm and 11.5 mm by allotting $\pm 0.5$ mm errors. Parameters can be classified into four categories with regard to allocation of errors, as follows:

1. error-allocated variable parameter
2. error-allocated constant parameter
3. non-error-allocated variable parameter
4. non-error-allocated constant parameter Optical elements mean optical devices which refract, allow to pass, absorb, converge, reflect, diffuse or diffract light beams. The word "diffractive" is a contrary concept of "refractive". Refraction denotes bending of light beams by a difference of refractive indices between air and transparent media (lenses or prisms). In refraction, Snell's law determines the bending angles of beams at interfaces between air and lenses or prisms. Since all the beams are considered to be refracted by the transparent media individually, the refraction can fully be treated by geometric optics. Geometric optics treats individual beams as making their own different ways in media and progressing along straight lines in homogeneous media. In refraction, it is possible to trace individual light beams. Tracing of individual beams enables the geometric optics to calculate modes of convergence or divergence of the beams. Geometric optics does not treat light beams as waves but treats light beams as an assembly of rays for considering refraction. Geometric optics further does not take phases of waves into account. Sometimes reflection is opposed to refraction. However, the refractive index also rules reflection. Thus, reflection is not a contrary concept to refraction. The geometric optics can handle modes of convergence in a reflection telescope.

On the contrary, a diffractive optical element (DOE) is a new optical device for accomplishing some functions by utilizing diffraction phenomena of light. Light is not an assembly of rays but an assembly of waves. Light should be considered as a packet of waves with phases. Geometric optics is in vain for diffraction. Instead, wave optics can treat diffraction phenomena. The concept of rays is of no use. Diffraction forces us to consider light not as progressing beams but as oscillating waves having continual wavefronts. A diffraction grating is a well-known device making use of diffraction.

There are both a reflection type and a penetrating (transparent) type of diffraction grating. A diffraction grating has many parallel grooves formed with a common period on a substrate. The diffraction grating disperses white light into various colors in different directions like a prism. Diffraction gratings, useful in spectroscopy, can divide monochromatic light into the 0-th order diffraction, the plus and minus first order diffraction, the plus and minus second order diffraction and so on. Bragg's condition $d \sin \theta = m\lambda$ determines the mode of diffraction, where d is the period of grooves, $\lambda$ is the wavelength of the monochromatic light, m is the order of diffraction and $\theta$ is the direction of the diffracted light. Diffracted light accompanies all the directions $\theta$ defined by Bragg's condition. But an increase of the diffraction order m rapidly decreases the intensity of diffracted light. The conventional diffraction grating has only a function of separating a monochromatic plane wave into an indefinite number of parallel rays which differ in angle vertical to the direction of grooves. When the direction of propagation is the z-direction and the direction of grooves is the y-direction, diffraction makes y-parallel lines which disperse in the x-direction on an image plane. The diffraction grating is two-dimensional and symmetric in the function, since periodical, parallel grooves induce diffraction according to the symmetric Bragg's condition. The conventional diffraction gratings have only restricted effects since the equivalent grooves have been dug at equal intervals on a substrate uniformly. The conventional diffraction gratings are impotent for controlling of high freedom.

Diffractive optical elements (DOEs) are new devices having a wide and rich scope of functions in advance of the classical diffraction gratings. DOEs are sometimes called holographic optical elements. Instead of parallel grooves, a DOE has two-dimensionally distributed protrusions or cavities which are made on many unit cells defined on the element surface. One purpose for DOEs is the production of equi-parted, equivalent K convergence spots (1×K) on the image plane. Other purposes are (1) the production of equi-parted, equivalent K×L converging spots in K lines by L columns on the image plane, (2) the production of arbitrarily-parted, equivalent K×L converging spots on the image plane, and (3) the yield of some character as an assembly of converging spots on the image plane. In any case, the diffractive optical element (DOE) can directly divide the light power from a single light source into many light beams at most.

The formation of a single clear image having a single converging point is the purpose of refractive type and reflective type optical elements, that is, lenses or mirrors. The diffractive optical elements make a plurality of convergences and pay little attention to the formation of images. Then, DOEs would have many utilities different from the refractive or reflective optical elements.

A $CO_2$ laser emits strong infrared coherent light of 10.6 $\mu$m. $CO_2$ lasers have widely been used for welding, cutting and annealing of metals. A novel, promising use of the $CO_2$ laser will be the drilling of many narrow holes (about 100 $\mu$m diameter) on a printed circuit board. Circuit board hole perforation is at present done by mechanical drilling in which a narrow needle is rotated. Another apparatus of perforating holes on a circuit board is a combination of a $CO_2$ laser, a galvanometer oscillating a small mirror for deflecting reflected light beams and a special f-θ lens converging the oscillating beam on spots of the circuit board. An ordinary lens converges θ-slanting beams at a spot distanced by f tan θ from the center on the image plane. On the contrary, the f-θ lens converges θ-slanting beams at a point distanced by θ from the center on the image plane. Swaying the galvano-mirror at angles of 0, ±θ, ±2θ, ±3θ . . . perforates many small holes distributed in a line with a definite interval on the circuit board. The utilization of two galvanomirrors enable the laser drilling machine to perforate holes at arbitrary spots by scanning the beams two-dimensionally.

The holes are individually bored one by one by the single laser beam. However, the laser-galvanometer-f-θ-lens apparatus can bore holes on circuit boards at higher efficiency, than mechanical drilling, since the galvanometer oscillates the mirror at a higher speed than the drilling tool. Optical boring would be less expensive than mechanical boring. However, the inertia on the galvano-mirror restricts the upper limit of the oscillation of the galvanometer. Besides, it is still difficult to produce a f-θ lens with high accuracy.

Then, the Inventor hit upon an idea of the use of diffractive optical elements for boring holes on a printed circuit board at one time instead of mechanical drilling and laser-galvanometer boring. Diffractive optical elements would be able to bore all the necessary holes of K×1 at a stroke which are bored by a single sway of the galvano-mirror. Furthermore, the DOE may be able to perforate a two-dimensional array of holes at a once without movement of parts. If a DOE could divide a laser light into partial K×L beams, the divided partial beams would bore K×L holes on a print circuit board at one time. The DOE simultaneous perforation will dispense with the galvanometer and the f-θ lens.

This application claims the priority of Japanese Patent Applications No. 10-69480(69480/1998) filed Mar. 3, 1998 and No.11-34012(34012/1999) filed Feb. 12, 1999 which are incorporated herein by reference.

DESCRIPTION OF RELATED ART

FIG. 1 shows a scheme of designing an optical part containing lenses. The first step of designing of an optical part is the determination of initial values (starting values) of the lens material (refractive index, dispersion, absorption coefficient), the number of lenses, surface shape (sphere or asphere), relative disposition (lens-lens distance, lens-image distance) and the determination of variable parameters. Namely, parameters are divided into constant parameters and variable parameters at the first step. This is the fundamental structure setting. Besides the parameters assigned with initial values, there are some additional conditions, e.g., the wavelength of the light source, the thickness of the lens, the material, the full size of the part and so on. Optical equations including the parameters should be set up from the relation of the refraction of beams on surfaces of lenses by taking account of the requirements. Then, the equations should be solved, and the solution is a set of candidate parameters, e.g., lens thicknesses, curvatures, aspherical coefficients, distances. A set of candidate parameters can define an optical part. The solution contains a set of candidate parameters which enables a designer to define a candidate optical part.

In some cases, the optical equations are too abstract to determine a unique solution. Although the requirements settle extra equations, the number of equations is still less than the number of the variable parameters in many cases. A single, unique solution cannot be obtained due to the unsufficient number of equations. The equations are often non-linear. In the case of adopting aspherical surface lens assemblies, the surface itself has too many parameters for defining the surface profile. Owing to too many parameters, the set of equations cannot be analytically solved. In these cases, equations are forcibly solved by employing various approximation methods or ray tracing method which yield a plurality of candidate solutions. There are often an indefinite number of approximation solutions which satisfy the equations defining the refraction or reflection on the surfaces of lens assemblies or mirrors. It is a rare case that an initially-attained solution yields a set of optimum parameters. Since the set of optical equations allows many solutions, the designer should determine the most suitable solution from the many candidate solutions which satisfy the equations approximately.

The validity of solutions is examined by a "merit function". A merit function is defined as a sum of squares of errors. Lower errors decrease the merit function. The lower the errors are, the higher the performance is. Thus, the merit function is a measure of estimating the performance of the product which has the parameters the solution gives. Furthermore, minimizing the merit function can determine the suitable parameters. The merit function is a sum of squares of optical errors (aberration) multiplied by some weights at several points. Of course, there are many kinds of optical errors (aberration). The merit function is defined by adopting some pertinent kinds of errors. For example, the merit function for a lens assembly employs the aberration of wavefronts or the ray aberration which is the deviation of rays from a focus on an imaging plane. The merit function chooses a suitable aberration as the errors at estimation points in accordance with this purpose.

FIG. 2 shows an ideal set of wavefronts made by a lens which converges a plane wave at a focal point. The wavefronts are parallel planes in an ideal plane wave. When an ideal lens converges the plane wave, the wavefronts come to a spherical wave having concentric sphere wavefronts. However, when an actual wave is converged by a lens, the wavefronts often deviate from the ideal spheres. FIG. 3 denotes the deviation of wavefronts. An arc is an ideal wavefront made by an ideal lens from an ideal plane wave. A wavy curve denotes an actual wavefront produced by an actual lens having some aberration. The wavefronts are different for the ideal lens (arc) and the actual lens (wavy curve). The wavefront aberration is the difference between an ideal wavefront and an actual wavefront. The wavefront aberration deforms an image made by a lens at the focal point. An image which should be a circle is deformed into non-circle. The spot diameter at the focus is wider than that of the ideal image. The deviation of an image from a circle is one kind of error. The deviation of the spot diameter is another kind of error. Other kinds of errors can be defined for deviations of physical parameters. Any selection of the kinds of errors can construct a merit function.

Calculation of the equations makes a plurality of candidate solutions. A solution determines a set of the values of parameters that enable the designer to calculate the actual values of the errors. The values of the errors yield the merit function an actual value that is a measure of the validity of the solution. Merit functions are calculated for a plurality of solutions. The optimum design is given by the solution which has the minimum merit function among the solutions called an optimizing calculation. The parameters given by the optimum solution are named optimum parameters. For example, aberration coefficients $s_j$ are assumed for signifying some aberration s at point j. And $s_{j0}$ is an ideal coefficient of $s_j$, with weight denoted by $w_j$. A merit function, expressed as $\Phi=\Sigma w_j(s_j-s_{j0})^2$, is defined as a sum of squares of the errors and is minimized for seeking the optimum solution. Calculating errors from a solution, summing squares of the errors, minimizing the sum and estimating the solution are the inherent, conventional role of a merit function.

However, the merit function can be used in another manner. Unlike the conventional method, the processing starts from the merit function. Instead of starting the equations, calculation begins on the merit function. An approximation method assumes a form of a merit function, gives initial values of optical parameters (refractive index, thickness, curvature, aspherical coefficient), calculates the merit function, changes the values of parameters in the direction of reducing the merit function and attains the least merit function. Without solving the equations, an assumption of initial values of the parameters enables the designer to take the ray tracing method and calculate the ray aberration or the wavefront aberration. The assumed initial values give the wavefront aberration and the ray aberration, from which the merit function can be calculated. Instead of solving the equations, a candidate answer is assumed from the beginning. The ray tracing method is carried out on the assumed parameters. By tracing all the relevant rays, the wavefronts and the spots on an imaging plane are calculated. Then, the wavefront aberration and the ray aberration can be obtained and the merit function is calculated. The result is an estimation of the assumed solution. Many candidate answers (solutions) can be produced by adding small increments to the parameters of the initial solution. A plurality of the candidate solutions are assumed one by one and estimated by calculating the merit functions of the candidates and by comparing the values of the merit functions.

Comparison of the values of the merit function clarifies the set of parameters minimizing the merit function. This is the optimizing calculation. The optimum solution enables the designer to trace the rays, to calculate the wavefronts and to simulate the optical properties of the designed lens. Besides, the degeneration of performance is investigated by giving the parameters tentative errors from the optimized values positively. An increase of tentative errors reduces the performance in general. The fall in performance is small for small errors. Large errors reduce the performance to a great extent. The scope of an allowable fall is determined by considering the performance.

An error which degrades the performance within the allowable level is ignored. But an error which abases the performance beyond the allowable level should be forbidden. The error which degenerates the performance just to the allowable level is the maximum allowable error, called a tolerance. One parameter has one tolerance. All tolerances are calculated for all parameters as the errors which reduce the performance just to the allowable level. This is the tolerancing(tolerance analysis). The fundamental structure setting, the optimizing calculation, simulation and tolerancing build the optical design in FIG. 1.

Sample lens assembly or optical parts are actually produced tentatively from the result of the optical design. The sample has all the parameters based upon the solution obtained by the optical design. The production of samples is the trial production (prototyping). The actual samples are estimated from the standpoint of actual performance, production cost and production feasibility. This is the trial production estimation. The former merit function has estimated the optical parts by taking only the performance into account, ignoring the cost and feasibility of production. Thus, the trial production estimation is indispensable. The performance, the cost and the feasibility are the three criteria in the trial production estimation.

When the result of the trial production estimation is satisfactory, the lens design finishes successfully. The parameters determined by the design should be employed in actual mass production. If the result of the trial production estimation is unsatisfactory, the design should return to the first step of the fundamental structure setting of the optical design in FIG. 1. Then the same steps should be repeated from the fundamental structure setting. Namely, another candidate solution is tentatively made by assuming another set of initial parameters. The optical design process repeats the optimizing calculation and the simulation. Then the trial production estimation follows the simulation. If the result is unsatisfactory, the same processes should be further repeated. Similar processes including the optical design and the trial production estimation should be repeated until the trial products satisfy the required performance.

It takes a long time to carry out even a series of the optical design and the trial production estimation. Furthermore, repetitions of similar processing consume much time which is a product of the one-cycle time multiplied by the number of repetitions. Then, when the number of repetitions is large, development expense rises enormously and development time increases, which are not desirable. A new way to find optimum solutions faster is desired.

Instead of geometric optics, wave optics gives a clue of designing diffractive optical elements (DOEs). The conventional design of DOEs is now outlined. A diffractive optical element (DOE) produces a desired pattern on an image plane from monochromatic laser light by phase modulating the monochromatic light by a fine stepped pattern on the surface of the element. In the case of refractive or reflective optical elements, that is, lenses or mirrors, beams are traced by geometric optics which deems light as an assembly of rays. Instead, DOEs are designed by Fourier optics analysis based upon diffraction theory. A fundamental optical system including a DOE is shown by FIG. 22. A plane wave goes into and passes a diffractive optical element (DOE). The DOE phase modulates the plane wave. The phase-modulated wave is converged by a convergence lens and imports an image pattern on an image plane. A three-dimensional coordinate is defined on the diffraction system, where the propagating direction is determined to be the z-direction. The planes vertical to the z-direction are xy-planes. The surfaces of the DOE and the image plane are in xy-planes. A laser (not shown in FIG. 22) emits a monochromatic plane wave $\exp(jkz)$, where k is a wavenumber($k=2\pi/\lambda$). In fact, the actual light emitted by a laser is not a rigorous plane wave but some distribution in xy-plane. Thus, the amplitude of the incident light at a point (x,y) on the element is now denoted by a(x,y). Thus, the laser light is expressed by $a(x,y)\exp(jkz)$. Since the DOE is an element for inducing diffraction, monochromaticity is important. Laser light is pertinent as the light source due to the excellent monochromaticity. However, it is also possible to analyse the non-monochromatic light, because the diffraction on the image plane can simply be produced by superimposing the images for different wavelengths.

Here, the light source is a $CO_2$ laser which makes monochromatic light of 10.6 μm. The complex amplitude transmittance of the DOE is denoted by t(x,y). When a unit intensity 1 of light enters a front surface point (x,y) of the DOE, light of amplitude transmittance t(x,y) goes out from a rear surface point (x,y). The "amplitude transmittance" means that t(x,y) includes phase in addition to intensity. The complex amplitude transparency t(x,y) can be expressed simply by expand). Here, "d" is the thickness of the DOE at point (x,y) and "n" is the complex refractive index of the DOE. The complex amplitude of the light at the back of the DOE is given by a(x,y)t(x,y). A converging lens follows the DOE for making a clear image at an image plane. The DOE and the lens modulate the laser light a(x,y) into a complex amplitude U(x,y) at the rear surface of the lens. U(x,y) shall be a product of a(x,y), t(x,y) and a lens factor.

$$U(x,y)=a(x,y)t(x,y)\exp\{-jk(x^2+y^2)/2f\} \quad (1)$$

Here, it is assumed that the lens has a sufficiently wide aperture and is free from aberration. Apparently, Eq. (1) does not include the refractive index of the lens. The refractive index of the lens is not insignificant. The refractive index of the lens is implied in the focal length f. P(x,y) is an arbitrary point on a lens middle plane, O is the center of the lens and F is the focal point on the image plane. The partial waves passing any points in the lens have all the same phase at the focus F, because F is the focal point. The phase difference between partial waves passing O and passing P originates from the path difference between PF and OF. The path difference (PF-OF) is $(x^2+y^2+f^2)^{1/2}-f$, since $PF=(x^2+y^2+f^2)^{1/2}$ and OF=f. Approximately, the difference is $(x^2+y^2)/2f$. Phase difference is a product of the path length and the wave number k. Since this consideration is retrospective in time, a minus sign "–" should be attached. The last term of Eq. (1) means the phase change due to the phase delay of the partial wave which passes the lens at point P. U(x,y) is the complex amplitude just at the rear surface of the lens. The image plane is distanced by f from the lens, where "f" is the focal length of the lens. W(X,Y) is the complex amplitude on the image plane. Two different coordinates shall be discriminated. The coordinates (x,y) in small letters mean the positions on the lens. The coordinates (X,Y) in capital letters mean the positions on the image plane. The distance between a lens point (x,y) and an image point (X,Y) is $\{(X-x)^2+(Y-y)^2+f^2\}^{1/2}$. The path difference Δ between the arbitrary partial wave and the axial partial wave OF is $\Delta=\{(X-x)^2+(Y-y)^2+f^2\}^{1/2}-f$. Approximately, $\Delta=\{(X-x)^2+(Y-y)^2+f^2\}/2f$. Multiplying Δ by k gives the phase difference $k\Delta=k\{(X-x)^2+(Y-y)^2\}/2f$. The change of amplitude is exp(jkΔ). The complex amplitude W(X, Y) on the image plane is a sum of infinitesimal contributions U(x, y)exp(jkΔ) dxdy from lens point (x, y). W(X, Y) can be obtained by integrating U(x, y)exp(jkΔ)dxdy on the lens surface.

Substitution of Eq. (1) for U(x,y) of Eq. (2) brings about W(X,Y), $$W(X,Y) = \exp\left\{\frac{jk(X^2+Y^2)}{2f}\right\}\int\int a(x,y)t(x,y)\exp\left\{\frac{-jk(xX+yY)}{f}\right\}dxdy. \quad (3)$$

Eq. (3) includes double integration by x and y on the lens surface. Two functions of u and v are introduced for simplifying the expression of W(X,Y). A(u,v) is a Fourier transformation of a(x,y). T(u,v) is a Fourier transformation of t(x,y). Namely, $$T(u,v)=\int\int t(x,y)\exp\{-j(ux+vy)\}dxdy. \quad (4)$$

$A(u,v)=\int\int a(x,y)\exp\{-(ux+vy)\}dxdy$. By T(u,v) and A(u, v), the complex amplitude W(X,Y) on the image plane is simplified into $$W(X,Y) = \exp\left\{\frac{jk(X^2+Y^2)}{2f}\right\}A\left(\frac{kX}{f},\frac{kY}{f}\right)T\left(\frac{kX}{f},\frac{kY}{f}\right). \quad (5)$$

The pattern of the DOE determines T(u,v). The intensity profile of the laser determines A(u,v) in Eq. (5). Indeed, the final complex amplitude on the image plane depends also upon the light source profile a(x,y). In an actual calculation, W(X,Y) should take a(x,y) into account. However, here a(x,y) is assumed to be constant (a(x,y)=1), which assumes the incident light is a perfect plane wave, for clarifying the relation between the diffraction image W(X,Y) and the DOE pattern T(u,v). Since the actual intensity is a square |W(X,Y)|² of amplitude W(X,Y), the coefficient $\exp\{jk(X^2+Y^2)/2f\}$ will vanish. For a perfect plane wave, the complex amplitude W(X,Y) on the image plane is, $$W(X,Y)=T(kX/f, kY/f). \quad (6)$$

Eq. (6) is an approximated expression for simplifying the following explanation. In practice, Eq. (5) should be used for the calculation of W(X,Y). Now, Eq. (6) means that the diffracted pattern W(X,Y) on the image plane is entirely equivalent to the Fourier transformation T(kX/f, kY/f) of the DOE pattern t(x,y). Eq. (6) can be interpreted as that the DOE pattern t(x,y) determines the diffraction image W(X, Y). However, in actual cases, an object W(X,Y) is given first of all. Then, the corresponding pattern t(x,y) of the DOE is sought for the W(X,Y). For example, in the case of producing one-dimensionally equi-parted K converging spots aligning on a direct line on an image plane, W(X,Y) is determined to take a definite value at K spots aligning on the direct line and to take value 0 at all the other points. In the case of making two-dimensionally equi-parted K×L spots in a rectangular area on an image plane, W(X,Y) should take a definite value at K×L spots in the corresponding area and value 0 at all the other points. The desired pattern on an image plane determines W(X,Y). The problem is what DOE will make W(X,Y) on the image plane. Since W(X,Y) is connected to t(x,y) by Eq. (3) and Eq. (5) or Eq. (6), inverse Fourier transformation of W(X,Y) would simply make the pattern t(x,y) on the DOE.

$$W(X,Y) = \exp\left\{\frac{jk(X^2+Y^2)}{2f}\right\}\int\int U(x,y)\exp\left\{\frac{jk(x^2+y^2)}{2f}\right\}\exp\left\{\frac{-jk(xX+yY)}{f}\right\}dxdy. \quad (2)$$

However, this Inventor does not choose the inverse Fourier transformation from W(X,Y) for the sake of the difficulty of manufacturing. The inverse Fourier transformation determined desirable phase distribution t(x,y) on a DOE, t(x,y) would not be cell-discrete functions but would be a continual function. Continually phase-changing elements are difficult to manufacture. A DOE which is not divided into discrete cells is unsuitable for production due to the irregularity of individual concavities or convexities. A DOE should have such a pattern that is defined upon discrete unit cells. The concaves and concavities on the DOE cannot realize the amplitude distribution. Endowment of the amplitude distribution requires the DOE of transmittance distribution onto the DOE. When the DOE had transmittance distribution, the light energy which is absorbed or reflected by the transmittance fluctuation would be dissipated as a loss. Further, the phase distribution would have continual, non-discrete values which a step-wise DOE could not realize. Hence, the inverse Fourier transformation should be abandoned and instead, calculation shall proceed from a cell-discrete DOE to an image pattern.

FIG. 23 shows an example of a DOE pattern in which a DOE has M cells in the x-direction (horizontal) and N cells in the y-direction (vertical). A unit cell has a width $\delta_x$ in the x-direction and a length $\delta_y$ in the y-direction. The DOE has MN cells. The size of the DOE is M $\delta_x$ in the x-direction and N$\delta_y$ in the y-direction. The purpose of quantizing a DOE into a lattice structure of discrete cells facilitates both manufacture and calculation. Every cell is allocated with a variable. The variable is the height, since the DOE should induce diffraction by varying the phase with the differences of periodically-changing optical paths. The height of the cells should be binary (two-valued), quadruple (four-valued) or so ($2^M$-valued). In the binary case, the phase should be either 0 or $\pi$. Cell height determines the phase of penetrating or reflecting light. The binary-phase DOE gives binary heights of cells. In the quadruple case, the phase should be 0, $\pi/2$, $\pi$ and $3\pi/2$. Cells take four kinds of heights. In general, cell heights are $2^M$ in the case of $2^M$ phases. The variable "height" may be called a "thickness", since a DOE is a board.

The quadruple case is rather complicated. The following steps of design is explained by adopting the binary variable case for simplicity. The phase difference between DOE-penetrating wave and air-passing wave is $2\pi(n-1)d/\lambda$, where "n" is the refractive index, d is the thickness and $\lambda$ is the wavelength of the light. A binary DOE takes two values $d_1$ and $d_2$ of thickness. The difference $(d_2-d_1)$ should correspond to the phase difference $\pi$. Namely, $2\pi(n-1)(d_2-d_1)/\lambda=\pi$. The DOE material determines the refractive index n. Then, the height difference $(d_2-d_1)$ is uniquely determined to be $(d_2-d_1)=\lambda/2(n-1)$. The difference is determined from $\pi$ phase difference but the thickness $d_1$ itself is arbitrary. The DOE plane is divided into horizontal M cells and vertical N cells. Cell coordinate (m,n), for instance, is defined by posing the origin at the central cell. Horizontal cell number m varies from $-M/2$ to $+M/2-1$. Vertical cell number n changes from $-N/2$ to $+N/2-1$. Every cell shall be allocated with a phase. $\phi_{mn}$ is the phase of the cell (m,n) which is either 0 or $\pi$. The complex amplitude transmittance is denoted by $t_{mn}$. When the DOE material has no absorption, the magnitude of $t_{mn}$ is a unit number $|t_{mn}|=1$.

$$t_{mn}=\exp(j\phi_{mn})=+1, \phi_{mn}=0$$

$$-1, \phi_{mn}=\pi. \tag{7}$$

The problem is to find out the most pertinent distribution of the cell complex amplitude transmittance $\{t_{mn}\}$. Since coordinates x and y are continual but cells are discrete, it is difficult to give a simple expression to t(x,y) from the cell phases. The following rectangular unction rect(x) is defined for reconciling continual (x,y) with cell phases $\phi_{mn}$.

$$\text{rect}(x)=1, |x|\leq\tfrac{1}{2}$$

$$0, |x|>\tfrac{1}{2}. \tag{8}$$

t(x,y) is only a sum of complex amplitude transmittance $t_{mn}$ of M×N cells. When $(m-0.5)\delta_x \leq x < (m+0.5)\delta_x$ and $(n-0.5)\delta_y \leq y < (n+0.5)\delta_y$, $t(x,y)=t_{mn}$. The same matter can be otherwise expressed by the rectangular function.

$$t(x,y)=\sum_{m=-M/2}^{M/2-1}\sum_{n=-N/2}^{N/2-1} t_{mn}\text{rect}\left(\frac{x-m\delta_x}{\delta_x}\right)\text{rect}\left(\frac{y-n\delta_x}{\delta_y}\right). \tag{9}$$

The Fourier transformation of t(x,y) is T(kX/f, kY/f)=W(X, Y) (under some assumptions). This assumes:

$$W(X,Y)=\sum_{m=-M/2}^{M/2-1}\sum_{n=-N/2}^{N/2-1} t_{mn} \int\int \text{rect}\left(\frac{x-m\delta_x}{\delta_x}\right)\text{rect}\left(\frac{y-n\delta_y}{\delta_y}\right)\exp\left\{\frac{-jk(xX+yY)}{f}\right\}dxdy. \tag{10}$$

The range of summation of m is from $-M/2$ to $M/2-1$. The scope of summation of n is from $-N/2$ to $N/2-1$. The double integration can be done for every cell separately. The Fourier transformation of a unit cell can be expressed by a sinc function sinc(x).

$$\text{sinc}(x)=\frac{\sin(\pi x)}{\pi x}. \tag{11}$$

Sinc(x) is an integral $(2\pi)^{-1}\int\exp(jhx)dh$ with a range between $h=-\pi$ and $h=+\pi$. Sinc(x) takes the maximum 1 at the limit x=0. Sinc(x), which is an even function, decreases, waving in both directions. The sinc function gives another expression to W(X,Y). The sinc function serves W(X,Y) with the waving parts.

$$W(X,Y)=\delta_x\delta_y\text{sinc}\left(\frac{\delta_x X}{\lambda f}\right)\text{sinc}\left(\frac{\delta_y Y}{\lambda f}\right) \tag{12}$$

$$\sum_{m=-M/2}^{M/2-1}\sum_{n=-N/2}^{N/2-1} t_{mn}\exp\left\{\frac{-jk(m\delta_x X+n\delta_y Y)}{f}\right\}.$$

This equation means that the diffraction W(X,Y) on the image plane is a product of the sinc functions and the Fourier transform of $t_{mn}$. Sinc functions appear in the diffraction from slits with definite apertures. Sinc functions do not appear in the diffraction from slits with infinitesimal apertures. In diffraction, the 0-th order diffraction is the strongest, the 1 st order diffraction is the next strongest and the 2nd order diffraction is the third strongest. The decrease of the higher order diffraction is well expressed by the sinc functions. A conventional diffraction grating included a single sinc function due to its one dimensional character.

However, since DOEs are two-dimensional devices, W(X, Y) of DOEs include two sinc functions of x- and y-coordinates. The reason why the diffraction W(X,Y) is a Fourier transform of $t_{mn}$ is that the converging lens Fourier-transforms the diffracted waves. Namely, the function of the lens is the Fourier transform.

When the desired diffraction pattern on the image plane is continual one, $t_{mn}$ should directly be determined from the desired continual pattern from Eq. (12).

Discrete diffraction light distribution is more covenient for DOEs than analog diffraction distribution, since all the calculation is done by a computer. Furthermore, if the calculation is based upon the Fast Fourier Transform (FFT), the amplitude distribution on a DOE must has the same cell size as the diffraction distribution on the image plane. Since the unit of the DOE is briefly called a "cell", a unit on the image plane will be named "image cell" for discriminating the cell on the image plane from the cell of the DOE. The image cell is addressed by a horizontal number "p" and a vertical number "q" instead of X and Y. It is convenient to rewrite the inner variables to $2\pi$ (m/M)p which is suitable to Fourier transform. The replacement requires $2\pi$ (m/M)p=km $\delta_x X/f$ in the x-direction. Namely, p=M$\delta_x$X/f $\lambda$. This determines the unit size $\delta_1$ of an image cell in the x-direction as $\delta_1$=f$\lambda$/$\delta_x$ M. X=p$\delta_1$ is the relation between continual X and discrete p. Similarly, in the y-direction, q=N$\delta_y$Y/f$\lambda$. The image cell unit length in the y-direction is $\delta_2$=f$\lambda$/$\delta_y$N. Y=q$\delta_2$. Such quantization changes W(X,Y) into a discrete expression.

$$W_{pq} = \delta_x \delta_y \mathrm{sinc}\left(\frac{p}{M}\right) \mathrm{sinc}\left(\frac{q}{N}\right) \sum_{m=-M/2}^{M/2-1} \sum_{n=-N/2}^{N/2-1} t_{mn} \exp\left\{-2\pi j\left(\frac{mp}{M} + \frac{nq}{N}\right)\right\}. \quad (13)$$

$T_{pq}$ denotes discrete Fourier transform (DFT) of $t_{mn}$.

$$T_{pq} = \frac{1}{MN} \sum_{m=-M/2}^{M/2-1} \sum_{n=-N/2}^{N/2-1} t_{mn} \exp\left\{-2\pi j\left(\frac{mp}{M} + \frac{nq}{N}\right)\right\}. \quad (14)$$

A computer can easily calculate $T_{pq}$ when $t_{mn}$, M and N have been known. Using $T_{pq}$, the diffraction amplitude $W_{pq}$ of the (p,q)-th image cell on the image plane is given by $$W_{pq} = M\delta_x N\delta_y \, \mathrm{sinc}(p/M) \, \mathrm{sinc}(q/N) T^{pq}. \quad (15)$$

Diffraction intensity distribution $I_{pq}$ on the image plane is the square of the amplitude $W_{pq}$.

$$I_{pq}(M\delta_x)^2 (N\delta_y)^2 \, \mathrm{sinc}^2(p/M) \, \mathrm{sinc}^2(q/N)|T_{pq}|^2. \quad (16)$$

$T_{pq}$ can be calculated from $t_{mn}$ by the fast Fourier transform. $T_{pq}$ leads to the diffraction intensity $I_{pq}$ at the (p,q)-th image cell.

A DOE is an element for splitting the incidence light spatially into a plurality of partial waves having definite power ratios. A DOE itself divides the incidence light in different directions without making images. For example, the DOE diffracts strong light with intensity 1 in some directions but diffracts no light with intensity 0 in other directions. In this case, the intensity of the diffraction is binary (two-values of 0 or 1). Of course, four-values or eight-values of diffraction intensity are also available. The design of a DOE is similar to any steps of diffraction intensity. The following explanation relates only to the binary intensity steps for simplicity.

The DOE lacks the function of convergence. The diffracted partial waves are parallel for indefinite long distances. In practical use, parallel diffracted waves are converged by a converging lens on an image plane. The image pattern made by the lens has bright regions having strong diffraction intensity "1" and dark regions having no diffraction intensity "0". The bright regions having diffracted light are now named "signal" regions. Image cells in the signal regions are called "signal image cell". The other regions in which no light should be diffracted are named "blank" regions. Image cells in the blank regions are called "blank" cells. It is desirable that the diffraction power supplied into the signal cells should be equal. The fluctuation of the diffraction intensity in the signal cells is called "intensity non-uniformity". Smaller intensity non-uniformity is more desirable. The intensity that appears in blank cells is called "noise". Less noise is preferable.

The diffraction efficiency $\eta$ can be another parameter constituting a merit function. The diffraction efficiency is defined as a ratio of the energy on the signal cells to the whole incidence energy. The diffraction efficiency is an important property. Design of a DOE aims at a larger diffraction efficiency, a smaller intensity non-uniformity and less noise. Then, objectives are predetermined as ideal values for the characteristic properties, i.e., diffraction efficiency, non-uniformity and noise. The DOE design tries to optimize the phase distribution of the DOE for bringing the characteristic properties close up to the objectives. What brings the characteristic properties close to the objectives is a merit function. The merit function shall include the differences between the important properties and their objectives in a relation in which the merit function should diminish, when the characteristic properties approach their objectives. A simple definition of a merit function is a sum of squares of the differences between the properties and the objectives. This definition enables the merit function to decrease in accordance with approaches of the properties to the objectives. However, other properties excluded from the merit function are intangible. The merit function is neutral and indifferent to the other properties which are not contained. The non-selected properties are out of control for the merit function.

Here, the diffraction efficiency, the non-uniformity and the noise intensity are chosen as characteristic properties which shall be contained in the merit function.

$$E = W_1 \frac{1}{N_s}(\eta_{obj} - \eta)^2 + W_2 \sum_{(p,q)\in S} (I_{av} - I_{pq})^2 + W_3 N_s \max_{(p,q)\notin S}(I_{pq}^2). \quad (17)$$

Here, $W_1$, $W_2$, and $W_3$ are constant weights, $N_s$ is the number of the signal cells. S is the signal regions. $\eta$ is the diffraction efficiency for the given parameters. $\eta_{obj}$ is an objective of $\eta$. $I_{pq}$ is the diffraction intensity at the (p,q) image cell within the signal regions. $I_{av}$ is an average intensity of the diffraction signals in the signal regions. The first term is a square of the deviation of the diffraction efficiency from the objective. The second term is a sum of the squares of the differences between the individual intensity $I_{pq}$ and the average intensity $I_{av}$ in the signal regions. The last term denotes noise intensity. The last term is the maximum of the squares of the noise intensity $I_{pq}$ of the blank cells (p,q) outside of the signal regions S. Ideally, no light should be diffracted to the blank cells, but some is diffracted also to the blank cells as noise. The noise is estimated here by the maximum intensity instead of the average or the sum.

This merit function would diminish to 0, if there were no noise, the diffraction intensity were uniform for all the signal cells and the diffraction efficiency were equal to the objective. In general, when the noise decreases, the signal intensity is more uniform or the diffraction efficiency approaches the objective, the merit function decreases. The merit function will be changed to a minimum by varying the variables of the DOE. The set of variables minimizing the merit function yields the least noise, uniform signal intensities and objective diffraction efficiency. Minimizing the merit function brings about a pertinent set of variables.

The DOE design requires an optimizing calculation of minimizing the merit function which includes phases of tens of thousands to millions of cells as variables. An immense number of cells sometimes demands a long calculation time. FIG. 24 denotes the steps of design of a DOE in binary phase case. At first, initial values for phases of DOE cells are given. The phase of each cell is 0 or $\pi$. $\phi_{mn}$ is the phase for the (m,n)-th cell. $\phi_{mn}$ is either 0 or $\pi$. In the example, initial phases are given to all the cells at random. Besides the random initial phases, initial phases can be determined by some rule.

The assignment of the initial phases leads to the DOE-diffracted intensity distribution on the image plane through Eq. (6) to Eq. (16). The merit function is calculated for the diffraction pattern. A number r which starts from 1 is affixed to the merit function E into $E_r$. The first merit function is $E_1$. Then, phase of a cell (u,v) is reversed. If the current phase of the (u,v)-th cell is $\pi$, the phase should be changed into 0. Otherwise, if the current phase is 0, it is changed to $\pi$. The other cells (MN-1) maintain their previous phases. The new set of phases determines again the DOE-diffracted intensity distribution $\{I_{pq}\}$ on the image plane. $\{I_{pq}\}$ gives a new value E' for the merit function. E' is compared with E. If E' is smaller than E, the phase reversion of the (u,v) cell is accepted. If E' is not smaller than E, the phase reversion is rejected. The phase of the (u,v)-th cell is restored. The merit function keeps the previous value E.

The order of the cells which reverse the phase can be arbitrarily determined. This example starts from u=0 and v=0. The phase-changing cell transfers to the right from (0,0) to (1,0), (2,0), . . . , and (M-1,0) one by one. When u arrives at M (u=M), the alteration of phases finishes for the line v=0 and moves to the second line (v=1). When the phase-alteration finishes at the (M-1, v) cell for line v, it transfers to the first cell (0, v+1) of the next line v+1. Every alteration of a phase is followed by the calculation of $\{I_{pq}\}$ and the merit function E. The phase-alteration lowering the merit function shall be accepted but the phase-alteration raising the merit function shall be abandoned. When the phase alteration arrives at the lowest, right most cell (u=M-1, v=N-1), the merit function E has been reduced by some amount from the initial merit function $E_1$. The decrement ($E_1$-E) from the initial $E_1$ to the final E is calculated. When the decrement is larger than a critical value $\epsilon$($E_1$-E>$\epsilon$), there is still a probability of reducing the merit function by the phase-alteration. Then, the current E replaces $E_1$(E→$E_1$). The alteration of the phases shall be again repeated from the uppermost, leftest cell (0,0), similarly to the former procedure. What shall be repeated is the steps of altering the phase of the (u,v)-th cell, calculating the diffraction intensity distribution $I_{pq}$, calculating the merit function comparing the new merit function with the previous one, replacing the phase of the (u,v)-th cell when the new merit function is smaller than the previous one, or rejecting the phase alteration when the new merit function is not smaller than the previous one. The serial phase-alteration step should be repeated for reducing the merit function E. Some repetitions of the serial phase alteration step bring the merit function to a minimum, (0$\leq$$E_r$-E<$\epsilon$). Then, the value $E_r$ is the minimum value of the merit function which can be attained from the given initial set of phases which have been randomly settled. When $E_r$-E<$\epsilon$, the calculation of r=1 shall be ended. The calculation brings about a set of phases $\phi_{mn}$ based upon the r=1 intial values and a minimized merit function E.

However, the minimum $E_r$ depends upon the initial phases. The minimum $E_r$ is not necessarily the absolute minimum of the merit function.

FIG. 25 shows the relation between a parameter and a merit function. The abscissa is a parameter which represents many parameters in brief. The ordinate is the merit function. The parameter varies the merit function. When $I_1$ is chosen as an initial point, the phase-alteration step will bring the merit function to a bottom A at $x_a$. E stops at point A. When another initial point $I_2$ is selected, the merit function will fall to another minimum B at $x_b$ by the phase-alteration step. When a further initial point $I_3$ is chosen, the merit function can attain a minimum C at $x_c$. The minima depend upon the initial parameters. It is necessary to start from various initial values, calculate minima from the initial values and seek the least minimum among the minima. In FIG. 25, the merit function should take point C as the absolute minimum, abandoning points A and B.

The process should be returned to the initial phase settlement ($\phi_{mn}$=0 or $\pi$ at random). Another set of initial phases is again given at random. A similar calculation shall be repeated from the second set of initial values. The repetition of altering the phase, calculating a merit function and replacing the phase leads to a minimum merit function $E_2$ which can be attained from the second set of initial values. Aplurality of sets of initial values are given. The current (r=2) minimum merit function $E_{opt}$ shall be compared with the previous (r=1) minimum merit function. When the current (r=2) minimum merit function is smaller than the previous (r=1) minimum merit function, the current (r=2) set of the merit function $E_{opt}$, the phases $\phi_{mn}$ shall be accepted. Otherwise, if the current merit function is bigger than the previous merit function, the current $E_{opt}$, the phases $\phi_{mn}$ shall be rejected. The same processes shall be repeated. The times of setting initial values are predetermined to R-1. When the renewal of initial values attains to R times, the calculation of minimizing the merit function shall be ended. The least merit function is the minimum of $\{E_1, E_2, \ldots, E_r\}$.

FIG. 26 shows the steps of making a DOE. "Pattern design" seeks the optimum phase pattern on the DOE for the designated purpose. The processes described so far relate to the pattern design. This invention aims at an improvement of the step of the pattern design. The pattern design is followed by microprocessing, coating and inspection. The following three processes are beyond the scope of the present invention. Since the pattern design has determined the thicknesses (or heights) of all the cells, a flat substrate is microprocessed for making steps of cells.

FIG. 27 denotes the microprocessing. A DOE substrate is a flat board which is transparent for the laser light. For example, a ZnSe substrate is employed for a $CO_2$ laser. A photoresist is coated on the substrate and prebaked. The photoresist can be either a positive type or a negative type. FIG. 27 shows the case of the positive type resist. A latent pattern is depicted on the photoresist by placing a photomask having desired mask pattern, shooting the photomask with ultraviolet lamp (UV) and exposing the photoresist. The black parts of the mask shield the UV light. The regions beneath the black parts are free from the UV light. The transparent parts allow the UV light to irradiate the resist. The UV light composes photoacid reaction in the resist and the photoacid reaction breaks polymer couplings. Development eliminates the resist of the UV-irradiated regions but leaves the other parts shielded by the mask untouched. The substrate partially-covered by the resist is treated by anisotropic etching. The etching step perforates cavities at the bare parts on the substrate. The resist is removed. The substrate possesses a binary stepped surface. The height of the step is $\lambda/2(n-1)$ which corresponds to a phase difference of $\pi$. The bottom of the left column of FIG. 27 shows the binary step DOE. If a similar process is repeated for making new steps of $\pi/4$ and $3\pi/4$, a four-stepped DOE can be produced, as denoted by the right column of FIG. 27. N-repetitions of the photoetching will make a $2^N$-stepped DOE. If laser light shot the naked substrate, the light would be reflected by the front surface and the rear surface, which would lower the diffraction efficiency. Then, both surfaces of the substrate are coated with antireflection films of dielectric multilayers. The produced DOE shall be inspected whether it exhibits the desired performance by irradiating the DOE board by laser light, measuring the diffraction power on the image plane, as shown in FIG. 22, and comparing the diffraction with the desired image pattern.

If a lens assembly were produced without production errors, the lens assembly would reveal the best performance that is determined by the solution. The best performance is called a designed performance. However, since production errors accompany an actual lens assembly, the performance of actual products is inferior to the designed performance. An estimation of lens assembly should take production cost and production feasibility into consideration as well as performance. The prior estimation method, however, has a drawback, since it has traditionally ignored the production feasibility. If the prior estimation method judged a solution to be optimum, it is not necessarily feasible to produce the lens assembly having the parameters determined by the solution. Actual products, in general, do not exhibit the designed performance.

Here, the word "performance" should be defined. An optical part or a lens has many individual properties. An assembly of individual properties is the performance. Individual properties are measurable. But performance cannot be measured directly, since performance is defined as a set of properties. Inherently performance is not measurable. But in order to estimate a product by the performance, the performance should be converted from an immeasurable concept to a measurable value. Since performance is an assembly of properties, the performance can be changed to a measurable value by expressing the performance as a sum of individual properties with weights. The summation of properties endows the performance with a new character as a measurable value. However, unless the weights are determined, the summation is not carried out. The judgement of the importance of properties decides the weights case by case. Then, assuming the weights have been applied to performance, the performance is a measurable, integral variable for estimating the product.

Individual properties depend upon the parameters and the variables of a lens assembly. There are many variable parameters in a lens assembly. Lens thicknesses, curvatures of front surfaces and rear surfaces, aspherical coefficients of surfaces, distances between lenses and so forth can be variables. "Design" is a process of determining optimum values of the variables. The values of variables which satisfy the equations are called a "solution". A parameter has a definite value for satisfying the equations. A set of the definite values makes a solution.

An optical part has an object. Equations are set up for seeking the parameters accomplishing the object. However, the number of the equations is often fewer than the number of the variable parameters. The equations cannot give a unique solution. Approximating calculation bears a plurality of solutions which satisfy the set of equations. Namely, lack of the restrictions makes many solutions. Then, the design does not end by finding a solution at all. The most suitable one should be selected from a plurality of solutions whose number may be indefinite. The equations cannot determine the most suitable solution. The most suitable solution should be determined rather from standpoints different from the optical equations.

The merit function is just the means for selecting the most suitable solution from many candidate solutions. The merit function is a sum of squares of ray aberration or optical path difference at individual points. A bigger merit function signifies worse performance. A smaller merit function means better performance. At present, the estimation of aberration is the main purpose of the merit function. Namely, if a plurality of solutions are found, the solution which gives the smallest aberration should be chosen by the merit function. Lowest aberration solution is the unique criterion for the solutions at present. The aberration is a decline of performance of a produced one from the ideal one. It may be reasonable to determine the validity of solutions by aberration. The current method chooses the lowest aberration solution as the most suitable solution from many candidate solutions. This is an intuitive and primitive estimation.

However, any prior estimation has never been based upon the feasibility of production. Conventional merit functions have ignored the feasibility of production. Such a selection has a drawback. If a lens assembly having the parameters which are all equal to the values given by the optimum solution were to be built, the lens assembly would exhibit excellent properties. However, production errors surely accompany actual manufacturing. The production errors degrade the performance of products below the ideal performance. Sometimes a production error for some parameter is fatal and a small error of the parameter degrades the performance to a great extent. Much attention should be paid to such a dangerous parameter for suppressing the production error. In spite of the keen attention, some production errors arise in any case. Then the products should be examined. Some of the products should be abandoned as rejected articles, if they have large errors beyond the tolerances for some parameters. Designs with small tolerances for dangerous parameters are suffering from low yield and high production cost.

FIG. 4 is an imaginary graph showing the dependence of performance upon the values of a parameter. There are many parameters having an influence upon the performance. But one parameter is now adopted in the graph as an abscissa. The performance, which is inherently an abstract character, is assumed to be measurable and is denoted in a reverse direction along an ordinate. A search for an optimum solution by using a merit function begins with an adoption of initial values of parameters. For example, an initial value is taken at point-β in FIG. 4. Then the parameter is changed to the right on the curve for raising the performance to point-γ. Since point-γ gives the merit function a minimum value, point-γ gives the value of the parameter in a solution. But the solution depends upon how to take an initial value. If someone starts from another initial point-δ, he will vary the parameter little by little to the right till the bottom point-ε. This is the value of the parameter in another solution. Another initial point-θ leads to a solution at point-η. The example of FIG. 4 shows three solutions depending upon the initial values. Owing to an excess number of variables and shortage of confining conditions, the judgement by the minimum merit function bears a lot of solutions. The solutions depend upon the initial values. Then, what is important is the selection of the initial values of variable parameters. We don't know yet how to find the best initial values.

Besides the selection of the initial values, there is another problem. The problem is that the performance is not the unique factor that decides what solution is the most suitable one. This is more important but is more difficult to understand problem. Point-ε is superior to point-η in performance in the example of FIG. 4. Prior estimation would choose point-ε as an optimum solution.

However, point-ε lies at a very narrow valley. If the design were to be done on the solution based upon point-ε, the performance would fall rapidly due to a small deviation (error) from point-ε. Point-ε is a dangerous minimum. On the contrary, point-η is inferior to point-ε in the ideal performance. Since point-η lies in a wide valley, the fall of the performance around point-η is far smaller than that around point-ε to the same errors. Point-η is a safer minimum than point-ε. Further an initial point-β leads to a valley of point-γ. At point-γ, the relation between the fall of the performance and the error is looser than point-η. In practice, production errors surely accompany production of a lens assembly. If a lens assembly is designed at point-ε, the rapid fall of the curve prevents manufacturers to make a product just having the designed performance. On the contrary, if point-η is selected as a designed value, the production is easier than point-ε, since the tolerance has a larger margin at point-η than at point-ε. Namely, the small tolerance makes the production based upon point-ε difficult. The large tolerance endows feasibility to the production based upon point-η or point-γ. Point-η and point-γ are superior to point-ε from the standpoint of feasibility of production.

The finally-attained optimum values (solution) depend upon the initial, starting values. However, the initial values are not a unique factor for determining the final optimum values. The final solution depends also on the order how to change the parameters from the initial values. Different orders of changing parameters lead to different minimum values (different solutions). There is a freedom of selecting initial values. The order of changing the parameters has also a freedom. The guideline of minimizing the merit function cannot necessarily lead us to a solution having wide tolerances. If the solution obtained by minimizing the merit function has poor tolerances, it is hard to make the product in accordance with the solution.

FIG. 5 exhibits the relation between a production error and performance schematically. An optimum value $x_0$ of a parameter accomplishes the best performance (designed performance). The abscissa is a production error of the parameter which is the difference between the actual value x and the optimum value $x_0$. The ordinate means the performance. If the error is zero, the product will exhibit the best performance at point-λ. The performance falls in proportion to an increase of the production error in both directions. A horizontal line κμ means the minimum allowable performance (standard performance). The errors at μ and at κ determine the tolerance Δ of the production error. The error at point μ is the plus tolerance (+Δ). The error at point κ is the minus tolerance (−Δ). The tolerances (±Δ) are equal to the errors at point κ and μ which give the minimum allowable performance. The lines κλ and λμ are allowable scope of the performance and the production errors. When a product shows the performance of point ν with an error $e_1$ ($e_1 > \Delta$), the product should be rejected. The performance depends upon many parameters and variables which have inherent tolerances. Some parameters have wide tolerances. Other parameters have narrow tolerances. Attention should be paid to the parameters with narrow tolerances. A small deviation $e=(x−x_0)$ of the parameters from the optimum value degrades rapidly the performance. The narrow tolerance requires a careful operation for the parameter. In spite of the carefull operation, products are suffering from an error which is larger than the tolerance. The products having a quite small error which is yet larger than the tolerance should be rejected. Namely, narrow-tolerance parameters lower the yield by increasing the difficulty of production.

An imaginary new concept of dS/de which is a ratio of the fall of performance to an increment of an error may help the understanding of the relation between the difficulty of production and the tolerance of errors. A large dS/de is undesirable in actual manufacturing, because only a small error degrades the performance of products fatally. The estimation based only upon aberration notifies us about nothing of the influence of production errors on products. Then, after determining the optimum solution of parameters, allowable widths of errors, that is, tolerances, are individually allotted to the optimum parameters for clarifying the guidelines of production. The difficulty of production is totally different between a 10 mm thick lens of a 100 μm tolerance and another 10 mm thick lens of a 3 μm tolerance. It is far harder to produce the latter one of the quite small tolerance than the first one.

When an optimum solution has the parameters having a quite small tolerance, the production in compliance with the optimum solution is difficult. Prior estimation of designs of optical parts has entirely lacked the viewpoint of estimating the designs by the degrees of the difficulty of actual production. Conventional estimation of the designs has not adopted wide-tolerance solutions which facilitate actual production but has adopted low-aberration solutions which realize high performance. The estimation of the present invention is entirely different from the conventional ones.

Unlike prior estimation, this invention gives a new estimation which can estimate the difficulty of the production based on solutions and can produce an optimum solution having parameters with wide tolerances which ensure easy production.

Conventional DOE design has sought optimum phase pattern of a DOE by considering a non-error state, establishing a merit function for the non-error state and minimizing the merit function by changing phases. The prior DOE design has taken no account of production errors. However, errors always accompany production. Accidental production errors lower the performance of the DOE. The error-induced degeneration has not included in the conventional DOE design. Admitting the possibility of degeneration by production errors, prior design has believed that the degradation can be prevented by lowering errors and has tried to suppress the production error as low as possible.

FIG. 28 is a figure showing prior art DOE design. First of all, various kinds of restrictions are settled. For example, the pattern size is determined in accordance with the purpose of the DOE. The pattern size is, e.g., 64 cells×64 cells, 128 cells×128 cells or so. The initial cell number should be determined by considering the light source power, the size of the image plane, the complexity of the object pattern. The number of steps of phases is also a parameter determined arbitrarily. The simplest phase step is a binary phase step consisting of 0 and π. Here the phase is equivalent to the thickness or the height to cells of the DOE. In the case of transparent type DOEs, the phase difference of a step is $2\pi(n−1) \Delta t/\lambda$, where Δt is the height of the step, n is the refractive index and λ is the wavelength of the light. The binary steps of the phases of 0 or π should have the difference $\Delta t = \lambda/2(n-1)$ in height. Since diffraction arises from periodically aligning binary steps, the binary DOE is available. More sophisticated diffraction patterns require higher degrees of steps, i.e., four degree steps (quadruple), eight degree steps or so. A quadruple DOE allocates phases 0, π/2, π or 3π/2 to cells. The top surfaces of cells take four degrees of heights. The least difference between the cell heights is $\Delta t = \pi/4(n-1)$. A DOE has a simple structure of a matrix of cells which align lengthwise and crosswise. The simple structure forbids the DOE from having many restrictions. Restrictions are the cell size, the cell number and the step number. The refractive index is predetermined by the material of the DOE. Thus, the refractive index is not an arbitrarily-determined restriction.

There is also a freedom how to build up the merit function. A usual manner has been used to construct a merit function by summing up the squares of the differences between the calculated parameters and their objectives. The definition can equate a decrement of the merit function with the approach of the parameters to the objectives. For example, diffraction efficiency, intensity fluctuation, noise or so can be selected as the properties(parameters) included in the merit function. Actually, the diffraction efficiency can be included in the merit function as a square of the difference between the calculated efficiency and the predetermined objective. The intensity fluctuation means the dispersion of the light power attaining to the plural cells which should receive the diffracted light. The merit function can contain the intensity fluctuation as a sum of squares of differences between the intensity entering individual signal cells and the average intensity of them. Noise is the light entering the blank cells to which the light should not be diffracted. No noise is an ideal limit. But noise somewhat accompanies an actual DOE. Thus, the squares of noise intensity of the blank cells are included as the form of either a sum or a maximum of the squares in the merit function for decreasing noise. Since noise intensity is always positive, the noise power itself can be included in the merit function instead of the square. Other properties can also be included in the merit function as a square of differences between the values of properties(parameters) and their objectives. Namely, the object diffraction pattern determines the structure of the preferable merit function. Pertinent choice of the merit function can realize the target object diffraction pattern.

An optimizing calculation follows the determination of the restrictions and the merit function. For example, it is assumed that a single unit should have 64 cells×64 cells having a binary phase (0 or π). First of all, initial phases should be assigned to all the cells. There are a lot of sets of initial values assigned to the cells. The minimum merit function attainable from the initial values depends upon the choice of the initial values, as clarified by referring to FIG. 25. Initial phases may either be given at random without considering the object pattern or suitably by considering the object pattern. For example, even the simplest case of the unit of 64 cells by 64 cells with binary phases has $2^{4096}$ candidates for phases of cells. One of them is chosen as an initial set of phases. The initial phases enable a designer to calculate the diffraction pattern on the image plane. The image pattern is also quantized into image cells on the plane. The image pattern is an assembly of image cells and the diffracted power on the image cell. The merit function can be calculated from the image pattern. Then, a phase of a cell is altered. The diffraction pattern is calculated. The merit function is again calculated. If the new merit function is lower than the previous one, the phase alteration should be confirmed. Otherwise if the new merit function is equal or bigger than the previous one, the phase should be restored. Repetitions of the phase alterations decrease the merit function to a minimum value. This is only a bottom value that can be attained from the initial phases. The minima depend upon the initial set of phases. Thus, the initial phases are fully changed. Similar steps are repeated from the new set of the initial phases for seeking another minimum of the merit function. Several number of sets of the initial phases determine the same number of minima of the merit function. Among the minimum estimation values, the smallest value should be elected as a suitable merit function giving a solution having appropriate properties. These processes are the operation of minimizing the merit function in FIG. 28.

However, the solution is not a decisive one until it is confirmed that the solution satisfies the desired performance. The solution shall be further investigated from two standpoints. One point is whether the solution satisfies the desired conditions (properties, performance). The other point is tolerance analysis. This problem may be rather difficult to understand. Even if an imaginary DOE having just the parameters of the solution satisfies the desired performance, an actual DOE manufactured after the solution sometimes does not satisfy the desired performance owing to production errors. Errors accompany production. The degradation due to production errors is important. It is necessary to investigate the degradation caused by the production errors. When production errors are small, the performance of the DOE still satisfies the required performance. The production errors are allowable errors. Further increase of production errors equalizes the performance to the minimum performance. The production errors are the maximum of the allowable errors. The maximum of the allowable production errors is called tolerance. When all the parameters exist within the scope of the designed value±tolerance, the DOE reveals sufficient performance. If some of the parameters exist out of the scope of the designed value±tolerance, the DOE cannot satisfy the required performance.

It is facile to produce good DOEs when tolerances are enough wide. But when tolerances are small, it is difficult to produce good DOEs having the parameters within designed values±tolerances. When some tolerances of the solution are too small to contain the parameters within the scope of the designed values±tolerances, the solution should be rejected as improper one. Although the solution has been calculated by minimizing the merit function after a long calculation, the solution should be abandoned. The current step should return to the beginning step of setting restrictions.

More complicated restrictions should be imposed for improving the calculation based upon the merit function. For example, a pattern of a DOE shall be converted from 64 cells×64 cells to 128 cells×128 cells. Otherwise, the steps of phases shall be increased from binary steps to quadruple steps. A similar cycle of steps shall be started under the renewed and complicated restrictions. Namely, a determination of initial phases is followed by the steps of calculating the diffraction pattern, deriving the merit function, altering a phase of a cell, calculating diffraction pattern, deriving the merit function, . . . and obtaining a minimum merit function. Then, another determination of initial phases begins the same cycle of calculations. The least of the minimums of the merit functions is then determined under the restrictions either the unit of 128 cells×128 cells or the quadruple phases. The new solution should be tested by the two standpoints as mentioned once. First, it should be confirmed whether the parameters of the solution satisfy the desired performance. Second, the maximum allowable errors, tolerances, should be sought by surveying the degeneration induced by production errors. If the tolerances are wide enough, the solution should finally accepted. But if the tolerance is not so wide yet, the solution should again be rejected and the current process should return to the first step of FIG. 28 three times. Prior art design used to seek the optimum solution of the optimum parameters by repeating the steps of FIG. 28 until all the parameters obtain sufficiently large tolerances.

The prior art design believes that the replacement of coarse restrictions by fine restrictions should improve the performance of the DOE. At first, the prior method minimizes the merit function under the restriction of a unit size of 64 cells×64 cells. If the solution is denied by the result estimation step, the prior design further elaborates the restriction by increasing the number of a unit to 128 cells× 128 cells. The increment of the cell number per unit raises the amount of calculation but will enhance the performance of the DOE. Since the merit function is a sum of squares of errors, the elaboration of restrictions will improve the performance of the DOE.

The situation is, however, entirely different in tolerances. The merit function does not include tolerances. It is uncertain whether the solution obtained by minimizing the merit function free from tolerances would bring about wide tolerances or not. The merit function is fully irrelevant to tolerances. Prior design does the tolerance analysis and returns the processing to the initial step of determining the restrictions, if the tolerance turns out to be too narrow. Elaborating the restrictions does not necessarily lead to increases of tolerances. For example, the elaboration from 64 cells to 128 cells may increase tolerances in some cases but may decrease tolerances in other cases. The merit function has no motive of raising tolerances. Minimizing the merit function does not ensure an widening of tolerances. The design based upon the prior merit function is useless to enhance tolerances.

Unfortunately, the upgrade of the restrictions, e.g., an increment of cell number or an increase of phase steps, sometimes tends to decrease tolerances. When a unit is increased from 64 cells to 128 cells, the cell size is reduced to a half, which has a tendency of decreasing the tolerance. The merit function has no function of enhancing tolerances. The upgrade of the restrictions has rather a tendency of lowering tolerances. The repetitions of the steps of FIG. 28 sometimes cannot enlarge tolerances up to desirable values. In this case, the repetitions of FIG. 28 cannot end and the computer must repeat insignificant operations. The inconvenience originates from the fact that the conventional merit function is interested only in the improvement of performance but is unresponsive to tolerances. The problem is widening tolerances.

One purpose of the present invention is to provide a method of design of a DOE which endows parameters with large tolerances. Namely, the purpose of the invention is facilitating the manufacture of DOEs by allowing large tolerances to the parameters.

SUMMARY OF THE INVENTION

The method of designing optical parts includes the steps of making a merit function $E_0$ for the set of parameters without errors and extra merit functions $E_1$, $E_2$, . . . for the set of parameters with positively-allotted errors $\pm\delta$, multiplying weights $w_0$, $w_1$, $w_2$, . . . by the merit functions $E_0$, $E_1$, $E_2$, . . . , making an integrated (unifed) merit function $E = w_0 E_0 + w_1 E_1 + w_2 E_2 + \ldots = \Sigma w_k E_k$ and seeking a set of parameters which minimize the integrated (unified) merit function.

The conspicuous feature is the initial positive allotment of errors $\pm\delta$ to the parameters for building the integrated (unified) merit function. The error-allotted parameters should be selected as the parameters which are difficult to adjust to the designed values. The error which is initially allotted to an object parameter is called an allotted error $\pm\delta$ for discriminating the production error e or the tolerance $\Delta$. The allotted error is the main concept of the present invention. The allotted error $\pm\delta$ should be selected to be larger than the ordinary production error e. Three kinds of errors should be discerned. The production error accompanies an actual manufacture of a product. The production error is unintentional, is different for individual products, takes many values for a single parameter and is a probability variable. The tolerance is a definite value determined uniquely to each parameter as a maximum of allowable production errors, and has a single value for a single parameter. The allotted error is an error which is initially allocated to a single selected parameter or a few selected parameters. The allocated error is a single value to the selected parameter. The rest of the parameters have no allotted error.

This invention assumes a plurality of error-allotted states $S_1$, $S_2$, $S_3$, . . . which include one parameter (or two or three parameters) allotted with an allotted error. The error which is positively given to the parameter is called an allotted error for discriminating the production error. The state including the parameters having the allotted error is called an error-allotted state. The original state $S_0$ without the allotted-error is called a non-error state. The sum $E = \Sigma w_k E_k$ of the weighted merit functions is called a unified or integrated merit function.

FIG. 12 shows the flow of the method of the present invention. State $S_0$ is the non-error state. $E_0$ is the merit function of state $S_0$. State $S_1$ is a state allocating a plus error $+\delta$ to a selected parameter $P_i$. $E_1$ is the merit function of the error-allotted state $S_1$. State $S_2$ is a state allocating a minus error $-\delta$ to the same selected parameter $P_i$. $E_2$ is the merit function of the error-allotted state $S_2$. $P_i$ is the selected parameter. The selected parameter $P_i$ takes different values $P_i$, $P_i+\delta$, and $P_i-\delta$ for three states $S_0$, $S_1$ and $S_2$. The other parameters $P_j(j \neq i)$ have a common value for $S_0$, $S_1$ and $S_2$. Instead of a single parameter, two or three parameters can be chosen as selected parameters for being allocated with errors. In the plural error-allocated parameters, extra states $S_3$, $S_4$ . . . and merit functions $E_3$, $E_4$, . . . should be taken into account for estimating solutions besides $S_1$ and $S_2$. The unified merit function $E = \Sigma w_k E_k$ can be obtained by determining the values of all variables, calculating wavefront aberration or ray aberration, calculating the merit functions $E_0$, $E_1$, $E_2$ . . . and summing $w_0 E_0$, $w_1 E_1$, $w_2 E_2$, . . . up to the unified merit function. The merit function can be calculated by determining a set of variables. The next step is minimizing the merit function E. A set of values of variables corresponds to a value of the merit function. The set of variables which give the smallest value to the merit function is sought. The set of variables which realizes the minimum merit function should be taken as an optimum solution. This is the minimizing calculation (optimization). The minimum of the merit function finally determines the set of optimum variables. In practice, the minimizing process can be carried out by setting initial values of all variables, calculating aberration (wavefront aberration or ray aberration) at all relevant points and calculating the merit function again. If the merit function is reduced by the change of the variable, the change of the variable is adopted (accepted). If the change of the variable enhances the merit function, the change of the variable is abandoned (rejected). The reduction of the merit function determines the direction of the change of variables. The smallest merit function is sought by changing all the available variables in succession.

When optimum values of variables are determined by minimizing the merit function, the result is further estimated. The estimated result includes the performance analysis and the tolerance analysis (tolerancing). Since this invention initially gives allotted-errors to some parameter, the error-allotted parameter will allow wide tolerance. The large tolerance ensures easy manufacture of the product. The large tolerance enhances the productivity and lowers the production cost.

This invention assumes error-allotted states which include errors for some parameters, calculates merit functions of the error-allotted states, adds the merit functions of the error-allotted states to a merit function for a non-error state for making an integrated merit function and minimizes the integrated merit function for determining optimum parameters. It is preferable to produce the error-allotted states to the parameters which require large tolerances. FIG. 29 demonstrates the DOE design of the present invention. State $S_0$ is an ideal non-error state free from errors. $E_0$ is a merit function for $S_0$. $S_1$ is an error-allotted state which supplies a selected parameter $P_i$ with $+\delta_i$ a priori. $E_1$ is a merit function of $S_1$. $S_2$ is an error-allotted state which allocates the parameter $P_i$ with $-\delta_i$. $E_2$ is a merit function of $S_2$. In addition, other states $S_3$, $S_4$ . . . can be produced as error-allotted states which yield another parameter $P_j$ with $\pm\delta_j$. Instead of allotting $\pm\delta$ to the same parameter, errors $+\delta_j$, $-\delta_k$ can be allotted to different parameters of $P_j$ and $P_k$. The design of the present invention creates merit functions $E_1$, $E_2$, $E_3$, $E_4$, . . . of error-allotted states in addition to a merit function $E_0$ of a non-error state $S_0$, produces an integrated merit function E by summing up the merit functions $E_1$, $E_2$ . . . together with $E_0$, minimizes the integrated merit function and determines a set of optimum parameters. The inclusion of error-allotted merit functions characterizes this invention.

In FIG. 29, the uppermost rectangles show a non-error state $S_0$, an error-allotted state $S_1$ giving $P_i$ with $+\delta_i$, another error-allotted state $S_2$ supplying $P_i$ with $-\delta_i$ and so on. These states have merit functions $E_0$, $E_1$, $E_2$, . . . An integrated merit function E can be made from the individual merit functions by multiplying weights $w_k$ by $E_k$ and summing up $w_k E_k$.

$$E = \sum_k W_k E_k. \tag{18}$$

Minimization of the integrated merit function gives a solution of optimum parameters. Except for the use of the integrated merit function, this invention takes similar steps to prior methods. The DOE design includes the repeated steps of assuming initial values of parameters, calculating the merit function, altering phases, calculating the merit function, comparing the current merit function with the most recent one, and accepting the phase alteration when the merit function falls in value but rejecting the phase alteration when the merit function value rises, for minimizing the integrated merit function. The minimum merit function gives a solution of optimum parameters. Then, the solution is examined to determine whether the solution satisfies the requirements of performance and tolerances, as shown in FIG. 28. Thus, this invention implements a novel step of minimizing the merit function in FIG. 28. Instead of $E_0$ of the non-error merit function, this invention takes account of error-allotted merit functions $E_1$, $E_2$, . . . . The gist of the present invention resides in the replacement of $E_0$ by $\Sigma w_k E_k$.

This invention seeks an optimum set of lens parameters by making a non-error allotted ordinary merit function $E_0$, making some error-allotted states allocating errors to some parameters, producing an integrated merit function $E=E_0+E_1+E_2+E_3+$ . . . by summing up the merit functions, calculating the integrated merit function by changing parameters, minimizing the integrated merit function and determining the optimum parameters which minimize the integrated merit function. The tolerances for the parameters for which $\pm\delta$ errors have been allotted are enhanced. The large tolerance alleviates the difficulty of production of the lens system.

This invention seeks the most suitable phase distribution of a DOE by considering error-allotted states, making merit functions for the error-allotted states, producing an integrated merit function including the error-allotted merit functions, and minimizing the integrated merit function. Taking account of the error-allotted states enables the optimization calculation to make large tolerances for the parameters which have been considered into the integrated merit function. Large tolerances increase the feasibility of the production of DOEs.

BRIEF DESCRIPTION OF THE DRAWINGS

FIG. 14($b$) is a simplified section of two lens system for explaining the definition of "wedge error" which means the relative inclination of the front surface and the rear surface of a lens.

FIG. 15($b$) is sections of a lens surface showing the deviation of the surface in yz-plane. A solid line is an ideal curve. A dotted line is an actual curve.

FIG. 20 is a contour diagram of light intensity on the image plane made by the conventionally designed f-δ lens which minimizes only $E_0$ from the incidence of three sets of parallel beams shooting the lens at angles of 0, 8 and 16 degrees. The decenter error of 160 $\mu$m is given as a production error.

FIG. 21 is a contour diagram of light intensity on the image plane made by the f-θ lens which minimizes an integrated merit function $E_0+E_1+E_2$ . . . for the states allotting errors from the incidence of three sets of parallel beams shooting the lens at angles of 0, 8 and 16 degrees. That is also calculated with a 160 $\mu$m decenter as a production error as shown in FIG. 20.

FIG. 22 is a figure of a DOE (diffraction optical element) system including a DOE, a lens and an image plane for explaining the function of diffracting a plane wave and making diffraction pattern on the image plane.

FIG. 23 is a micro-cell pattern of a DOE which is a matrix including M horizontally aligning cells and N vertically aligning cells. The cells take binary heights. The higher step correspond to phase $\phi_{mn}=\pi$. The lower step corresponds to phase $\phi_{mn}=0$.

DETAILED DESCRIPTION OF THE PREFERRED EMBODIMENTS

Figure 1:
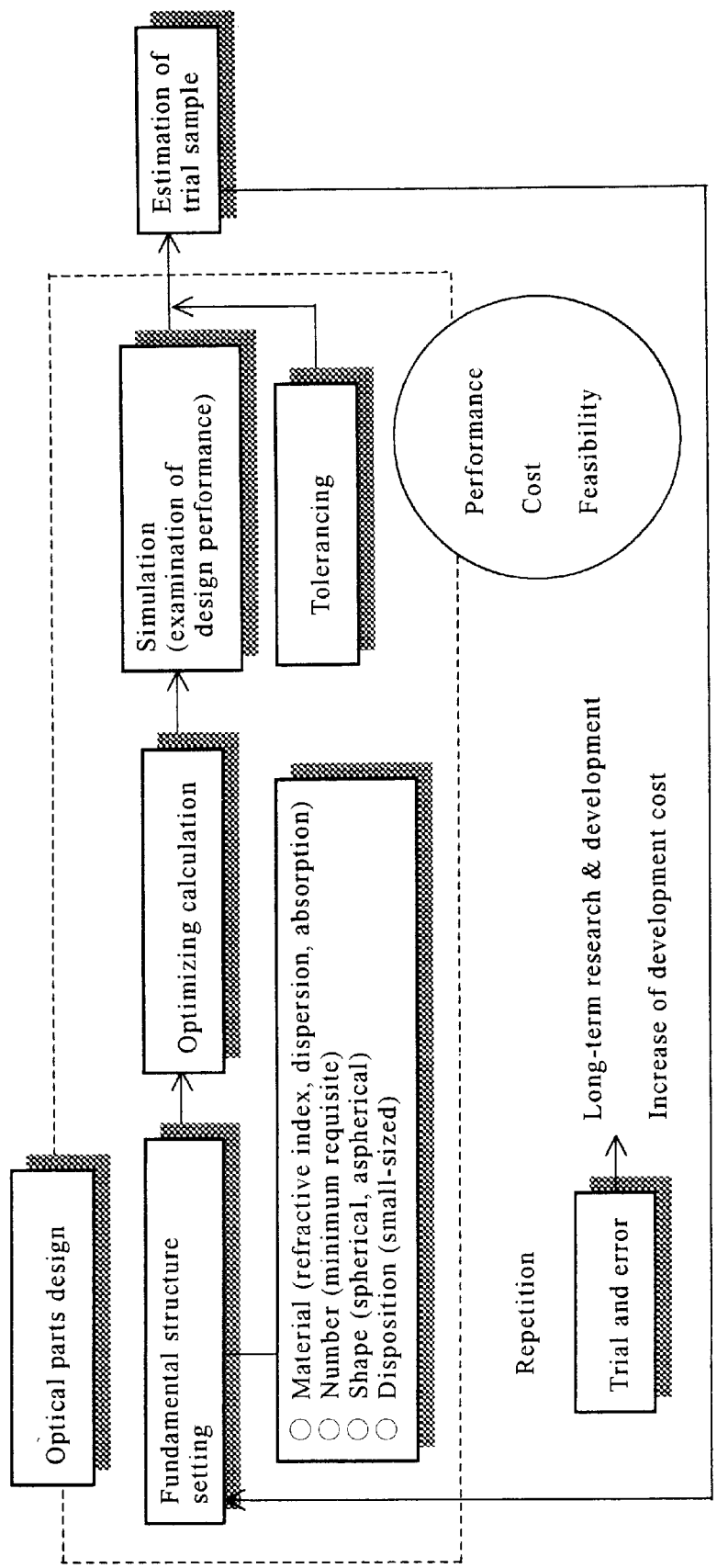
FIG. 1 is a schematic view showing the processes of designing a lens system.
Figure 2:
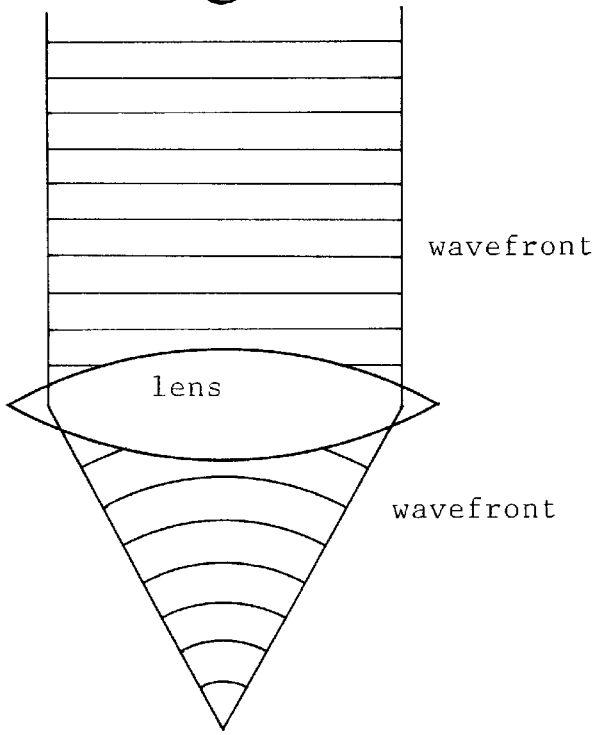
FIG. 2 is a sectional view of a lens system having a lens which converts a plane wave to an ideal spherical wave with ideal wavefronts.
Figure 3:
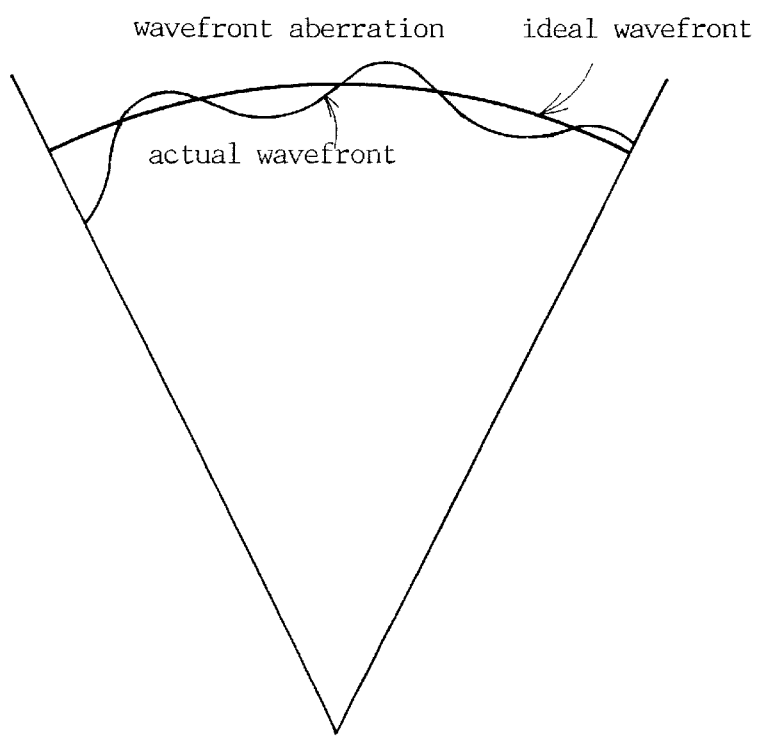
FIG. 3 is an explanatory view showing that the wavefront aberration is the deviation of the actual wavefronts from the ideal wavefronts.

This invention designs a lens or an optical part by applying an error to some relevant ones of parameters, calculating a merit function for the state including the allotted error, deriving a unified merit function by summing a non-error merit function and a number of error-allotted merit functions and producing the solution of minimizing the unified merit function. The solution will, in general, have a wide tolerance of the selected parameter. The wide, large tolerance facilitates the production of the lens or the optical part. Easy production is the result of large tolerance which is brought about from the initial allotment of an error to a relevant parameter. The major interest of the present invention is facilitation of production through an enhancement of tolerance. An error should be allotted to a parameter which would be suffering from too narrow a tolerance assigned by prior design. Other parameters than the one selected may have rather a narrower tolerance than prior design.

(1) Pertinent candidates of error-allotted parameters for a lens are, for example, as follows, curvature or curvature radii of both surfaces of a lens aspherical coefficients of an aspherical lens surface accuracy (surface irregularity) of a lens central thickness of a lens distance between neighboring lenses refractive index of a lens fluctuation(inhomogeneity) of refractive index of a lens wedge of a lens tilt of a lens decenter of a lens The above are candidates for error-allotted parameters of a lens. If the object optical part includes mirrors or other devices in addition to the lens, the parameters of the mirrors or the other devices can be candidates for the error-allotted parameters. One or two should be selected as error-allotted parameters from the candidates. A good choice is to select such a parameter which would have a small tolerance and would require high precision.

(2) The value of the allotted-error δ should be determined by considering the required precision. The allotted-error should be larger than the ordinary production errors. Production errors inherently signify accidentally appearing error accompanying the production. Here, the production error means the average of production errors or the standard deviation (e.g. σ or 2σ). If a small error is allotted to a parameter for making states $S_1$ or $S_2$, the tolerance would not increase so much. Small allotted-errors suppress dispersion of the error, and tolerance is not enhanced. Large allotted-error has a role of widening the tolerance, but too large an allotted-error pulls up the value of the unified merit function through large differences among $S_0$, $S_1$, $S_2$. . . . It is important to select a pertinent value of an allotted error δ.

(3) All the variables are supplied with some initial values. The initial values are not the values (solution) which satisfy all the optical equations but the values which partially satisfy the optical equations There are many candidates of sets of initial values. The optimum solution itself depends upon the determination of the set of initial values. Namely, the initial values restrict the scope of the optimum solution which is a set of pertinent values of variables. Thus "optimum" solution has only a relative importance, since it is not unique but contingent on the initial values. There are as many optimum solutions as sets of initial values. Variables are changed by small amounts from the initial values in the directions which lower the merit function. A decrease of the merit function is the guide force teaching preferable directions of changes of variables. Repetitions of changes of variables lead to a minimum of the merit function. Minimization of the merit function which gives an optimum set of solutions is called minimizing processing (optimization).

If the minimizing processing cannot reduce the unified merit function to a sufficient extent, either the designed performance is primitive or the relevant tolerance is still too narrow. An insufficient reduction of the merit function is caused by a bad choice of the set of initial values of variables. This fact can be known by checking the ratios of states in the integrated merit function. A partial contribution is given by $W_k E_k/E$ for the k-th state $S_k$ (k=0, 1,2, . . . ). When $W_0 E_0/E$ is still large, the performance is insufficient. When $W_0 E_0/E$ is small, tolerances are not large yet. What gives the largest contribution to the integrated merit function is the parameter which has still too small tolerance. In this case, the initial setting should be changed. The previous set of initial values should be replaced by another set of initial values. The minimizing processing should be carried out by changing the variables from the initial values bit by bit in the direction of decreasing the unified merit function.

When the changes of initial values fail in reduction of the unified merit function, the initial setting should be altered by slightly decreasing the allotted-error δ. For the smaller allotted-error, the minimization processing should be carried upon the merit function. In the meantime, some cases cannot lead to widening of tolerances even by the present invention. This invention is not always able to enhance tolerances. This invention neither deny nor defy the established optics or optical phenomena. More sophisticated lenses or other optical parts will lead to more narrow tolerances. This invention tries to seek optimum solutions which make the manufacturing easier by alleviating the restriction brought about by narrow tolerances.

(4) When the unified merit function includes many error-allotted states $S_k$ (the total number K of the error-allotted states $S_1$, $S_2$, . . . , and $S_K$ is twice of the total number I of error-allotted parameters $P_1$, $P_2$, . . . , $P_I$(2I=K)), the unified merit function grows complicated. The multi-allotted-errors consume a far longer time for minimizing the merit function than the single allotted error. A long minimization processing would yield an optimum solution having wide tolerances for the plural relevant parameters. However, when long calculation is undesirable, the error-allotment should be restricted to only the parameter, the tolerance of which is especially difficult to observe in production. A decrease in the number of parameters allotted with an error will shorten the calculation time through the reduction of the error-allotted states. Namely, only the parameter for which tolerance is hardest to observe should be chosen as the error-allotted parameter.

Two error-allotted states ($-\delta$ and $+\delta$) have been assigned to a single allotted error $\delta$ of a parameter hitherto. An alternative is useful for widening tolerances of plural parameters without increasing the number of error-allotted states. The alternative applies two different errors in a single error-allotted state. For example, an error-allotted state $S_1$ may include an error $+\delta_i$ for the i-th parameter $P_i$ and another error $+\delta_j$ for the j-th parameter $P_j$. Another state $S_2$ contains an error $-\delta_i$ for $P_i$ and another error $-\delta_j$ for $P_j$. Namely, two error-allotted states are $S_1(+\delta_i,+\delta_j)$ and $S_2(-\delta_i,-\delta_j)$. Two error-allotted states can represent two kinds of errors for widening the tolerances for two parameters. The alternative omits compensating states $(+\delta_i,-\delta_j)$ and $(-\delta_i,+\delta_j)$. The half-cut of the states should shorten the calculation time about by half In the abridged case, attention should be paid to pairing of parameters allotted with errors and to affixing of plus or minus sign for avoiding the cancellation of the influences of the allotment of errors to the pairing parameters.

Such a compensation of errors sometimes accompanies the choice of error-allotted parameters. For example, if a state allots an error to a thickness of a lens and allots another error to the thickness of another lens, the influences of the allotted errors would sometimes cancel each other. In this case, minimization of the integrated merit function would not accomplish wide tolerances due to the cancellation. Similar inconveniences would happen for the couples of error-allotted parameters between a curvature and a thickness between a refractive index and a curvature. In these cases, it is preferable to reinforce the influences of the allotted errors by changing the signs of the allotted errors for avoiding the cancellation. Sometimes choices of allotted errors belonging to different symmetry groups are efficient for solving the problem of the mutual cancellation among allotted errors. For example, an axially-symmetric error, e.g., curvature, thickness and refractive index should preferably be coupled with a non-axially symmetric error, e.g., decenter, tilt, wedge and so on.

(5) The guideline of tolerance analysis is some aberration, optical path difference at all points on an image plane or some performance. For example, the candidates of the guideline are ①wavefront aberration, ②beam aberration ③MTF value, ④distortion aberration, ⑤f-θ linearity, ⑥focal length.

Among them, the f-θ linearity ⑤ is a special performance which is available only for a f-θ lens. The wavefront aberration ① produces a general guideline which provides, for example, that the increment of the wavefront aberration due to the increase of errors should be less than $\lambda/100$ ($\lambda$:wavelength) at all points on an image plane. Pertinent critical values should be predetermined for ② to ⑥, when one of ② to ⑥ is selected as the guideline. The tolerance of a parameter is defined as a deviation from the standard value of the parameter which just gives the critical values of the guideline.

Figure 4:
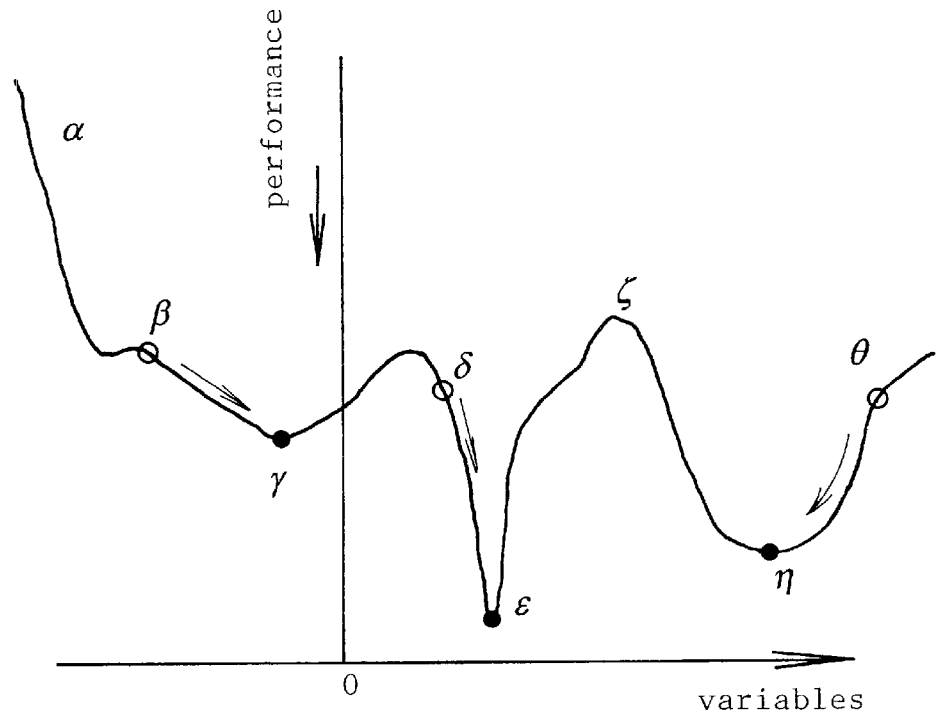
FIG. 4 is a graph showing the relation between the performance and the variables which indicates that a small change of a variable sometimes induces a strong change of performance but a big change of another variable other times raises a small change of performance.
Figure 5:
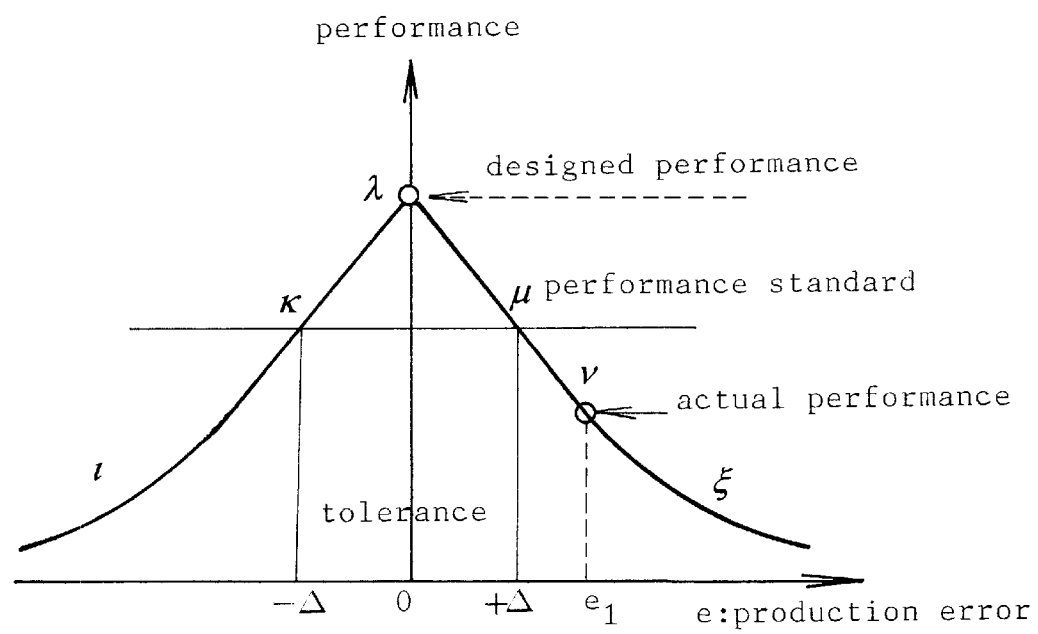
FIG. 5 is a graph of the relation between the production error and the performance for explaining the definition of a tolerance which is an error causing the fall of performance down to the minimum standard of performance.
Figure 6:
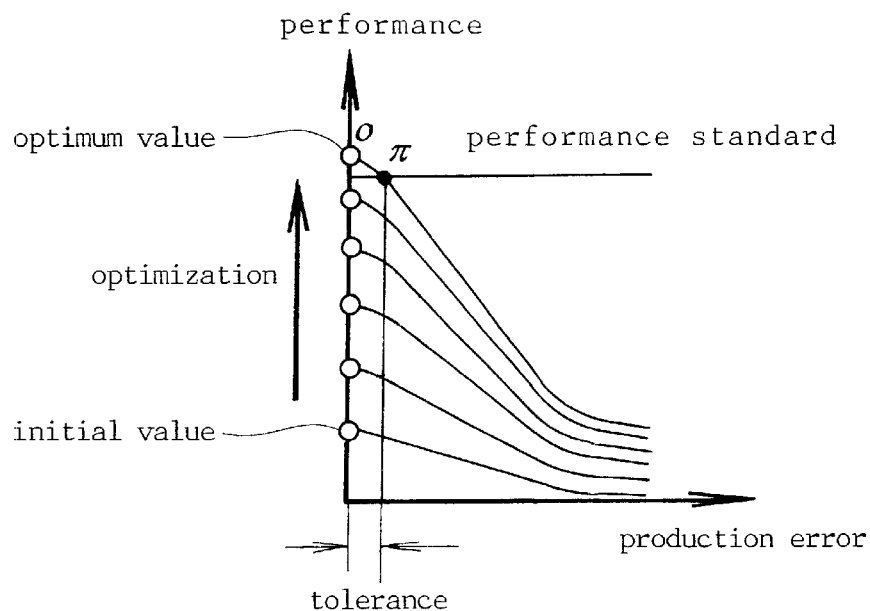
FIG. 6 is a graph of the conventional relation between the production error and the performance which is suffering from a narrow tolerance because the prior method determines parameters by minimizing only $E_0$ without allotting errors.

FIG. 6 shows a conventional design by minimizing the merit function. The abscissa signifies a production error of some parameter, the ordinate signifies performance. Round dots on the ordinate mean performance without production error for different sets of values of parameters. The lowest curve is the error-performance relation for some set of given initial values of parameters which bring about a large merit function. The initial values yield low performance. Then parameters will be changed in the direction of lowering the merit function and enhancing performance. The next lowest curve yields performance for another set of values of parameters which slightly lower the merit function. The third lowest curve denotes the performance for another set of values which further reduce the merit function. The upward arrow shows the direction of optimizing processing which lifts the error-performance curve upward. The optimizing processing is also shown by arrows in FIG. 4. The upward displacement of the error-performance curves in FIG. 6 corresponds to the movement shown by the arrows in FIG. 4. The uppermost curve yields an optimum solution (set of parameters) which minimizes the merit function $E_0$. Point o means the performance of the optimum solution without production error. Point $\pi$ means the lowest allowable performance. Errors between point o and point $\pi$ are allowable. Thus, o $\pi$ is determined as the tolerance for the parameter. However, since the optimized curve falls rapidly in proportion to the production error e, the parameter which has an error less than o $\pi$ realizes the product which satisfies the requirement of the guideline. A small deviation beyond point $\pi$ degrades the performance below the allowable standard. The drawback is the narrowness of the tolerance $\Delta$. The narrow tolerance increases the difficulty of production.

Figure 7:
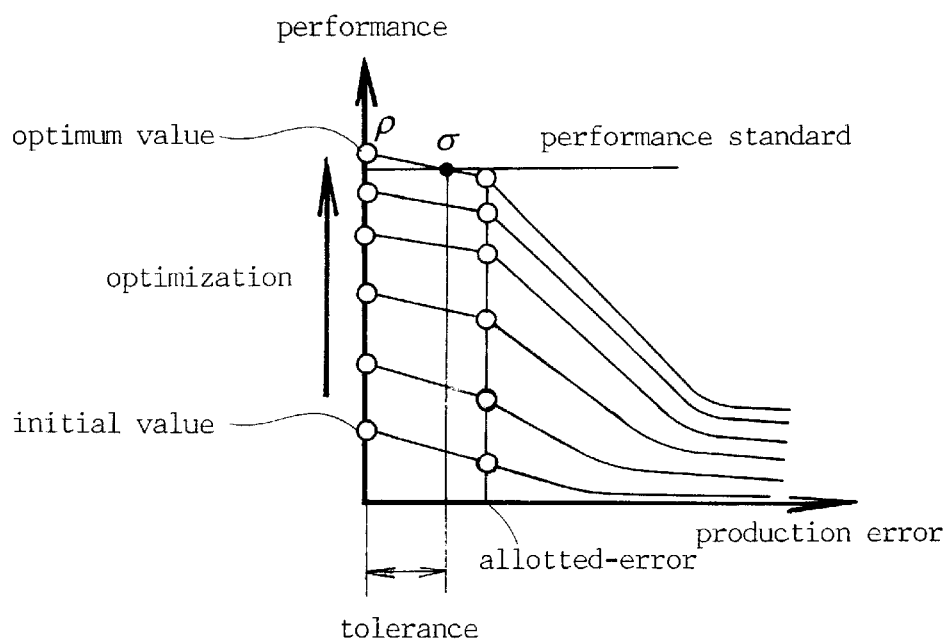
FIG. 7 is a graph of the invention relation between the production error and the performance which is endowed with a wide tolerance because this invention determines parameters by minimizing an integrated merit function including the merit functions for the states allot errors to some parameters positively.

FIG. 7 explains the design of the present invention which minimizes the unified merit function including error-allotted merit functions. The abscissa is the production error of a parameter; the ordinate is performance. The lowest curve shows an error-performance relation for a set of initial values of the parameters which yield a merit function of large value. The second lowest curve corresponds to a set of parameters attained from the initial values by decreasing the value of the unified merit function. The third lowest curve shows the error-performance relation for a set of parameters which further reduces the value of the merit function. The upward arrows denotes such an optimization processing. The uppermost curve is an optimum error-performance curve. Point $\rho$ is the highest performance point without production error. The decrease by the production error in FIG. 7 is smaller than FIG. 6, because the merit function includes error-allotted merit functions $E_1$, $E_2$ or so. Point $\sigma$ is the lowest limit which satisfies the requirements. The tolerance is the error between point $\rho$ and point $\sigma$. Wide tolerance ensures facile manufacture.

There are many parameters for determining a lens system or an optical part. Only parameter $P_i$ among many parameters is allotted with errors $\pm\delta$. State $S_1$ is the state allotting an error $+\delta$ to the selected parameter a priori. State $S_2$ is the state allotting the same parameter with another error $-\delta$. The unified merit function includes $E_1$ of state $S_1$. When the unified merit function E is minimized, $E_1$ will decrease also, because $E_1$ is included in the unified merit function E. Namely, the minimized E bears such a solution which reduces also $E_1$. Establishment of a small $E_1$ means the selection of the set of parameters which prevents the performance from degrading for an error $+\delta$ of the relevant parameter. Thus, the solution will have a wide tolerance for the relevant parameter. This is only an intuitive explanation of a large tolerance by the preliminary allotment of errors $\pm\delta$ by the present invention. The Inventors cannot give a rigorous proof yet, because a lens system contains numerous parameters which have various influences upon the optical equations. In general, the tolerance for the relevant parameter will be enlarged. However, processing is indifferent for tolerances of other parameters. It cannot be predicted whether each parameter other than the relevant one would have a larger tolerance or smaller tolerance. The changes of the tolerances of other parameters are not known unless an actual calculation is done.

Some of the tolerances of other parameters increase, some of the tolerances of other parameters decrease and the others do not change. The parameters which increase the tolerances or keep the same values of tolerances induce no problem. Further, a small decline of tolerances which have originally big values invites no problem on production also. What induces a problem is the parameters which decrease their tolerances by the present invention. If some other parameters are suffering from declines of tolerances, this inventions should choose the parameters as error-allotted parameters. If a smaller tolerance appears to some other parameter, the difficulty should be solved by adding a state allotting an error also to the parameter, making a new unified merit function including the additional state and minimizing the new unified merit function.

Figure 30:
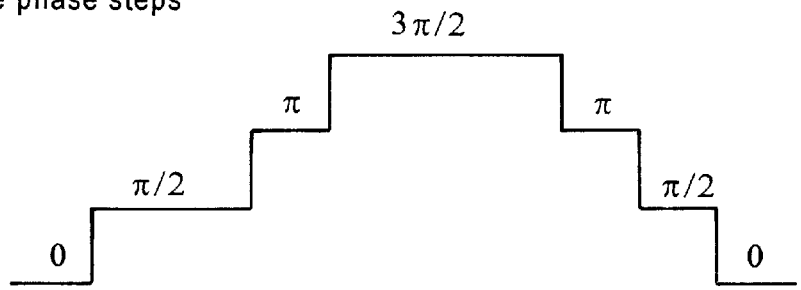
FIG. 30 is a section of a DOE of the quadruple step type.
Figure 31:
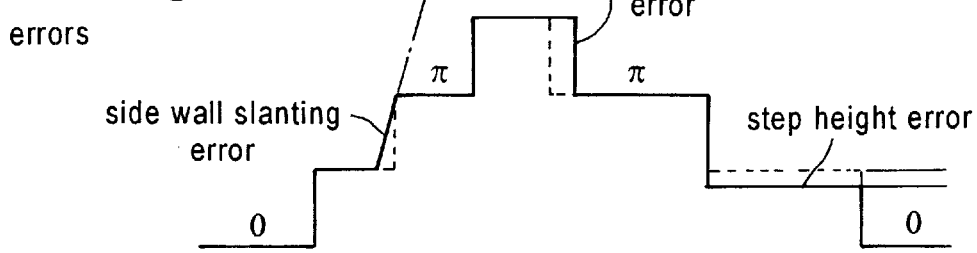
FIG. 31 is a section of the quadruple step type DOE including a step height error, a step width error and the side wall slanting error.
Figure 32:
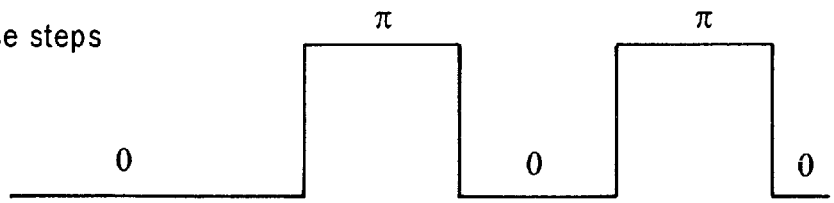
FIG. 32 is a section of a DOE of the binary step type.
Figure 33:
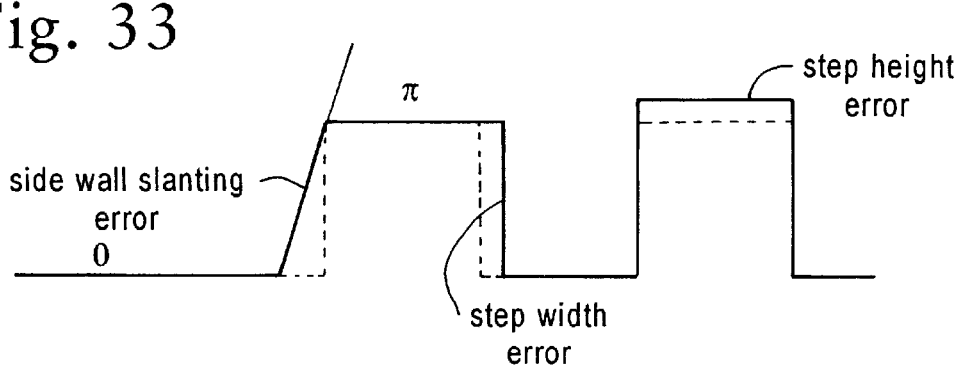
FIG. 33 is a section of the binary step type DOE including a step height error, a step width error and the side wall slanting error.

The error-allotted state is now explained. FIG. 30 to FIG. 33 show normal phase step cases and error-including phase step cases. FIG. 32 denotes a normal binary phase step case having two phases of 0 and $\pi$. FIG. 30 is a normal quadruple phase step case including four phases of 0, $\pi/2$, $\pi$ and $3\pi/2$. FIG. 33 exemplifies kinds of errors in the binary step case. FIG. 31 shows kinds of errors in the quadruple case. There are a step height error, a step width error and a side inclination error. Any type of errors takes an ideal, non-error state and an error-allotted state. The simplest error is the step height error.

In the binary case, the difference between the $\pi$ step and the 0 step should be $\lambda/2(n-1)$. Prior art method used to take only the precise step of $\lambda/2(n-1)$. This invention contemplates, for example, a step of $1.05\lambda/2(n-1)$, $0.95\lambda/2(n-1)$ or $1.1\lambda/2(n-1)$ in to $\lambda/2(n-1)$.

The height-error-allotted states uniformly increase or decrease all the step heights included in the DOE by 10%, 5% or so. A similar definition can be applied to the four-step case or eight-step case. The height of the quadruple (four) case should be $\lambda/4(n-1)$. The step height deviates to $1.1\lambda/4(n-1)$, $0.9\lambda/4(n-1)$ or so for all the steps in the step-height-error-allotted state.

Another available error is the step height fluctuation. Although height fluctuation is more obscure than height error, height fluctuation can be clearly defined. Instead of a uniform change of phase, step heights are changed at random, up or down, at the normal height of $\lambda/2(n-1)$ in the binary case. The standard deviation a represents the degree of step height fluctuation. For example, a 5% step height fluctuation means that the step heights are dispersed randomly and the standard deviation is 5%. Unlike the height error, a height fluctuation error has a lot of states which have a common a but different distributions of heights. The standard deviation $\sigma$ cannot decide a state. It is possible, however, to produce a state having a definite $\sigma$ with random distributions of heights. In the case of height errors, symmetric error allotted states $S_1$ and $S_2$ are produced by allotting $\pm\delta$. Unlike height errors, height fluctuation errors are always positive, because there is no negative standard deviation.

A width error is shown in FIG. 31 and FIG. 33. The width of a cell deviates from an exact width. The width error is further divided into two kinds. One is uniform width errors; the other is random width errors. Uniform width errors mean that the steps of either $\pi$ or 0 have a uniform excess width. Symmetric error-allotted states can be defined by assigning uniform width errors $\pm\delta$. Random width error must be specified by the standard deviation $\sigma$. In this case, there are no symmetric error states.

FIG. 31 and FIG. 33 show side wall slanting error. A side wall should be vertical; however, some defects of etching may induce slopes on the side walls steps. The side wall slanting error can be specified by the slanting angle or the fluctuation. Like height error and width error, slanting error is also of two kinds. One is a uniform slanting error which can be defined by the slanting angle. The other is a random slanting error which can be specified by the standard deviation $\sigma$.

Figure 28:
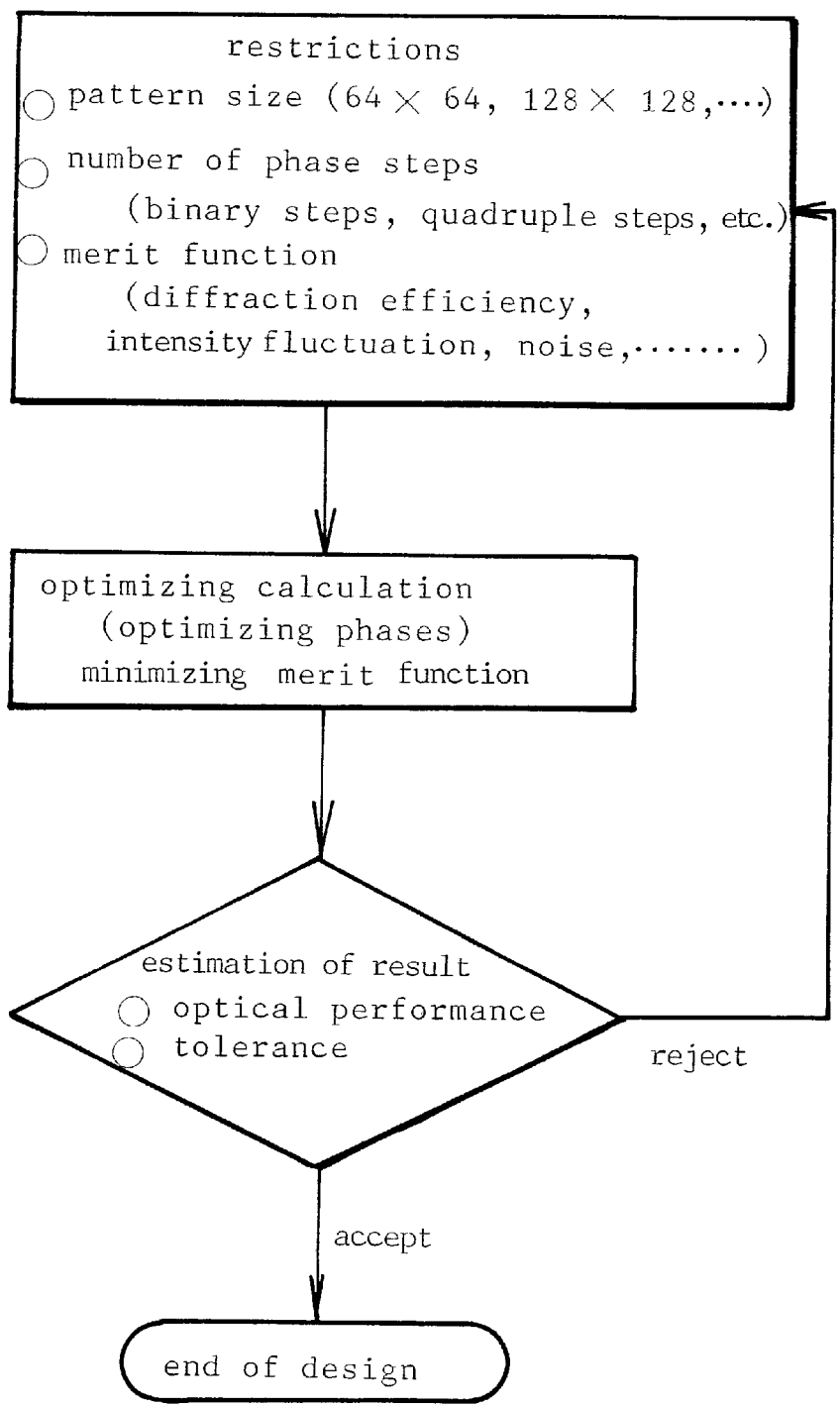
FIG. 28 is a schematic diagram for clarifying prior art DOE design.
Figure 29:
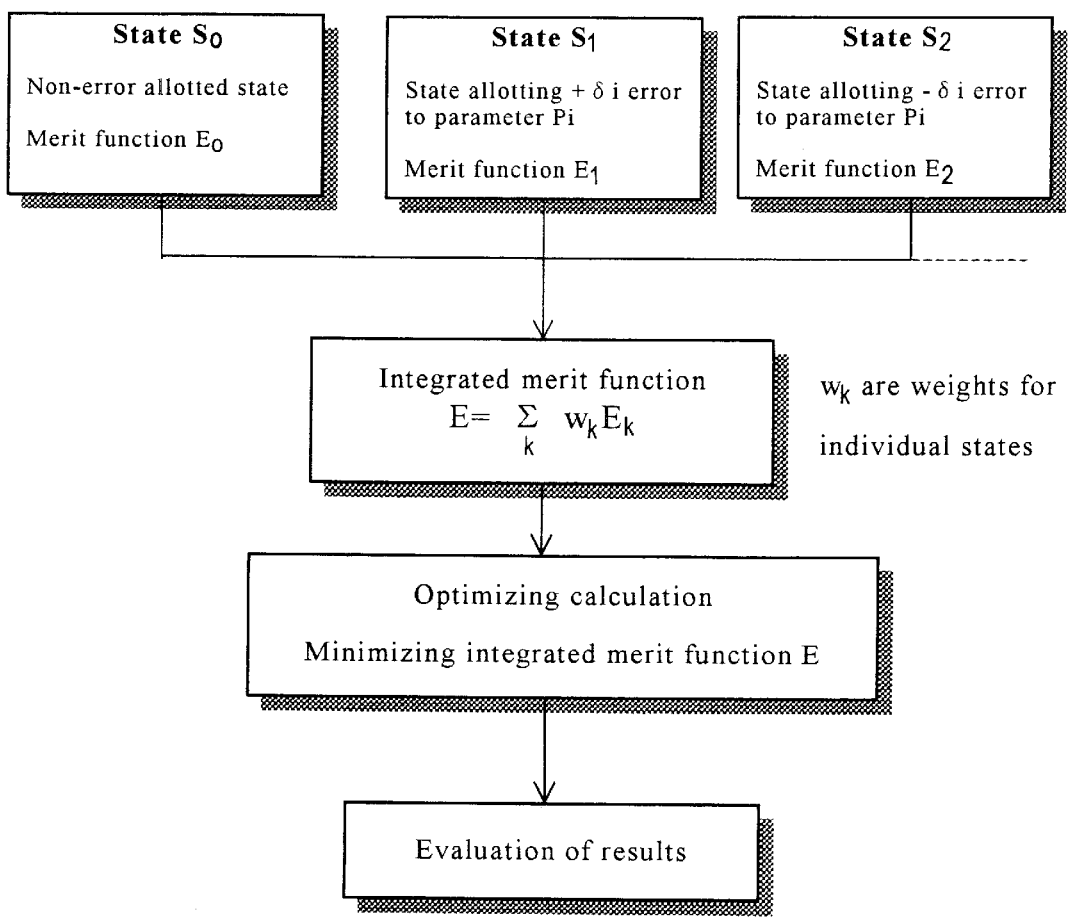
FIG. 29 is a schematic diagram for the DOE pattern design of the present invention.

The error-allotted states have been explained. The present invention adds the merit functions $E_1$, $E_2$, ... of the error-allotted states to the ordinary merit function $E_0$. What occurs by the inclusion of the error-allotted merit functions? This is another problem. The error-allotted merit functions would be of no use unless anything good happens. When errors are forcibly introduced into some states, the scope of allowable errors is enlarged. Namely, the tolerance for the allotted error will increase by the introduction of the error-allotted state. A larger tolerance decreases the difficulty of manufacturing of DOEs. Feasible manufacturing alleviates the production cost. In addition to the easy production, the allotment of errors increases the feasibility of design. The error-allotted states will reduce the number of repetitions of the cyclic steps of FIG. 28 by an early increase of tolerances.

This invention can be applied to any lens or mirror system. Here, the unified merit function method is applied to designing a f-$\theta$ lens. The example clarifies the present method of allotting errors $\pm\delta$ to various parameters, minimizing a unified merit function including $E_1$ and $E_2$, optimizing the parameters and obtaining a larger tolerance for the selected relevant parameter.

Design of a f-$\theta$ Lens (A) Initial Requirements of Designing a f-$\theta$ Lens number of lenses; two, material; ZnSe (refractive index n=2.403) first lens; first surface=aspherical; second surface=spherical second lens; first surface=spherical; second surface=aspherical wavelength 10.6 $\mu$m entrance pupil position 50 mm front before the first surface of the first lens F-number 6 incident angle 0°, 8°, 16°

Figure 18:
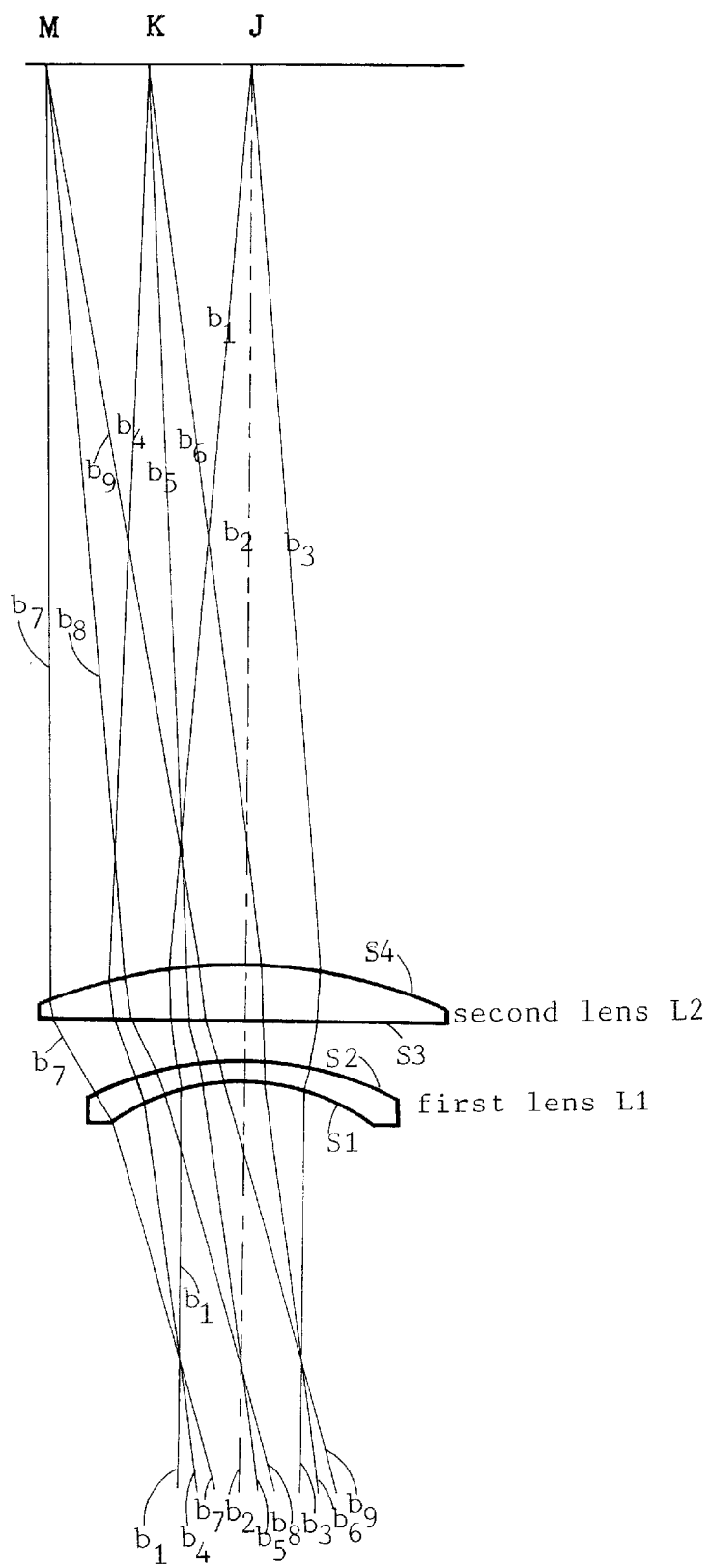
FIG. 18 is a simplified section of a f-θ lens system which converges three sets of parallel beam going into at angles of 0, 8 and 16 degrees at three different points on an image plane.

A f-$\theta$ lens is a lens for producing an image spot at a distance f$\theta$ from the center on the image plane for the beams impinging on the lens off-axis at an incident angle $\theta$. Conventional lenses may have a f-tan $\theta$ convergence property, and therefore the beams are converged at another point displaced by ftan $\theta$ from the center instead of f$\theta$. FIG. 18 shows the disposition of the f-$\theta$ lens which contains a first lens L1 and a second lens L2. When parallel rays penetrate the first lens with a certain incident angle, the rays leaving the second lens converge at a point displaced by f$\theta$ from the center on the image plane. For example, parallel rays $b_1$, $b_2$ and $b_3$ with an orthogonal incidence $\theta=0°$ converge at point J just along the axis on the image plane which is a focal plane in this case. Parallel $\theta=8°$ rays $b_4$, $b_5$ and $b_6$ converge at point K which is displaced by 8×L from the center on the image plane (L is a constant). $\theta=16°$ rays $b_7$, $b_8$ and $b_9$ converge at point M which is displaced from the center by 16×L. Although FIG. 18 draws three rays for each incidence, an indefinite number of parallel rays of an incidence $\theta$ actually converge at a point displaced by f$\theta$ from the center.

(B) Selection of Variables

Variables are curvature radii of two planes of two lenses (four variables), thicknesses and distances of the lenses, aspherical coefficients of the aspherical surfaces and a position of the image plane. The system has two lenses and a lens has two surfaces. Thus, four curvature radii are variables. The thicknesses are two variables for two lenses L1 and L2. Distances mean distance between a light source and the first lens, distance between the first lens and the second lens and distance between the second lens and the image plane. The second surface of L1 and the first surface of L2 are spherical surfaces which are simply determined by the curvature radii. Since the first surface of L1 and the second surface of L2 are aspherical, two sets of aspherical coefficients are also variables.

$$Z = \frac{cr^2}{1 + \sqrt{1 - (1+k)c^2r^2}} + \sum \alpha_j r^{2j} \qquad (19)$$

The aspherical coefficients contain a conic constant k and coefficients for radius r to even number power. The vertex curvature is denoted by "c". When α should take, for example, radius r to the fourth power, r to the sixth power, r to the eighth power and r to the tenth power ($r^4$, $r^6$, $r^8$ and $r^{10}$), α means four variables. Since there are many variables, it is important to examine the validity of variables through the merit function.

(C) Additional Condition focal length f=127 mm. lens thicknesses larger than 3.5 mm but smaller than 15 mm.

(D) Parameters Available for Allotting Errors

1. Decenter . . . deviation of the lens axis from the optical axis.
2. Tilt . . . inclination of a lens
3. Curvature radii . . . curvature radii of the front and rear surfaces of a lens.
4. Aspherical coefficients . . . aspherical coefficients of the lernses
5. Surface distortion . . . distortion of the front and rear surfaces
6. Refractive index . . . deviation of refractive index of the ZnSe lens from the determined value
7. Non-uniformity of refractive index . . . local fluctuation of refractive index of ZnSe
8. Wedge One or more than one parameter should be selected as an error-allotted parameter. For example, if decenter is chosen as an error-allotted parameter, the unified merit function is made by summing the merit function $E_0$ of a no decenter case, the merit function $E_1$ for the case of allotted decenter of +δ and the merit function $E_2$ of the case of an allotted decenter of −δ with some weights $w_0$, $w_1$ and $w_2$. Then the parameters should be changed for reducing the unified merit function E.

$$E = w_0 E_0 + w_1 E_1 + w_2 E_2. \qquad (20)$$

The weights $w_0$, $w_1$ and $w_2$ can be optionally selected.

For example, if we assume $w_0=w_1=w_2=1$, the unified merit function E is given by $$E = E_0 + E_1 + E_2. \qquad (21)$$

The size of the allotted decenter error±δ should be determined by considering the desired production precision. The allotted error should be greater than the production error.

In addition to allotting the decenter error, it is further possible to allot an error to another parameter. For example, a pair of errors of ±1% can be allotted to the curvature of the first surface of the first lens. The allotment of the curvature errors yields new states $S_3$ and $S_4$. The new states produce additional merit functions $E_3$ and $E_4$. Then, we obtain five merit functions $E_0$, $E_1$, $E_2$, $E_3$ and $E_4$. In this case, a set of parameters which minimize the sum of five merit functions should be sought. When the tolerances of decenter and the curvature of the first surface of the first lens are calculated from the optimum set of parameters, these tolerances turn out to be larger than the tolerances determined only for minimizing $E_0$ of $S_0$. These larger tolerances ensure easier production.

The merit function, for example, adopts ray aberration. Of course, another aberration, e.g., wavefront aberration can be taken as the merit function. An ideal convex lens should converge all rays emanating from a point on a single point (image point). When a lens has aberration, rays emanating from a point do not converge on a single point but disperse on the image plane. The distance between the arrival point and the ideal image point of an individual ray is called a ray deviation (transverse ray aberation). The merit function based on the ray aberration is defined as the sum of all the squares of the ray deviations (transverse ray aberation).

Figure 19:
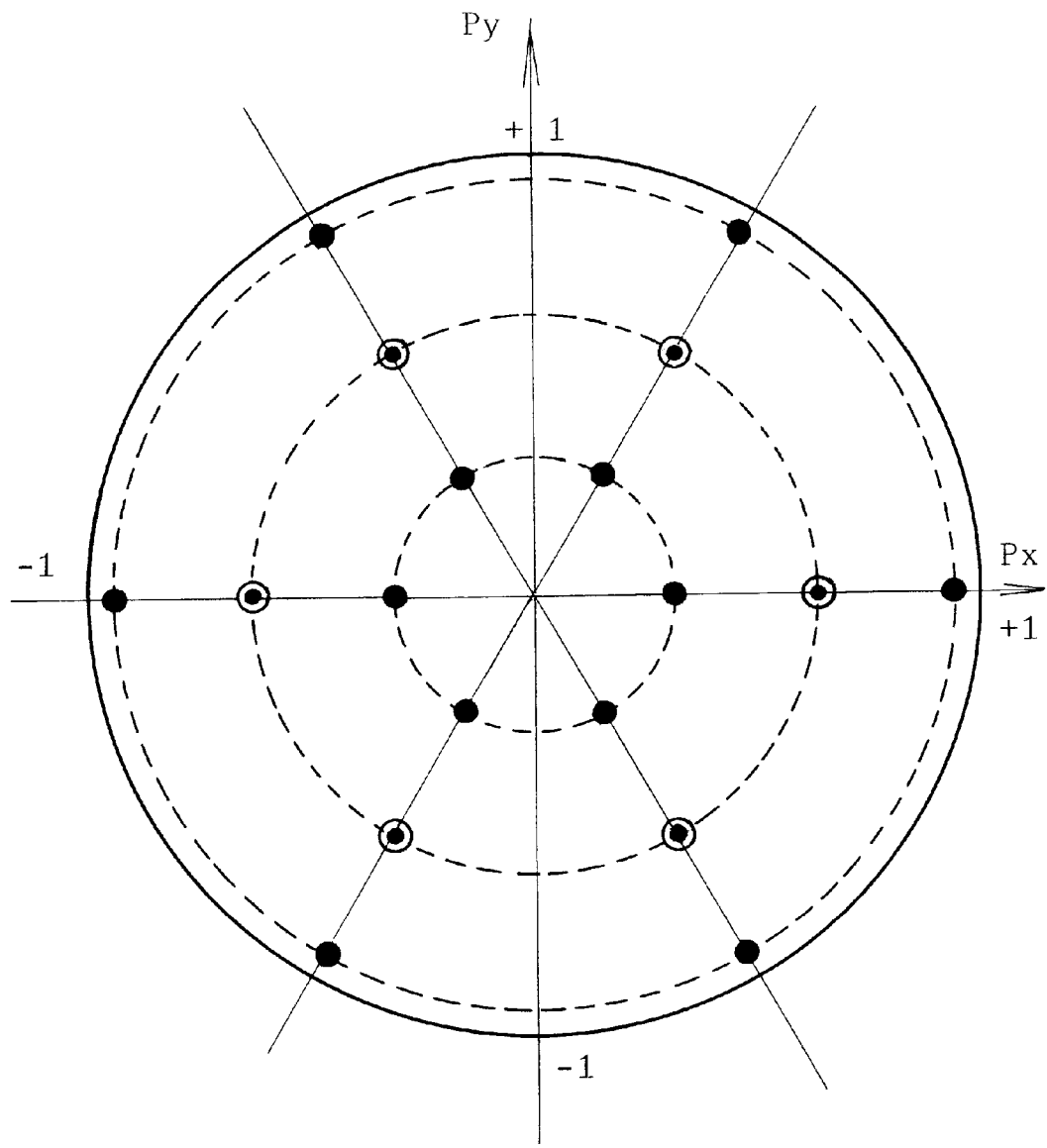
FIG. 19 is a plan view of an entrance pupil taking 18 sample rays for the f-θ lens example.
Figure 24:
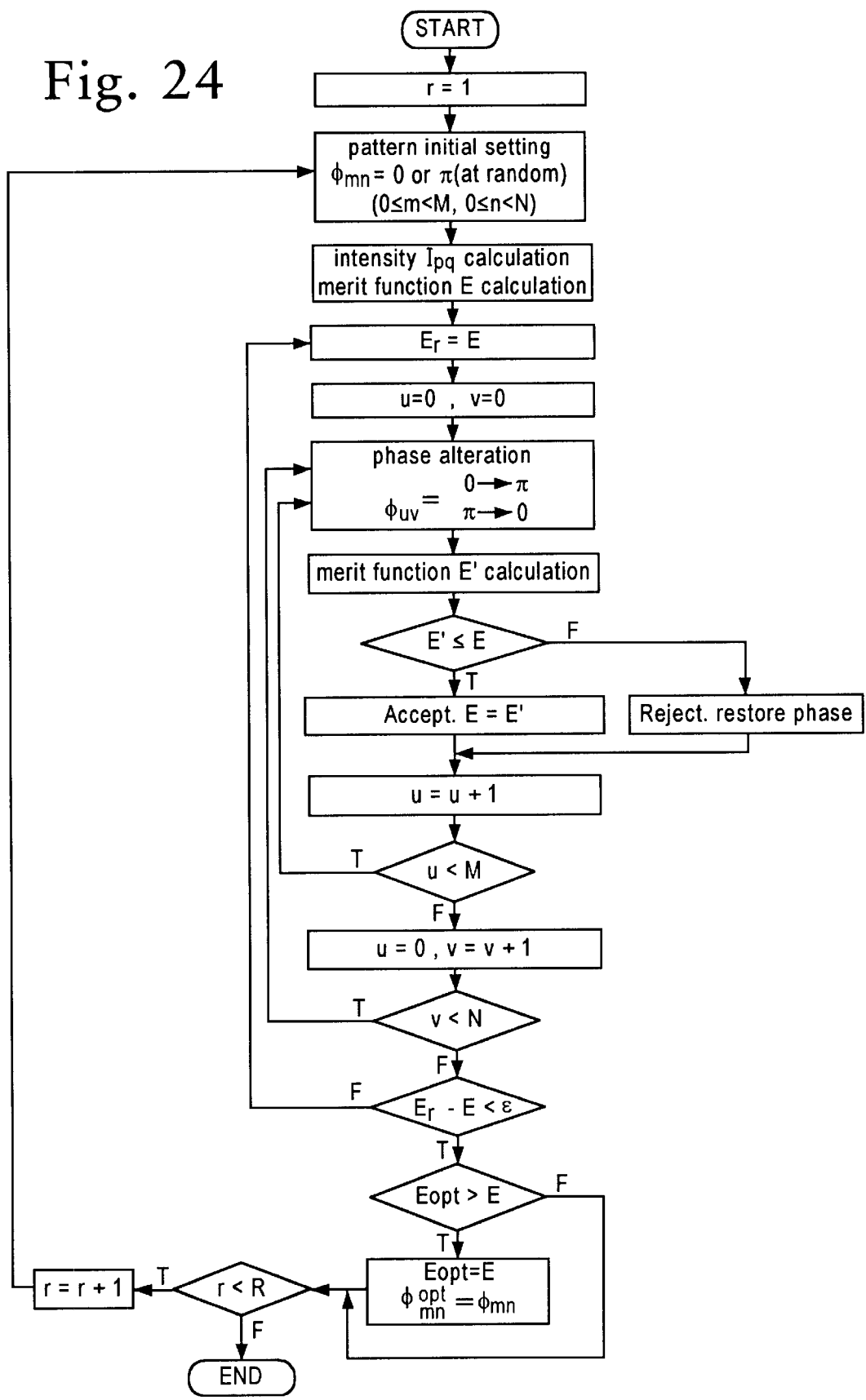
FIG. 24 is a diagram of the steps of designing prior art DOEs.

FIG. 19 shows an example of the distribution of rays on an entrance pupil (of the lens).

The entrance pupil is equivalent to a section of rays which go into a lens. It is allowable to take an arbitrary number of test rays at arbitrary points ($P_x$, $P_y$) on the entrance pupil for calculation or measurement. Enhancement of accuracy of the calculation may require many more test rays populated densely on the entrance pupil. Excessive test rays will complicate and delay the calculation. Not too many test rays are desirable for reducing the amount of calculation and facilitating optimization. The example of FIG. 19 takes 18 rays at 18 points on the entrance pupil. The example draws 6 half lines expanding from the center of the pupil in directions of angles of 0, 60, 120, 180, 240 and 300 degrees to the x-axis and encircles three concentric circles. The three circles have radii R of R=0.3357, 0.7071, and 0.9420. The six half lines and the three circles make 18 cross points. 18 beams at the cross points are taken as sample rays for calculation. The weights of the rays are $w_j$=0.048481 for the 6 innermost black points and the 6 outermost black points and $w_j$=0.07757 for the 6 middle half-black points.

The tracing of all the rays in the lens and the space yields the deviations Δx and Δy on the image plane. Here, Δx and Δy are the x-component and the y-component of the deviation of the rays from the non-error points on the image plane. The beam number is denoted by "j" (j=1,2,3, . . . , 18). The incident difference of the angles are denoted by "f" (f=1,2,3). The suffixes f=1, 2 and 3 mean the incident angles 0 degree, 8 degrees and 16 degrees respectively. The merit function for a definite state is built up by multiplying the ray weights $w_j$ and the angle weights $w_f$ to the squares $\Delta x_{fj}^2 + \Delta y_{fj}^2$ of the deviations. If a plurality of wavelengths are included, the deviations should be further multiplied by other weights. The merit function $E_k$ for the state $S_k$ (k=0,1,2, . . . ) is:

$$E_k = \Sigma\Sigma w_f w_j (\Delta x_{fj}^2 + y_{fj}^2) \qquad (22)$$

This formula gives the merit functions $E_0$, $E_1$, $E_2$, ... for $S_0$, $S_2$, $S_3$, . . . The invention produces a unified merit function E by summing up the non-error state $S_0$ and the error-allotted states $S_1$, $S_2$ and $S_3$ with state weights $w_k$.

$$E = \Sigma w_k E_k = \Sigma\Sigma\Sigma w_k w_f w_j (\Delta x_{kfj}^2 + \Delta y_{kfj}^2) \qquad (23)$$

The parameters should be changed for minimizing the unified merit function E. The minimized merit function will produce the optimum set of parameters.

The above merit function is able to estimate the convergence property of the lens. However, in addition to the convergence property, the design of the f-θ lens requires an estimation on the linearity of the f-θ relation. Unfortunately, the merit function of Eq. (22) cannot estimate the linearity of the f-θ relation of the f-θ lens, since the merit function employs ray deviations on the image plane. For the case of the f-θ lens, the merit function should be used to estimate further the linearity between f and θ.

For example, when parallel beams enter the f-θ lens in incident angles 0 degree, 8 degrees and 16 degrees, the focal points $h_J$ (for 0 degree), $h_K$ (for 8 degrees) and $h_M$ (for 16 degrees) can be calculated on the ray tracing. Since 16 degrees are just twice as large as 8 degrees, an ideal f-θ linearity shall give $2h_K = h_M$. Then, the additional merit function $E_L$ for estimating the f-θ linearity is given by $$E_L = (2h_K - h_M)^2 \qquad (24)$$

Minimizing the sum of Eq. (23) and Eq. (24) gives the optimum set of parameters which can reduce the deviations of rays on the image plane and can realize the best f-θ linearity. More detailed estimation of the f-θ linearity would be attained by increasing the number of incident angles to more than three and applying more than one equation like Eq. (24).

Besides the beam deviations and the f-θ linearity, the merit function can include error estimation of other restrictions, for example, the focus or the thickness of the lens. For instance, the restriction that the focal length (f) of the lens should be 127 mm can be contained in the merit function by an additional merit function;

$$e_1 = (f - 127)^2 \qquad (25)$$

For instance, when the thickness (t) of the lens is determined in a scope from 3.5 mm to 15 mm, the merit function should contain an additional part;

$$e_2 = \alpha(t-3.5)^2 + \beta(t-15)^2. \qquad (26)$$

Here, the first coefficient α should be α=0 for t>3.5 mm and should be α=1 for t≦3.5 mm. Similarly, the second coefficient β should be β=0 for t<15 mm and β=1 for t>15 mm. Thus, the additional merit function $e_2$ is zero for t in the range of 3.5 mm≦t≦15 mm. Beyond the range of t(t<3.5 mm or t>15 mm), the additional merit function assumes positive values. The positive value will guide $e_2$ to zero (3.5 mm≦t≦15 mm) in the process of minimizing the total merit function. Therefore, all the restrictions can be embodied into additional merit functions $e_c(e_1, e_2, e_3, \ldots)$. A total merit function for restriction $E_c$ can be obtained by multiplying weights $w_c$ and summing all the partial restriction merit functions.

$$E_c = \Sigma w_c e_c \qquad (27)$$

An integrated merit function is built up by summing the individual merit functions Eq. (23), Eq. (24) and Eq. (27) with weights. The integrated merit function E is given by;

$$E = w_A \Sigma w_k E_k + w_L E + w_c E_c. \qquad (28)$$

The weights $w_A$, $w_L$ and $w_c$ should be chosen for balancing the merit functions $\Sigma w_k E_k$, $E_L$, and $E_C$. In this case, we assume here, for example, $w_A = w_L = w_C = 1$. Then the integrated merit function E is written as $$E = \Sigma w_k E_k + E_L + E_c. \qquad (29)$$

The optimum parameters are determined by minimizing the integrated merit function E. The parameters will give optimum conditions not only for the ray aberration but also for the f-θ linearity and other restrictions.

Figure 8:
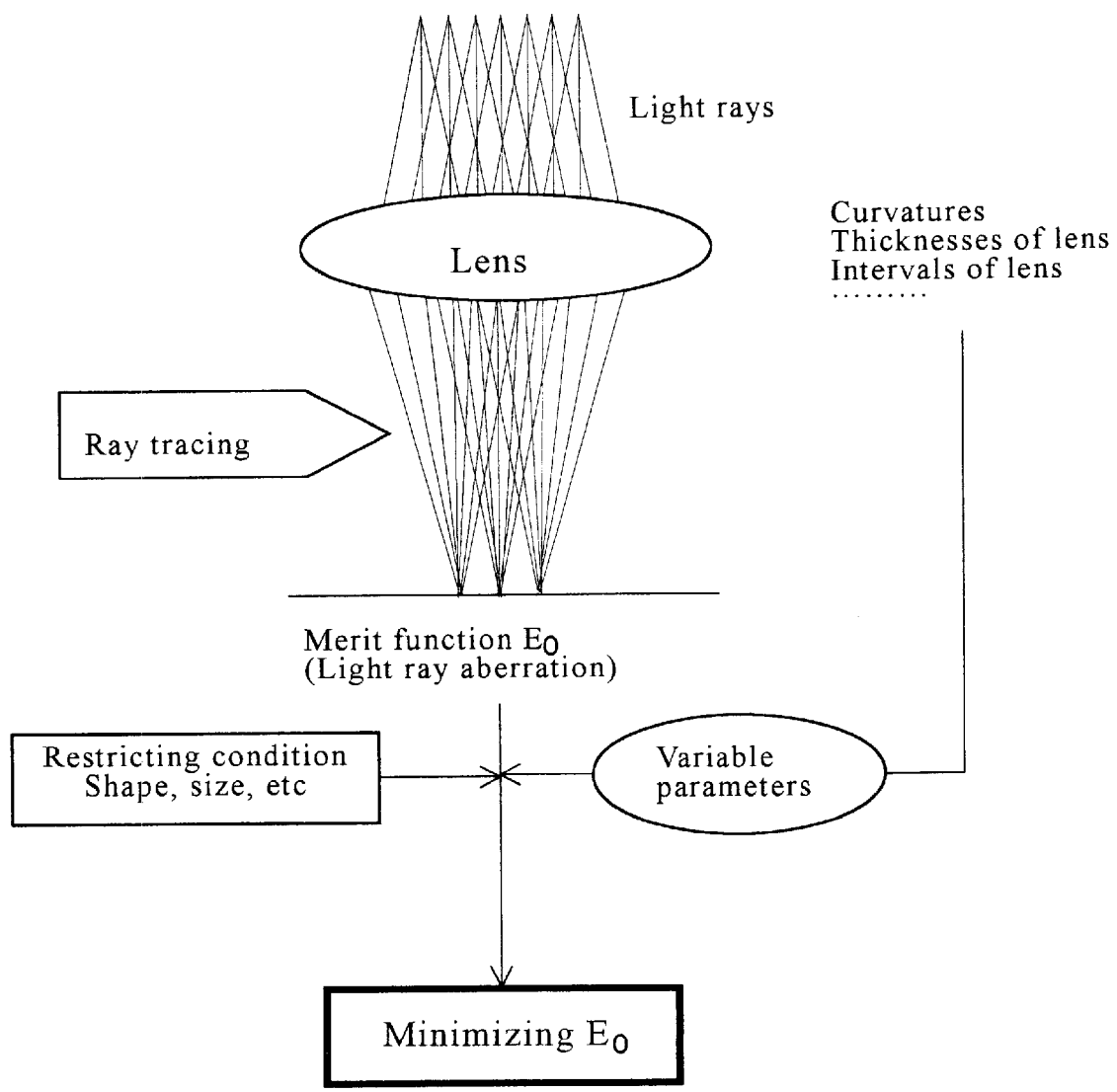
FIG. 8 is a schematic diagram explaining the conventional design of a lens system which determines the parameters by minimizing a non-error allotted merit function $E_0$.

First of all, the optimum design of $S_0$ (non-error-allotted state) is done according to the conventional method for comparing the invention method with the conventional method. The merit function is $E = E_O + E_L + E_C$. FIG. 8 shows the method of conventional design. The light source emits light rays. The light rays are deflected by a deflecting apparatus, for example, a polygon mirror, a galvanometer mirror into some inclination angles. The deflected rays go into a lens at a certain definite incident angle. The rays are converged by the lens on the image plane. Here, FIG. 8 shows three sets of deflected parallel beams. The number of the deflected sets is arbitrary. The variable parameters(or variables) are the curvatures, the thicknesses of lenses and so on. If the lens system includes more than one lens, the intervals between the neighboring lenses are also variable parameters. The variety of the shapes and the sizes of the lenses are restricted to within a certain range. The variable parameters of the lenses should be changed within the absolute restrictions. In this case, the merit functions are calculated in accordance with the conventional method without allotting curvature errors or decenter errors. The variable parameters are calculated by minimizing the merit function. The tolerances are also obtained from the parameters and the required performance.

FIG. 18 shows an example of a f-θ lens system having two lenses L1 and L2. The parameters are determined by minimizing the merit function without allotting errors. The parameters are listed in tables 1 and 2. The decenter tolerance is ±40 μm. The tolerance of the curvature radius $S_2$ of the first lens L1 is ±0.066%. Both tolerances are so small that it is difficult to make the desired lens having parameters within these tolerances.

Embodiment 1(Allotment of ±160 μm decenter errors)

Figure 9:
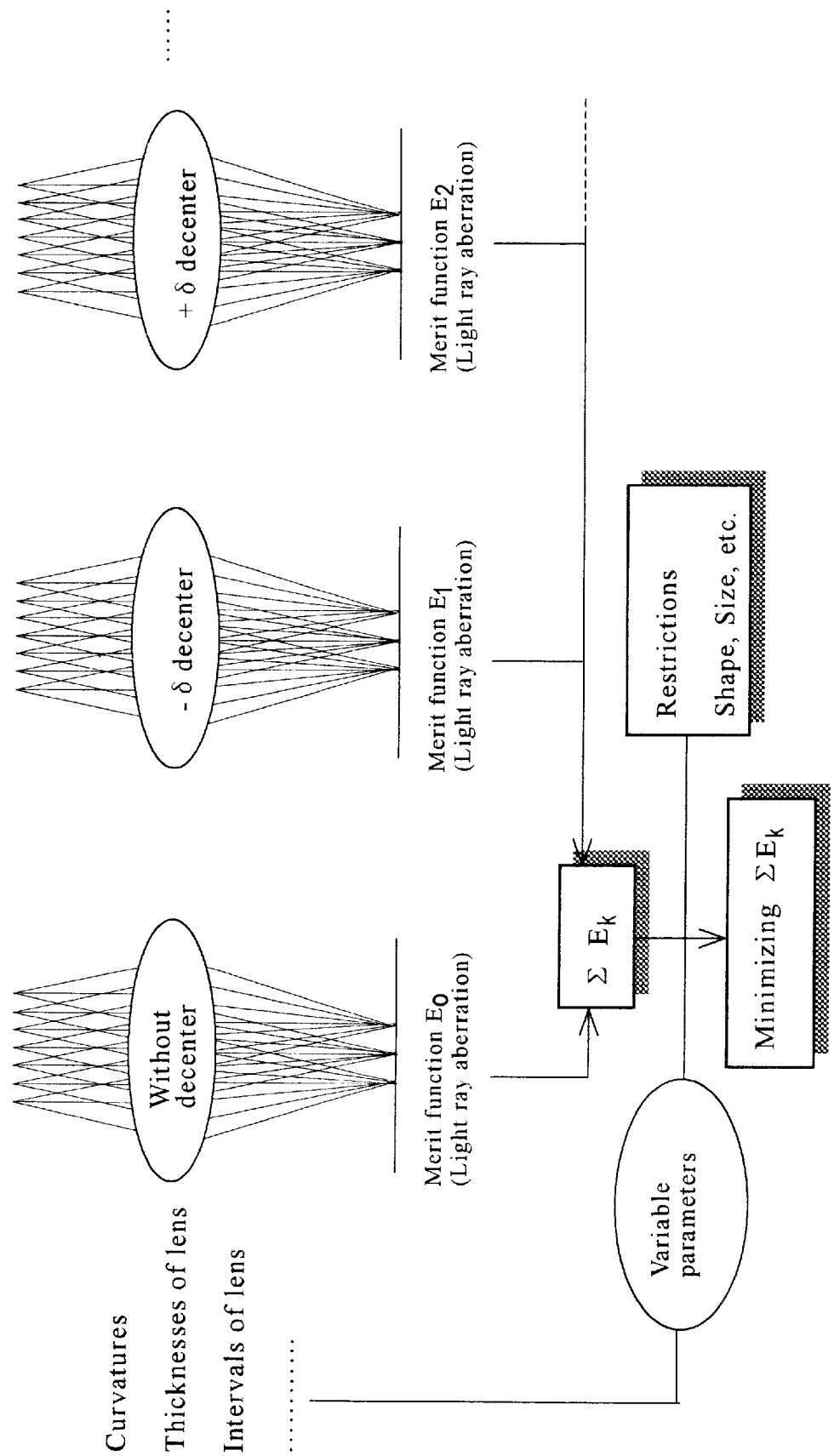
FIG. 9 is a schematic diagram explaining the present invention design which determines the parameters by minimizing an integrated merit function including the merit functions $E_1$, $E_2$, . . . of error-allotted states besides non-error allotted merit function $E_0$.
Figure 10:
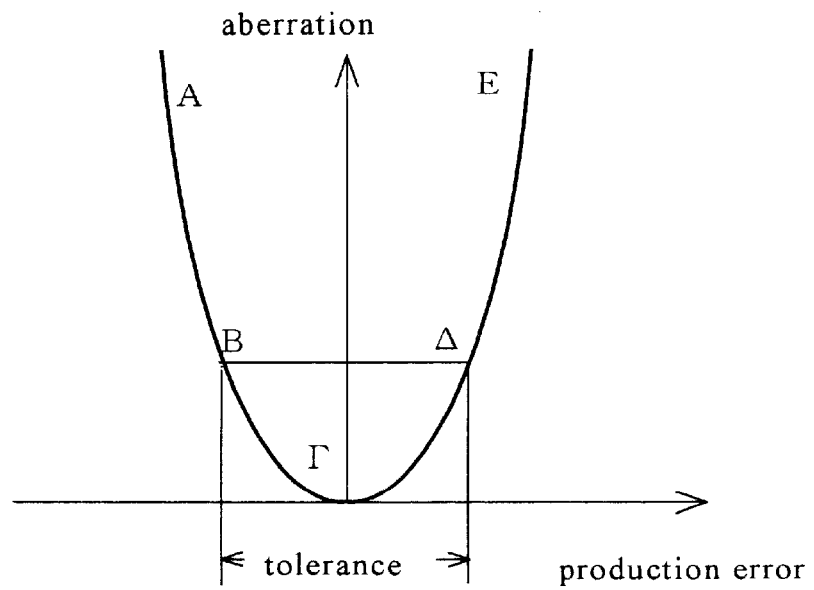
FIG. 10 is a simplified graph of the conventional relation between the production error and the aberration for clarifying that a rapid rise of aberration by a small production error results in a narrow tolerance in the prior method.
Figure 11:
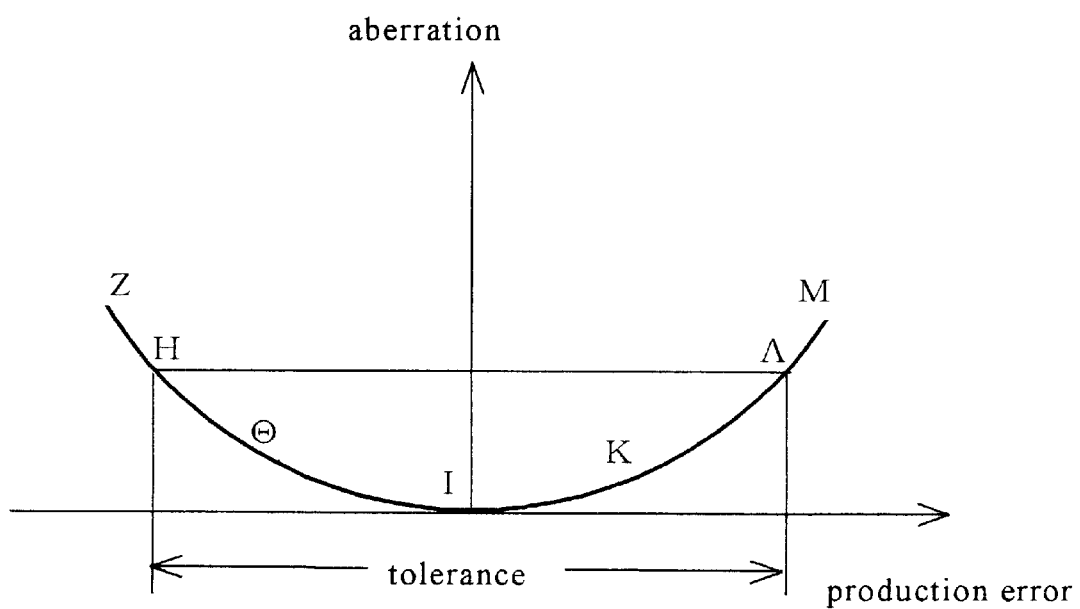
FIG. 11 is a simplified graph of the present invention relation between the production error and the aberration for explaining that slow increment of aberration realizes a large tolerance in this invention.
Figure 12:
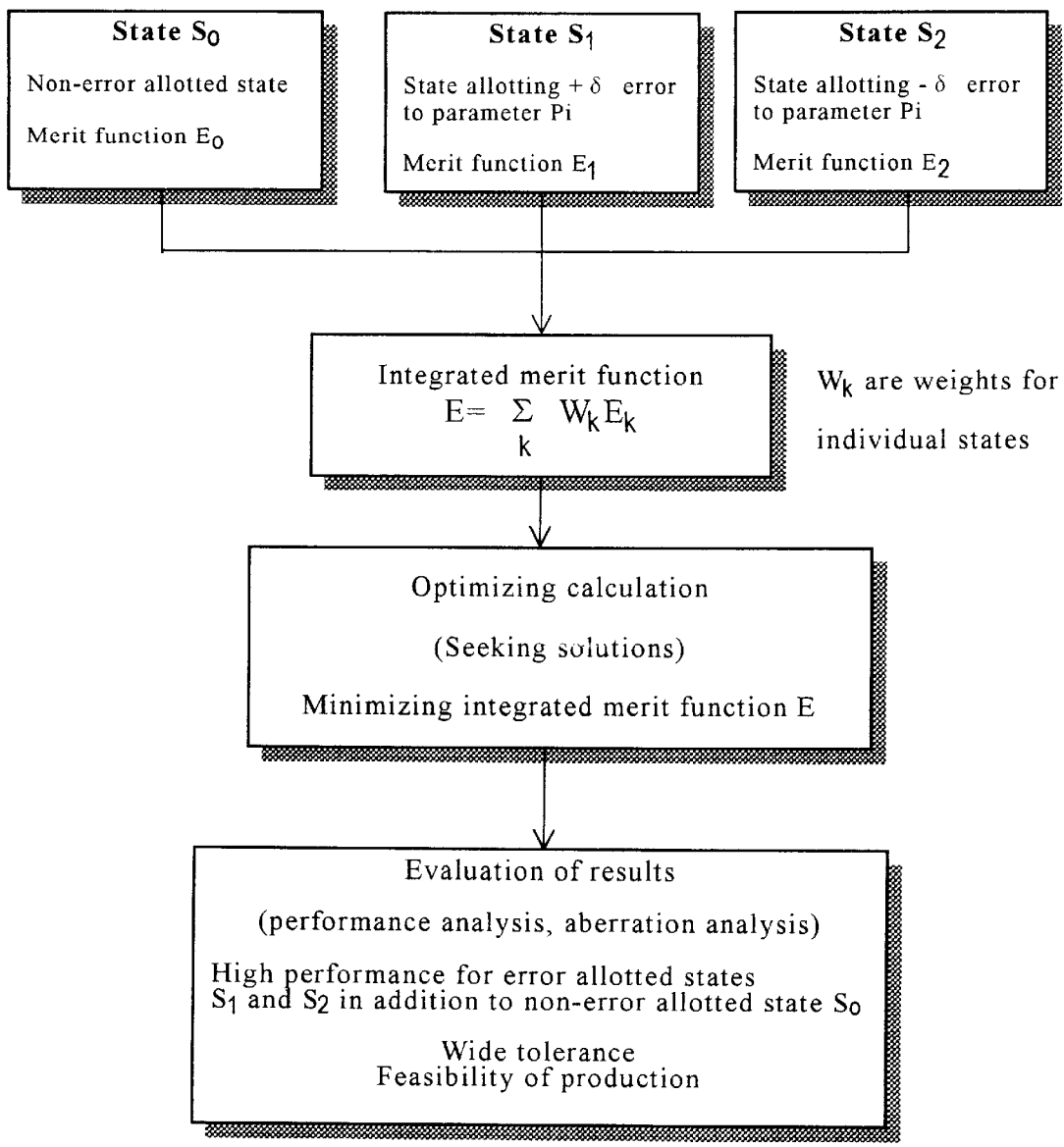
FIG. 12 is a diagram showing the processes of design of the present invention which employs merit functions $E_1$, $E_2$, . . . for the states $S_1$, $S_2$, . . . allotting errors to some parameters.
Figure 13:
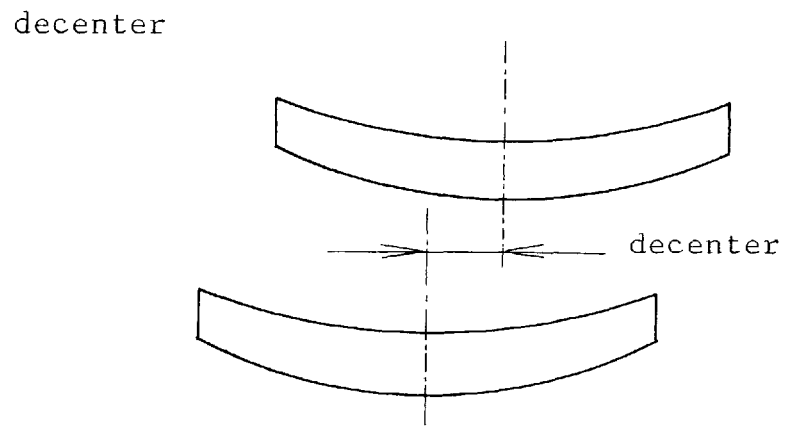
FIG. 13 is a simplified section of two lens system for clarifying the definition of "decenter error" which means the discrepancy between the central axes of the two lenses.

Instead of the conventional method, the same lens is now designed by employing the merit function of the present invention. The lens system contains two lenses as shown in FIG. 18. Embodiment 1 takes two decenter error allotted states $S_1$ and $S_2$ into account in addition to the decenterless state $S_0$. FIG. 9 shows the method of the design. The variable parameters of the optical system are curvatures of the front surface and the rear surface of the lenses, thicknesses of lenses, intervals between neighboring lenses, and so on. The left-most state shows the lens without allotting the decenter error. Three sets of deflected parallel beams from the light source are converged at three points on the image plane. The decenterless state $S_0$ has a merit function $E_0$ which employs ray aberations instead of wavefront errors.

The incident angles of the parallel beams are, for example, 0 degree, 8 degrees and 16 degrees to the lens. The sets of beams converge at point J(0 degrees), point K(8 degrees) and point M(16 degrees) in FIG. 18.

The middle state $S_1$ allots a decenter error of −160 μm (−δ=−160 μm) to the lens. The right-most state $S_2$ allots a symmetric decenter error of +160 μm (+δ=+160 μm) to the lens. The decenter states $S_1$ and $S_2$ have merit functions $E_1$ and $E_2$ which also take the ray aberrations on the image plane. The variables are changed within the scope determined by the given restrictions. The integrated merit function $E = E_0 + E_1 + E_2 + E_L + E_C$ ($w_k=1$ for k=0, 1, 2) is repeatedly calculated for tentative variables for seeking the optimum parameters which minimize the integrated merit function. Then, a set of variables which can minimize the integrated merit function are determined. The tolerance analysis gives the decenter tolerance of ±202 μm. The decenter tolerance ±202 μm is about five times larger than the conventional tolerance ±401 μm. The large tolerance makes the production far easier. Facile production improves performance also.

FIG. 20 is the beam intensity pattern (contour plot of point spread function) of a f-θ lens on an image plane for the optical parameters which have been determined by minimizing the conventional merit function without allotted error states but parameters in this calculation contain a 160 μm decenter error as a production error. Table 1 and Table 2 show the parameters for the lens system of the pattern of FIG. 20. FIG. 20 shows the beam intensity by contour lines. The lens system includes two lenses L1 and L2. The rear surface of the first lens L1 and the front surface of the second lens L2 are spherical having definite curvature radii. But the front surface of L1 and the rear surface of L2 are aspherical. The spherical data are shown in Table 1. The aspherical data are listed in Table 2. Since parallel beams go into the lens at angles 0, 8 and 16 degrees, converged beams make three point images.

TABLE 1

SPHERICAL LENS PARAMETERS (CONVENTIONAL)

| Lens No. | Surface No. | Curvature radius (mm) | Thickness, intervals (mm) | Refractive index |
|---|---|---|---|---|
| L1 | S1 | Table 2 | 4.228 | 2.403 |
|  | S2 | −64.058 | 6.389 |  |
| L2 | S3 | −548.067 | 13.973 | 2.403 |
|  | S4 | Table 2 | 162.722 |  |

TABLE 2

ASPHERICAL LENS PARAMETERS (CONVENTIONAL)

| Surface No. | 1/c (mm) | k | $\alpha_2$ | $\alpha_3$ | $\alpha_4$ | $\alpha_5$ |
|---|---|---|---|---|---|---|
| S1 | −35.661 | −1.234 | $-2.493 \times 10^{-6}$ | $-2.517 \times 10^{-10}$ | $3.056 \times 10^{-13}$ | $-1.154 \times 10^{-15}$ |
| S4 | −67.063 | −0.626 | $3.407 \times 10^{-7}$ | $3.776 \times 10^{-11}$ | $-1.691 \times 10^{-14}$ | $-3.797 \times 10^{-18}$ |

The converged spots have the strongest intensity at the centers. The intensity decreases at the peripheries. The beams having no inclination angle (0 degree) make a round peak with rotation symmetry. But the shape (profile) of the beam intensity inclining to the lens at 16 degrees is distorted into an ellipse. The elliptical distortion results from the production errors which bring about fatal influence due to the narrow tolerances. The decenter error, in particular, degrades the convergence of the inclining incidence beams of 16 degrees.

On the contrary, Table 3 and Table 4 show the parameters determined by minimizing the integrated merit function including $E_1$ (−160 μm decenter) and $E_2$ (+160 μm decenter) in compliance with the teaching of the present invention. FIG. 21 is the contour profiles of the converged beams by the optical system (FIG. 18) determined by the method of the present invention. That is also calculated with the 160 decenter error as a production error.

TABLE 3

SPHERICAL LENS PARAMETERS (EMBODIMENT 1)

| Lens No. | Surface No. | Curvature radius (mm) | Thickness, intervals (mm) | Refractive index |
|---|---|---|---|---|
| L1 | S1 | Table 4 | 4.755 | 2.403 |
|  | S2 | −73.006 | 7.211 |  |
| L2 | S3 | −282.315 | 12.951 | 2.403 |
|  | S4 | Table 4 | 163.241 |  |

TABLE 4

ASPHERICAL LENS PARAMETERS (EMBODIMENT 1)

| Surface No. | 1/c (mm) | k | $\alpha_2$ | $\alpha_3$ | $\alpha_4$ | $\alpha_5$ |
|---|---|---|---|---|---|---|
| S1 | −39.877 | −2.306 | $-4.698 \times 10^{-6}$ | $3.492 \times 10^{-10}$ | $-3.413 \times 10^{-13}$ | $-7.573 \times 10^{-16}$ |
| S4 | −63.627 | −0.242 | $1.239 \times 10^{-7}$ | $4.338 \times 10^{-11}$ | $2.666 \times 10^{-15}$ | $-4.085 \times 10^{-18}$ |

The lens system defined by the parameters determined by the present invention turns out to have a wide decenter tolerance of ±202 μm. The wide tolerance ensures facility of production. The contours in FIG. 21 show the excellence of the invention. Any contours of 0 degree, 8 degrees and 16 degrees exhibit concentric circles without deformation. The comparison of FIG. 21 with FIG. 20 indicates the superiority of the present invention.

Embodiment 2 (Allotment of ±160 μm Decenter Errors and +1% Curvature Radius Errors Embodiment 1 allotted only decenter errors of ±160 μm. Here, embodiment 2 allots further ±1% errors to the curvature radius of the first surface S1 of the first lens L1 besides the decenter errors of ±160 μm. The integrated merit function takes into account the states $S_1$(−160 μm decenter), $S_2$(+160 μm decenter), $S_3$(−1% curvature radius error) and $S_4$(+1 % curvature radius error) besides $S_0$(non-error allotment). The integrated merit function E is defined as $E = E_0 + E_1 + E_2 + E_3 + E_4 + E_L + E_C$. $E_L$ is the partial merit function for ensuring the f-θ linearity which is inherent only to the f-θ lens. $E_C$ includes the merit functions of other restrictions. $E_L$ and $E_C$ have been explained before.

TABLE 5

SPHERICAL LENS PARAMETERS (EMBODIMENT 2)

| Lens No. | Surface No. | Curvature radius (mm) | Thickness, intervals (mm) | Refractive index |
|---|---|---|---|---|
| L1 | S1 | Table 6 | 4.788 | 2.403 |
|  | S2 | −77.323 | 6.746 |  |
| L2 | S3 | −287.042 | 12.981 | 2.403 |
|  | S4 | Table 6 | 163.696 |  |

TABLE 6

ASPHERICAL LENS PARAMETERS (EMBODIMENT 2)

| Surface No. | 1/c (mm) | k | $\alpha_2$ | $\alpha_3$ | $\alpha_4$ | $\alpha_5$ |
|---|---|---|---|---|---|---|
| S1 | −40.189 | 0.013 | −2.338 × $10^{-7}$ | −3.330 × $10^{-11}$ | 3.449 × $10^{-13}$ | −7.662 × $10^{-16}$ |
| S4 | −62.100 | −0.756 | −1.574 × $10^{-7}$ | 1.876 × $10^{-11}$ | −7.220 × $10^{-16}$ | −5.573 × $10^{-18}$ |

A set of optimum parameters is determined by minimizing the integrated merit function. The solution gives ±0.770% to the tolerance of the first surface S1 of the first lens L1. The tolerance (±0.770%) is ten times larger than the previous tolerance (±0.066%) determined by considering only non-error allotted state $S_0$. The decenter tolerance results in ±180 μm. That is also larger than the result of the conventional design. The large tolerance alleviates the difficulty of production. This embodiment succeeds in enhancing the tolerance of decenter up to ±180 μm which are still far greater than ±40 μm of prior method.

Embodiment 3 (Hybrid Allotment of 160 μm Decenter Errors and ±1% Curvature Radius Errors)

Embodiment 2 employed four error-allotted states $S_1$, $S_2$, $S_3$ and $S_4$ which takes long time to calculate the merit function. Embodiment 3 aims at alleviating the burden of calculation. ±160 μm errors are allotted to the decenter and ±1% errors are allotted to the curvature radius of the first surface S1 of the first lens L1 like embodiment 2. Instead of four error-allotted states, embodiment 3 uses only two hybrid error-allotted states $S_1$(−160 μm, −1%) and $S_2$(+160 μm, +1%). The integrated merit function is built up for the error-allotted states $S_1$ and $S_2$ besides $S_0$. Minimizing the integrated function $E=E_0+E_1+E_2+E_L+E_C$ yields a set of optimum parameters. Table 7 and Table 8 indicate the parameters for embodiment 3.

TABLE 7

SPHERICAL LENS PARAMETERS (EMBODIMENT 3)

| Lens No. | Surface No. | Curvature radius (mm) | Thickness, intervals (mm) | Refractive index |
|---|---|---|---|---|
| L1 | S1 | Table 8 | 5.117 | 2.403 |
|    | S2 | −73.884 | 8.788 |  |
| L2 | S3 | −282.989 | 12.896 | 2.403 |
|    | S4 | Table 8 | 163.166 |  |

TABLE 8

ASPHERICAL LENS PARAMETERS (EMBODIMENT 3)

| Surface No. | 1/c (mm) | k | $\alpha_2$ | $\alpha_3$ | $\alpha_4$ | $\alpha_5$ |
|---|---|---|---|---|---|---|
| S1 | −42.181 | −0.004 | −1.784 × $10^{-7}$ | −5.900 × $10^{-10}$ | 1.521 × $10^{-12}$ | −1.947 × $10^{-15}$ |
| S4 | −67.600 | −0.596 | −5.942 × $10^{-8}$ | −2.302 × $10^{-11}$ | 3.611 × $10^{-14}$ | −1.850 × $10^{-17}$ |

Embodiment 3 raises a decenter tolerance to ±201 μm and a curvature tolerance to ±0.645% to the first surface S1 of the first lens L1. The decenter tolerance of embodiment 3 is about five times larger than the conventional tolerance (±40 μm). The curvature tolerance (±0.645%) is ten times as wide as the prior tolerance (±0.066%). The large tolerances enhance the feasibility of production of the lens system.

Embodiment 4 (Allotment of ±0.2 mm Errors to Thickness and to Interval)

The examples described hitherto have allotted decenter errors and curvature errors. Embodiment 4 here employs lens thickness errors and lens interval errors. The merit function here includes the contribution from the states of lens thickness errors and interval errors. A set of optimum parameters is calculated by minimizing the integrated merit function.

Embodiment 4 contains six error-allotted states $S_1$, $S_2$, $S_3$, $S_4$, $S_5$ and $S_6$. $S_1$ and $S_2$ are the states allotting −0.2 mm error and +0.2 mm error to the thickness of the first lens. $S_3$ and $S_4$ are the states allotting −0.2 mm error and +0.2 mm error to the interval between the first lens and the second lens. $S_5$ and $S_6$ are the states allotting −0.2 mm error and +0.2 mm error to the thickness of the second lens. States $S_1$, $S_2$, . . . and $S_6$ make merit functions $E_1$, $E_2$, . . . and $E_6$. A set of optimum parameters are calculated by minimizing the integrated merit function $E=E_0+E_1+E_2+E_3+E_4+E_5+E_6+E_L+E_C$. Tables 9 and 10 denote the panametons of the lens system in embodiment 4.

TABLE 9

SPHERICAL LENS PARAMETERS (EMBODIMENT 4)

| Lens No. | Surface No. | Curvature radius (mm) | Thickness, intervals (mm) | Refractive index |
|---|---|---|---|---|
| L1 | S1 | Table 10 | 4.331 | 2.403 |
|    | S2 | −83.277 | 4.868 |  |
| L2 | S3 | −313.919 | 13.173 | 2.403 |
|    | S4 | Table 10 | 164.591 |  |

TABLE 10

ASPHERICAL LENS PARAMETERS (EMBODIMENT 4)

| Surface No. | 1/c (mm) | k | $\alpha_2$ | $\alpha_3$ | $\alpha_4$ | $\alpha_5$ |
|---|---|---|---|---|---|---|
| S1 | −37.641 | −0.075 | −5.120 × $10^{-7}$ | 4.102 × $10^{-10}$ | −1.307 × $10^{-13}$ | −5.366 × $10^{-16}$ |
| S4 | −56.159 | −0.489 | −4.947 × $10^{-7}$ | 1.217 × $10^{-10}$ | −2.974 × $10^{-14}$ | 1.304 × $10^{-18}$ |

Minimization of only $E_0$ ($S_0$ without allotted errors) yields ±0.08 mm tolerances to the thicknesses and the interval. However, embodiment 4 including six error allotted states realizes ±0.23 mm tolerances to the lens thicknesses and the lens interval. The tolerance (±0.23 mm) increases about three times.

Embodiment 5 (Allotment of ±0.02 Refractive Index Errors)

The lens system of FIG. 18 adopts lenses L1 and L2 made from ZnSe, infrared material. The refractive index of ZnSe is usually 2.403. But sometimes the refractive index may fluctuate to a small extent. Therefore, embodiment 5 now produces ±0.02 errors in the refractive index of the ZnSe lenses. Since two lenses form the f-θ lens system, allotment of the refractive index fluctuations produces four error-allotted states $S_1$, $S_2$, $S_3$ and $S_4$. $S_1$ is a state providing the first ZnSe lens +0.02 refractive index fluctuation. $S_2$ is a state allocating −0.02 refractive index fluctuation to the first lens. $S_3$ is a state assigning +0.02 refractive index fluctuation to the second ZnSe lens. $S_4$ is a state allocating −0.02 refractive index fluctuation to the second lens. $S_0$ is the state without refractive index fluctuation. These five states $S_j$ have five merit functions $E_j$ (j=0, 1, 2, . . . , 5). The five merit functions $E_j$ establish an integrated merit function $E=E_0+E_1+E_2+E_3+E_4+E_L+E_C$ together with the f-θ merit function $E_L$ and other restriction merit function $E_C$. Minimizing the integrated merit function produces a set of optimum parameters which are shown in Table 11 and Table 12.

TABLE 11

SPHERICAL LENS PARAMETERS (EMBODIMENT 5)

| Lens No. | Surface No. | Curvature radius (mm) | Thickness, Intervals (mm) | Refractive index |
|---|---|---|---|---|
| L1 | S1 | Table 12 | 4.511 | 2.403 |
|  | S2 | −61.950 | 7.773 |  |
| L2 | S3 | −458.311 | 13.771 | 2.403 |
|  | S4 | Table 12 | 161.354 |  |

TABLE 12

ASPHERICAL LENS PARAMETERS (EMBODIMENT 5)

| Surface No. | 1/c (mm) | k | $\alpha_2$ | $\alpha_3$ | $\alpha_4$ | $\alpha_5$ |
|---|---|---|---|---|---|---|
| S1 | −37.381 | −0.080 | 4.417 × $10^{-7}$ | 3.431 × $10^{-10}$ | 8.272 × $10^{-15}$ | 7.625 × $10^{-17}$ |
| S4 | −71.995 | −1.055 | 8.115 × $10^{-8}$ | 3.323 × $10^{-12}$ | −7.892 × $10^{-15}$ | 3.582 × $10^{-19}$ |

When a conventional way determines parameters by minimizing only $E_0$, the parameters produce a ±0.00782 tolerance to the refractive index of the lenses. On the contrary, the parameters borne by minimizing $E=E_0+E_1+E_2+E_3+E_4+E_L+E_C$ yield the refractive index ±0.0115. The tolerance is increased by nearly 50% by embodiment 5.

Embodiment 6 (Allotment of ±0.2 mm Thickness/ interval Errors and +10 Minutes Tilt Errors)

Embodiment 4 had the lens thickness errors and the interval errors. In addition to embodiment 4, embodiment 6 includes ±10 minutes tilt errors. Embodiment 4 has raised the tolerance of lens thickness and the lens interval but has decreased the tolerance of tilt error to ±10.7 minutes from prior ±3.8 minutes. Thus embodiment 6 aims at increasing the tolerances of thickness, the interval and the tilt error at the same time.

Figure 14:
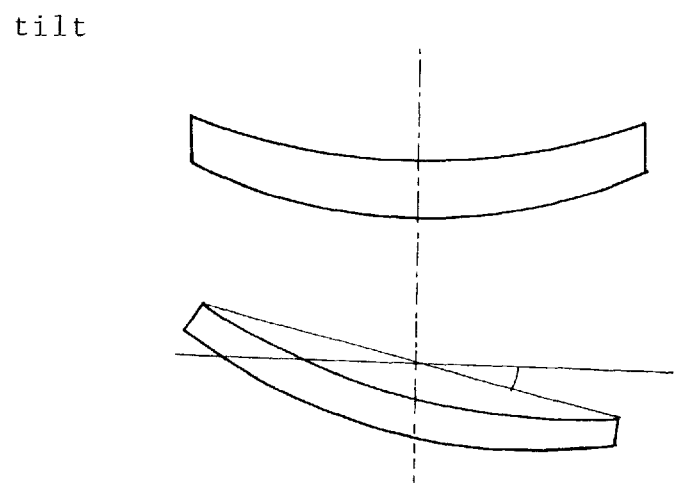
FIG. 14($a$) is a simplified section of two lens system for explaining the definition of "tilt error" which means the relative inclination of two lenses.
Figure 14:
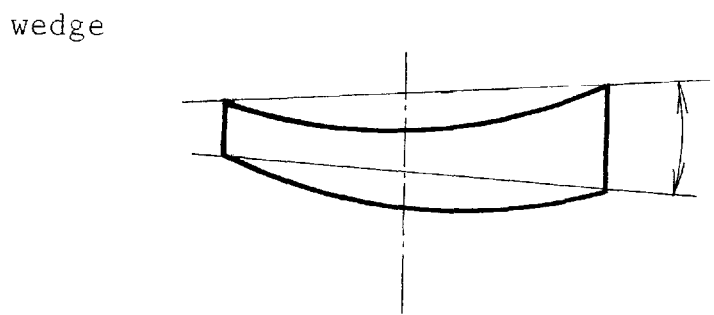

FIG. 14(a) shows a tilt error. Two lenses are not exactly in parallel but are inclined relative to each other. The tilt angle is now assumed to be 10 minutes (0.167 degree; 1 degree=60 minutes). Ten error-allotted states appear in this case. The six error allotted states $S_1$ to $S_6$ are the same for embodiment 4. $S_1$ and $S_2$ are the states having −0.2 mm and +0.2 mm errors in the thickness of the first lens. $S_3$ and $S_4$ are the states having −0.2 mm and +0.2 mm errors in the interval between the lenses. $S_5$ and $S_6$ are the states having −0.2 mm and +0.2 mm errors in the thickness of the second lens.

$S_7$ is a state applying +10 minutes of the tilt error to the first lens. $S_8$ is a state having the first lens including −10 minutes of a tilt error. $S_9$ is a state allotting +10 minute of the tilt error to the second lens. $S_{10}$ is a state allotting −10 minutes of the tilt error to the second lens. Merit functions $E_1, E_2, \ldots , E_{10}$ correspond to the states $S_1, S_2, \ldots , S_{10}$.

Embodiment 6 here determines a set of optimum parameters by minimizing the integrated merit function $E=E_0+E_1+E_2+ \ldots +E_8+E_9+E_{10}+E_L+E_C$. Tables 13 and 14 show the values of the parameters obtained by minimizing E.

TABLE 13

SPHERICAL LENS PARAMETERS (EMBODIMENT 6)

| Lens No. | Surface No. | Curvature radius (mm) | Thickness, intervals (mm) | Refractive index |
|---|---|---|---|---|
| L1 | S1 | Table 14 | 4.459 | 2.403 |
|  | S2 | −71.751 | 6.249 |  |
| L2 | S3 | −314.932 | 13.189 | 2.403 |
|  | S4 | Table 14 | 163.439 |  |

TABLE 14

ASPHERICAL LENS PARAMETERS (EMBODIMENT 6)

| Surface No. | 1/c (mm) | k | $\alpha_2$ | $\alpha_3$ | $\alpha_4$ | $\alpha_5$ |
|---|---|---|---|---|---|---|
| S1 | −37.873 | 0.064 | 2.449 × $10^{-7}$ | 2.461 × $10^{-10}$ | 7.303 × $10^{-13}$ | −8.252 × $10^{-16}$ |
| S4 | −61.758 | −0.514 | 8.815 × $10^{-8}$ | 4.215 × $10^{-11}$ | 2.604 × $10^{-15}$ | −8.652 × $10^{-18}$ |

When the parameters are calculated by embodiment 4 which minimizes $E=E_0+E_1+E_2+E_3+E_4+E_5+E_6+E_L+E_C$ (without $E_7+E_8+E_9+E_{10}$), the parameters produce a ±3.8 minute tilt tolerance. On the contrary, embodiment 6 allots an ±8.1 minute tilt tolerance, since the states having tilt errors from the beginning are taken into account in embodiment 6. The tilt tolerance rises by about twice. The tolerances of the lens thickness and the lens interval are ±0.25 mm. The large tolerances decrease the difficulty of manufacturing the two lens f-θ system.

Embodiment 7 (Allotment of +5 Minute Wedge Error)

FIG. 14(b) shows the definition of the wedge error. The wedge error means the wedge distortion of the surfaces of the lens. The inclination between the front surface and the rear surface is the wedge angle. Embodiment 7 assigns ±5 minute wedge errors to the second lens of the system of FIG. 18.

$S_1$ is a state allotting −5 minutes wedge error. $S_2$ is a state allocating +5 minute wedge error. The integrated merit function is given by $E=E_0+E_1+E_2+E_L+E_C$. The parameters are calculated by minimizing the integrated merit function. The optical parameters are listed in Tables 15 and 16.

TABLE 15

SPHERICAL LENS PARAMETERS (EMBODIMENT 7)

| Lens No. | Surface No. | Curvature radius (mm) | Thickness, intervals (mm) | Refractive index |
|---|---|---|---|---|
| L1 | S1 | Table 16 | 3.500 | 2.403 |
|  | S2 | −49.165 | 8.444 |  |
| L2 | S3 | infinity | 9.976 | 2.403 |
|  | S4 | Table 16 | 157.701 |  |

TABLE 16

ASPHERICAL LENS PARAMETERS (EMBODIMENT 7)

| Surface No. | 1/c (mm) | k | $\alpha_2$ | $\alpha_3$ | $\alpha_4$ | $\alpha_5$ |
|---|---|---|---|---|---|---|
| S1 | −31.575 | −0.257 | $1.359 \times 10^{-6}$ | $7.887 \times 10^{-10}$ | $-2.193 \times 10^{-13}$ | $3.206 \times 10^{-16}$ |
| S4 | −79.449 | −1.711 | $6.460 \times 10^{-7}$ | $-1.534 \times 10^{-10}$ | $1.126 \times 10^{-14}$ | $3.109 \times 10^{-19}$ |

The tolerance of wedge error is ±2.7 minutes in embodiment 7. However, the tolerance of the wedge error is ±1.9 minute, when a conventional method determines the parameters by minimizing only $E_0$ (merit function of the non-error allotted state). The present invention can increase the wedge error tolerance by 0.8 minute in this case.

Embodiment 8 (Allotment of Non-uniformity of Refractive Index)

The refractive index of the lenses has been assumed to be uniform hitherto. Homogeneity does not always hold in ZnSe lenses. Embodiment 5 allotted ±0.02 error to the refractive index as a whole. However, sometimes the refractive index fluctuates in lenses spot by spot. Here, the problem is spatial non-uniformity of the refractive index. Embodiment 8 takes inhomogeneity of refractive index into account. In the f-θ lens system of FIG. 18, embodiment 8 assumes that the second lens L2 has spatial fluctuation of refractive index given by $$n = n_0 + Ar^2 + Br^4, \quad (r = (x^2 + y^2)^{1/2}) \tag{30}$$

In the case of ZnSe lenses, $n_0 = 2.403$. $S_0$ is a state without fluctuation of refractive index. $S_1$ is an inhomogeneous state allotting spatial fluctuation of refractive index represented by $A = +5 \times 10^{-7}$ and $B = -4 \times 10^{-10}$. $S_2$ is another inhomogeneous state allotting spatial fluctuation of refractive index of $A = -5 \times 10^{-7}$ and $B = +4 \times 10^{-10}$. A conventional method which minimizes only $E_0$ of $S_0$ gave a very small inhomogeneity tolerance of ±0.0000193. Instead, embodiment 8 determines parameters by minimizing the integrated merit function $E = E_0 + E_1 + E_2 + E_L + E_C$. Tables 17 and 18 show the values of the parameters.

TABLE 17

SPHERICAL LENS PARAMETERS (EMBODIMENT 8)

| Lens No. | Surface No. | Curvature radius (mm) | Thickness, intervals (mm) | Refractive index |
|---|---|---|---|---|
| L1 | S1 | Table 18 | 3.500 | 2.403 |
|  | S2 | −51.409 | 6.817 |  |
| L2 | S3 | infinity | 10.251 | 2.403 |
|  | S4 | Table 18 | 157.629 |  |

TABLE 18

ASPHERICAL LENS PARAMETERS (EMBODIMENT 8)

| Surface No. | 1/c (mm) | k | $\alpha_2$ | $\alpha_3$ | $\alpha_4$ | $\alpha_5$ |
|---|---|---|---|---|---|---|
| S1 | −31.225 | −0.217 | $1.870 \times 10^{-6}$ | $1.242 \times 10^{-9}$ | $-1.490 \times 10^{-13}$ | $3.946 \times 10^{-16}$ |
| S4 | −73.378 | −2.088 | $6.560 \times 10^{-7}$ | $-1.582 \times 10^{-10}$ | $2.090 \times 10^{-15}$ | $1.325 \times 10^{-18}$ |

Embodiment 8 improves the tolerance of the inhomogeneity of refractive index up to ±0.0000267. The tolerance is raised by 40% by the present invention.

Embodiment 9 (Aspherical Lens)

Figure 17:
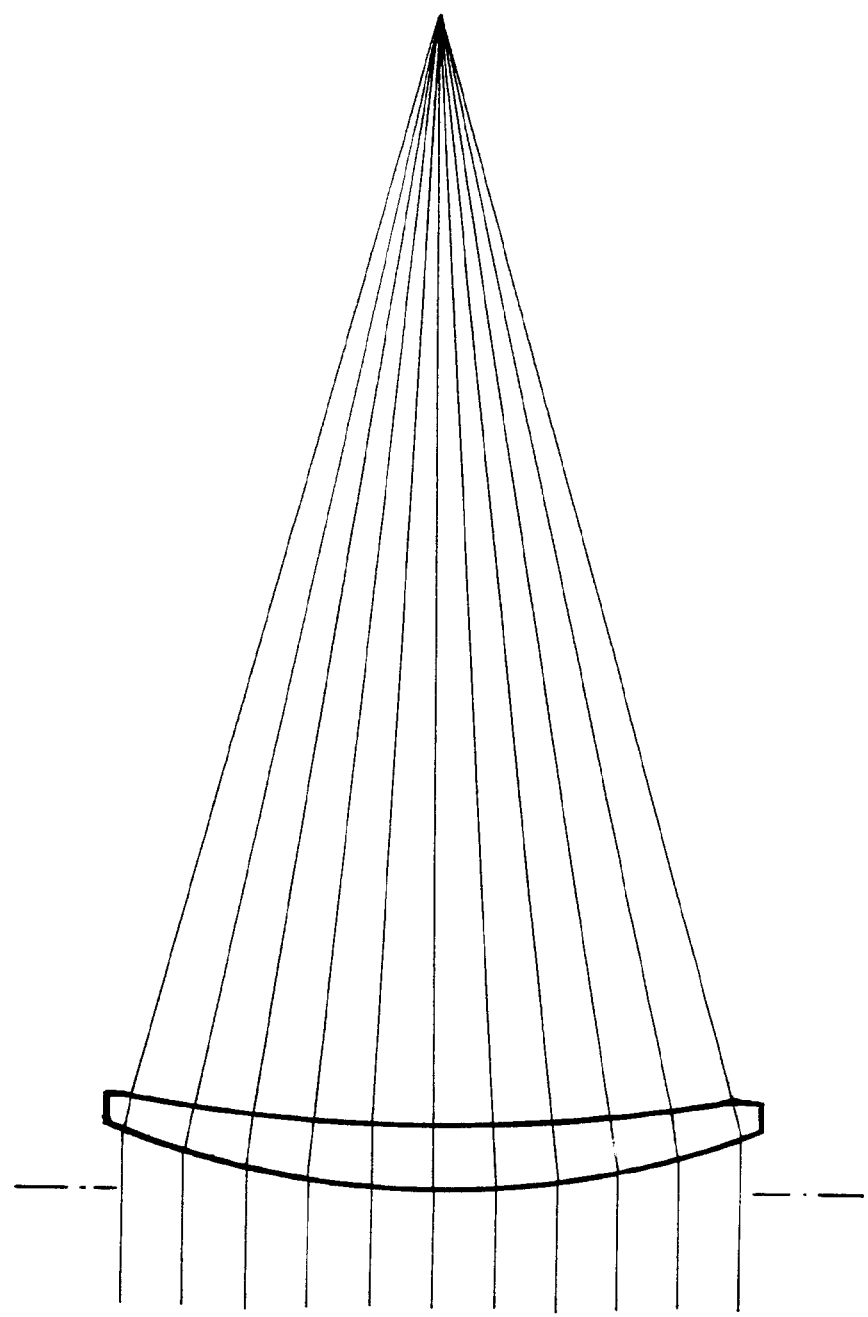
FIG. 17 is a simplified section of an aspherical lens which has an aspherical convex first surface and a spherical concave second surface for converging parallel beams at a point.

Embodiments 1 to 8 relate to the design of the f-θ lens. Embodiment 9 adopts a single aspherical lens for allotting errors to parameters different from embodiments 1 to 8. FIG. 17 shows the object aspherical lens.

(A) Initial Condition of Lens

Number of lens: 1

Material: ZnSe (refractive index n=2.403)

First surface: aspherical convex surface

Second surface: spherical concave surface

Wavelength: 10.6 μm

Entrance pupil diameter: φ50.8 mm

Incident angle: 0 degree (orthogonal incidence)

Namely, the lens is made from zinc selenide (ZnSe). The first surface is an aspherical convexity and the second surface is a spherical concavity. An infrared parallel beam of 10.6 μm enter the lens in a vertical direction.

(B) Selection of Variables

Optical parameters which define the lens are a curvature radius of the first surface of the lens, a curvature radius of the second surface of the lens, aspherical coefficients(k, $\alpha_1$, $\alpha_2$, $\alpha_3$, $\alpha_4$), a lens thickness and an image position. Those parameters are selected as variables.

(C) Restrictions focal length f=95.25 mm lens thickness 3 mm≦t≦12 mm

Figure 15:
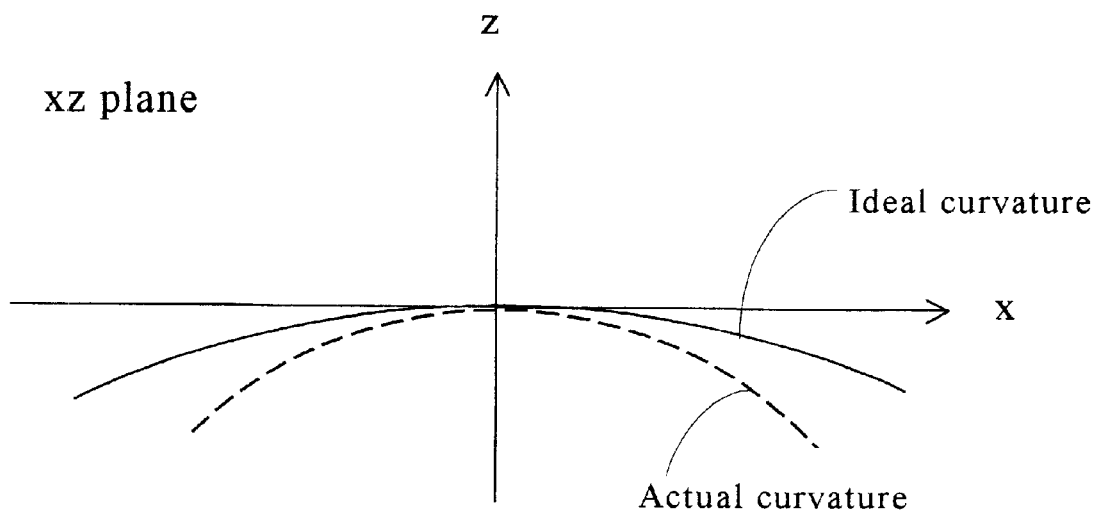
FIG. 15($a$) is sections of a lens surface showing the cylindrical deviation of the surface in xz-plane. A solid line is an ideal curve of the lens surface. A dotted line is an actual curve. The actual lens curve deviates from the ideal one in x-direction.
Figure 15:
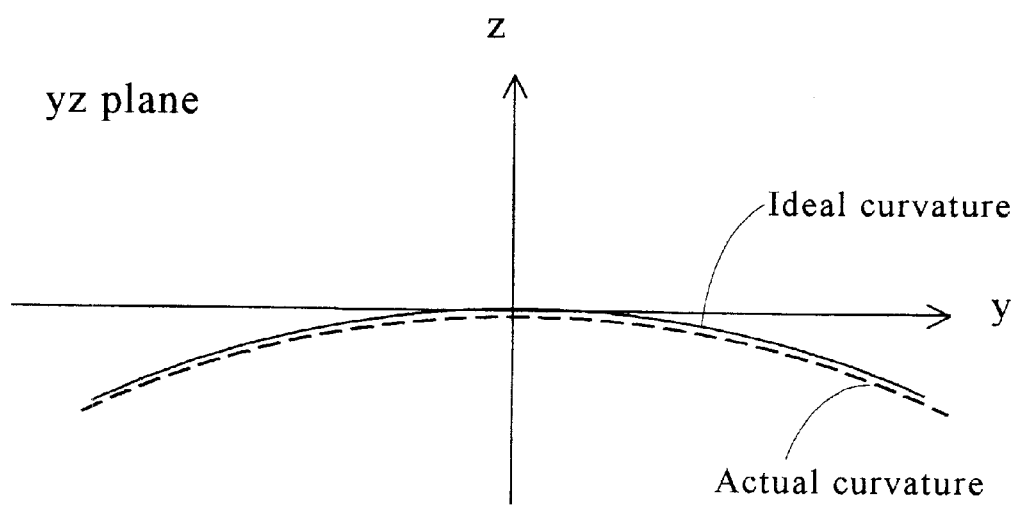
Figure 16:
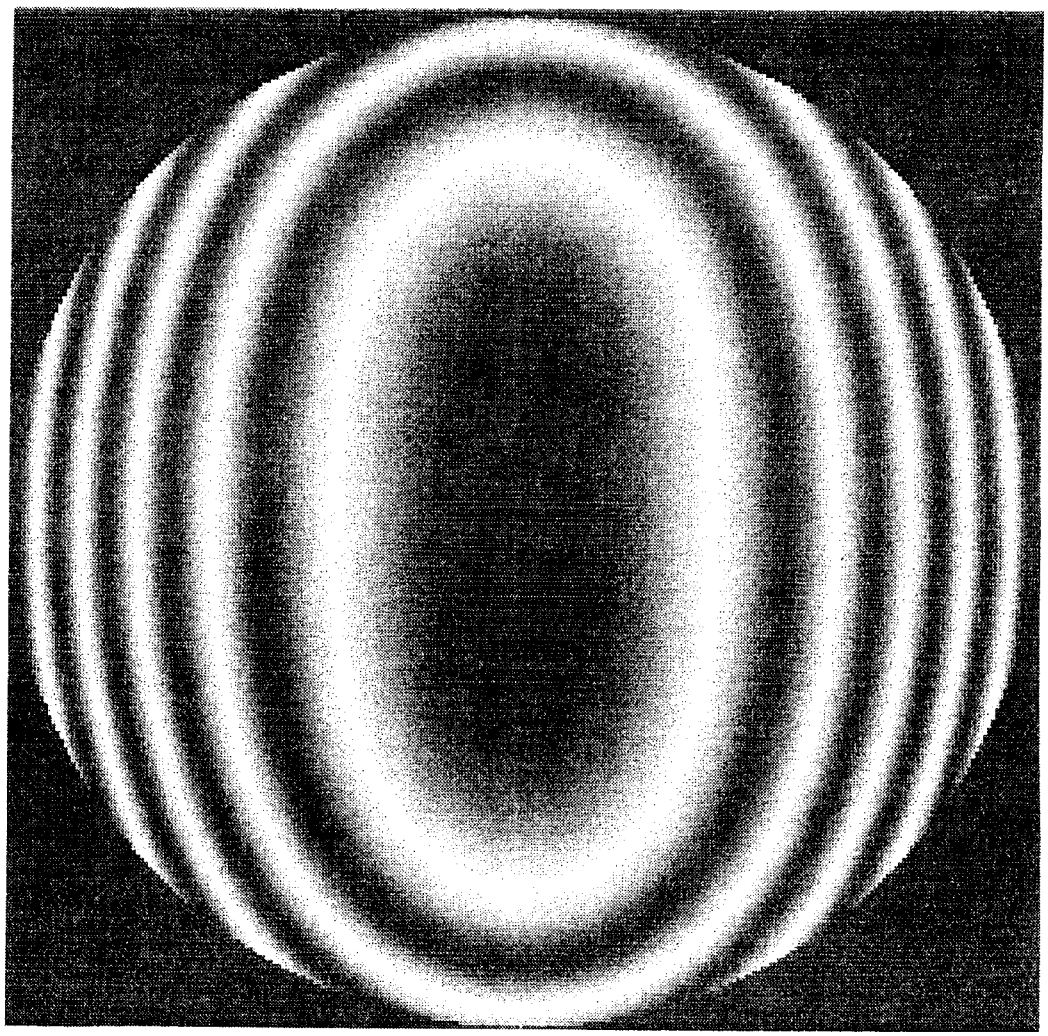
FIG. 16 is a photograph of interference fringes borne by irradiating the lens with x-direction curve deviation as shown in FIG. 15($a$) with a He—Ne laser ($\lambda$=0.633 $\mu$m).

Here, the error which the merit function takes into account is fringe irregularity. Fringe irregularity means the deviation of the lens surface from the ideal curved surface. The fringes irregularity can be measured by a He—Ne laser of a wavelength of 0.633 μm and an interferometer. A curved surface of a lens makes interference fringes by an irradiation of laser light. Fringe interval corresponds to a distance of a half wavelength of the light. Surface irregularity induces fluctuation of the interference fringes. The extent of the irregularity can be known by the number of the interference fringes. For example, the lens surface irregularity shown by FIGS. 15(a) and (b) is assumed. The curvatures are different in the x-direction and y-direction, where the lens-axis coincides with the z-axis. The y-direction curvature of the actual lens is equal to the ideal curvature. But the x-direction curvature is larger than the ideal curvature. Namely, cylindrical irregularity occurs on the surface of the lens. By irradiating the He—Ne laser, the interferometer measures the interference fringes. FIG. 16 shows the interference fringes. The number of fringes is different in the x-direction (horizontal direction) and in the y-direction (vertical direction). This difference is caused by cylindrical deformation, which can be expressed by difference between the numbers of the fringes in the x-direction and the y-direction.

First, the lens parameters, aspherical lens coefficients, are determined by minimizing only the non-error allotted merit function according to prior method. The set of parameters based upon the prior method is listed in Table 19 and Table 20.

TABLE 19

LENS PARAMETERS OF FIG. 17 (PRIOR ART METHOD)

| Lens No. | Surface No. | Curvature radius (mm) | Thickness, intervals (mm) | Refractive index |
|---|---|---|---|---|
| L1 | S1 | Table 20 | 5.518 | 2.403 |
|  | S2 | 184.565 | 91.359 |  |

TABLE 20

ASPHERICAL COEFFICIENTS OF FIG. 17 (PRIOR ART METHOD)

| Surface No. | 1/c (mm) | k | $\alpha_2$ | $\alpha_3$ | $\alpha_4$ | $\alpha_5$ |
|---|---|---|---|---|---|---|
| S1 | 78.854 | −0.637 | 9.892 × $10^{-8}$ | 2.658 × $10^{-11}$ | −5.060 × $10^{-14}$ | 4.251 × $10^{-17}$ |

±2.97 of fringes irregularity tolerance is given by the parameters which minimize the prior art merit function $E_0$ including only the non-error allotted state $S_0$.

Embodiment 9 assumes two irregularity allotted states $S_1$ and $S_2$ which have a deformed surface yielding ±5 interference fringe irregularities for the He—Ne laser inteferometer. The integrated function E is made by adding the two merit function. Minimizing the integrated merit function $E=E_0+E_1+E_2+Ec$ produces a set of optimum parameters. The parameters are listed in Table 21 and Table 22.

TABLE 21

LENS PARAMETERS OF FIG. 17 (EMBODIMENT 9)

| Lens No. | Surface No. | Curvature radius (mm) | Thickness, intervals (mm) | Refractive index |
|---|---|---|---|---|
| L1 | S1 | Table 22 | 5.519 | 2.403 |
|  | S2 | 157.562 | 91.092 |  |

TABLE 22

ASPHERICAL COEFFICIENTS OF FIG. 17 (EMBODIMENT 9)

| Surface No. | 1/c (mm) | k | $\alpha_2$ | $\alpha_3$ | $\alpha_4$ | $\alpha_5$ |
|---|---|---|---|---|---|---|
| S1 | 73.777 | −0.692 | 1.584 × $10^{-7}$ | −9.697 × $10^{-11}$ | 3.263 × $10^{-13}$ | −2.681 × $10^{-16}$ |

Embodiment 9 heightens the fringe irregularities tolerance up to ±4.67 interference fringes. This invention improves the fringe irregularities tolerance by 60% in this example. Examples of designing DOEs will be explained on the basis of the present invention together with that of prior art method for comparison. The first example of a DOE is a seven branch-oriented diffraction element for making seven diffraction spots (7×1 spot array generator). At first, common restrictions are explained.

(A) Restrictions

Diffraction Optical Element (DOE)

Object; One-dimensionally aligned seven equi-parted, parallel bright spots (7×1 spot array generation)

Step number; binary phase steps (0 or $\pi$)

Cell size; 16 $\mu$m×16 $\mu$m

Unit size; 128 cells×128 cells (2.048 mm×2.048 mm)

One-dimensional period; $\Lambda$=2.048 mm (=1 unit size)

Material; ZnSe substrate (n=2.403 for $CO_2$ laser light)

Light source $CO_2$ laser; $\pi$=10.6 $\mu$m parallel beams (nearly plane wave)

Lens

Focal Length; f=200 mm.

Under the restrictions, the interval d between the nearest order diffracted spots on the image plane is $$d=\lambda f/\Lambda=1.035 \text{ mm}. \tag{31}$$

The example aims at making one-dimensional seven equi-parted bright spots on an image plane. When laser light irradiates the DOE, the laser light is diffracted and converged at seven aligned spots on an image plane. Seven spots are made on the image plane by the diffraction. Seven spots are not formed on the DOE itself. The diffracted image is different from the DOE. The image pattern should not be confused with the DOE pattern. The binary phases steps mean that the phase differences between the waves passing different cells of the DOE are 0 or $\pi$. The DOE is a square board having equivalent M×M units. All the units have the same structure. Thus, the problem is reduced to determining of the phase distribution within a unit.

One unit is a square of 128 cells×128 cells. The size of a unit is 16 $\mu$m×16 $\mu$m. Every cell should be allocated with a phase 0 or $\pi$. The phase differences are realized by the height (or thickness) differences of cells. Consisting of 16384 cells, a unit is a square of 2.048 mm×2.048 mm of an area of 4.194304 $mm^2$. The size of a unit is not the total size of a DOE. A DOE has a wide aperture by arraying a plurality of units as a matrix (M×M). A beam can have a still larger diameter than the diameter of a unit. The period of the phase distribution is 2.048 mm which is selected for equalizing to the seize of a unit. The pattern on the DOE is a repetition of lengthwise and crosswise aligning units. The period of the DOE pattern is equal to the size of the unit.

This example chooses a ZnSe crystal substrate as the DOE substrate. The lens is also made from ZnSe. The diffraction light is the 10.6 $\mu$m light of a $CO_2$ laser. Zinc selenide (ZnSe) is transparent to the 10.6 $\mu$m light of the $CO_2$ laser. Without the lens, the diffraction grating produces diffraction fringes in the near field in the directions of angles $\theta$ which contents Bragg's condition $\Lambda \sin \theta = n\lambda$. $\Lambda$ is a period of the diffraction grating and "n" is an integer which is called a diffraction order. But this example uses a lens. The lens converges diffraction fringes to spots on the image plane which is positioned at the focus of the lens. Making seven linear equivalent spots on the image plane is the purpose of the DOE of the example.

(B) Variables

Even if the DOE includes a plurality of units, the units are equivalent in the phase distribution. Variables are the phases of 128 cells×128 cells contained in a unit. The number of variables is 128×128=16384 in general. When the object diffraction is two-dimensional, the design should treat all the 16384 variables. Even the simplest binary phase case includes $2^{16384}$ sets of variables. This example, however, tries to treat one-dimensional diffraction for making seven parallel diffraction spots. The direction of the diffraction is denoted as the x-direction and the optical axis is defined as the z-axis. The cells aligning in the y-direction have a common phase. Variables are 128 cells aligning in the x-direction. This example adopts the binary phase. The number of sets of variables is only $2^{128}$.

(C) Another Restrictions None (D) Allotment of Errors

0 MODE . . . NO ERROR=PRIOR ART

1 MODE . . . HEIGHT ERROR=EMBODIMENT 10

2 MODE . . . WIDTH ERROR EMBODIMENT 11

Prior art design (0 MODE) starts from a non-error state $S_0$ and a non-error merit function $E_0$. The prior art seeks a suitable solution by repeating the steps of assuming temporary values for variables, calculating a merit function, changing the values of variables, calculateing the merit function, comparing the current merit function with the previous one and accepting the change when the merit function decreases or rejecting the change when the merit function does not decrease.

The present invention includes error-allotted merit functions ($E_1$, $E_2$, . . . ) of error-allotted states ($S_1$, $S_2$, . . . ) in which some errors have been a priori allotted into parameters. Embodiment 10 assumes step height error-allotted states. Embodiment 11 assumes height fluctuation error-allotted states.

(E) Merit Function

The example takes the following merit function.

$$E = w_1 \frac{1}{N}(\eta_{obj} - \eta)^2 + w_2 \sum_{(p,q) \in s} (I_{av} - I_{pq})^2 + w_3 N \max_{(p,q) \notin s}(I_{pq}^2) \quad (32)$$

The first term is a square of the deviation of the diffraction efficiency $\eta$ from the objective efficiency $\eta_{obj}$. As the efficiency approaches the objective, the merit function decreases. The second term is the intensity fluctuation of signal light $I_{pq}$ from the average $I_{av}$. The second term adopts only the (p,q) cells within the signal region S (seven cells in the example). Smaller intensity fluctuation of signals brings about a smaller merit function. The third term assumes the maximum of squares of the intensity of the rest of cells out of the signal region. The objective of the noise is 0. But in an actual case, the light is diffracted also to the outside of the signal regions. This example assumes the maximum of noise intensity in cells outside of the signal regions. Since the third term assumes the maximum, the number N of cells is multiplied by the maximum. The maximum can be replaced by an average or a sum of the noise intensity.

The merit function is composed of the terms for guiding the diffraction efficiency to the objective, equalizing the seven signal intensities and suppressing noise. Relative weights $w_1$, $w_2$, $w_3$ can be arbitrarily determined. Here, $w_1=w_2=w_3=w=1$. The merit function is minimized by changing variables for seeking a solution.

0 Mode: Prior Art Design (Allotting No Error)

Figure 34:
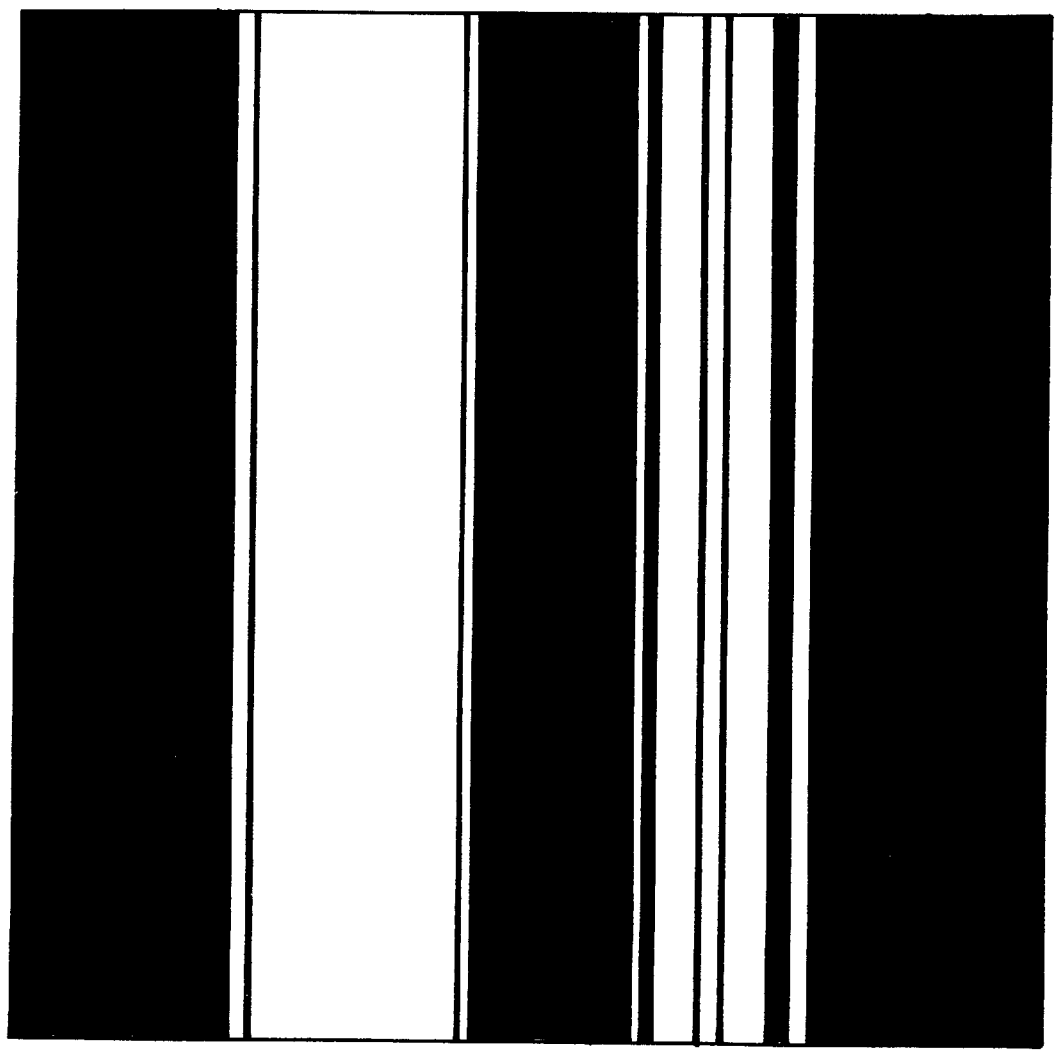
FIG. 34 is a phase (step height) pattern of a DOE unit consisting of 128 cells×128 cells designed by prior art without allotting errors for diffracting a plane wave into seven equiparted, equivalent parallel spots on an image plane. Black regions denote assemblies of the cells of phase $\pi$. Blank regions denote assemblies of the cells of phase 0.

The merit function without allotting errors is optimized by the DBS method. A unit pattern of FIG. 34 is the solution. Since the object is one-dimensional pattern, the DOE pattern is also one-dimensional. Phases are common to the cells aligning in y-direction (vertical direction in FIG. 34). The phases change in x-direction (horizontal direction). Black denotes phase 0. Blank denotes phase $\pi$. FIG. 34 shows a unit of 128 cells×128 cells (2.048 mm×2.048 mm). A pertinent set of units having the same phase distribution is the DOE pattern designed by prior art.

Figure 35:
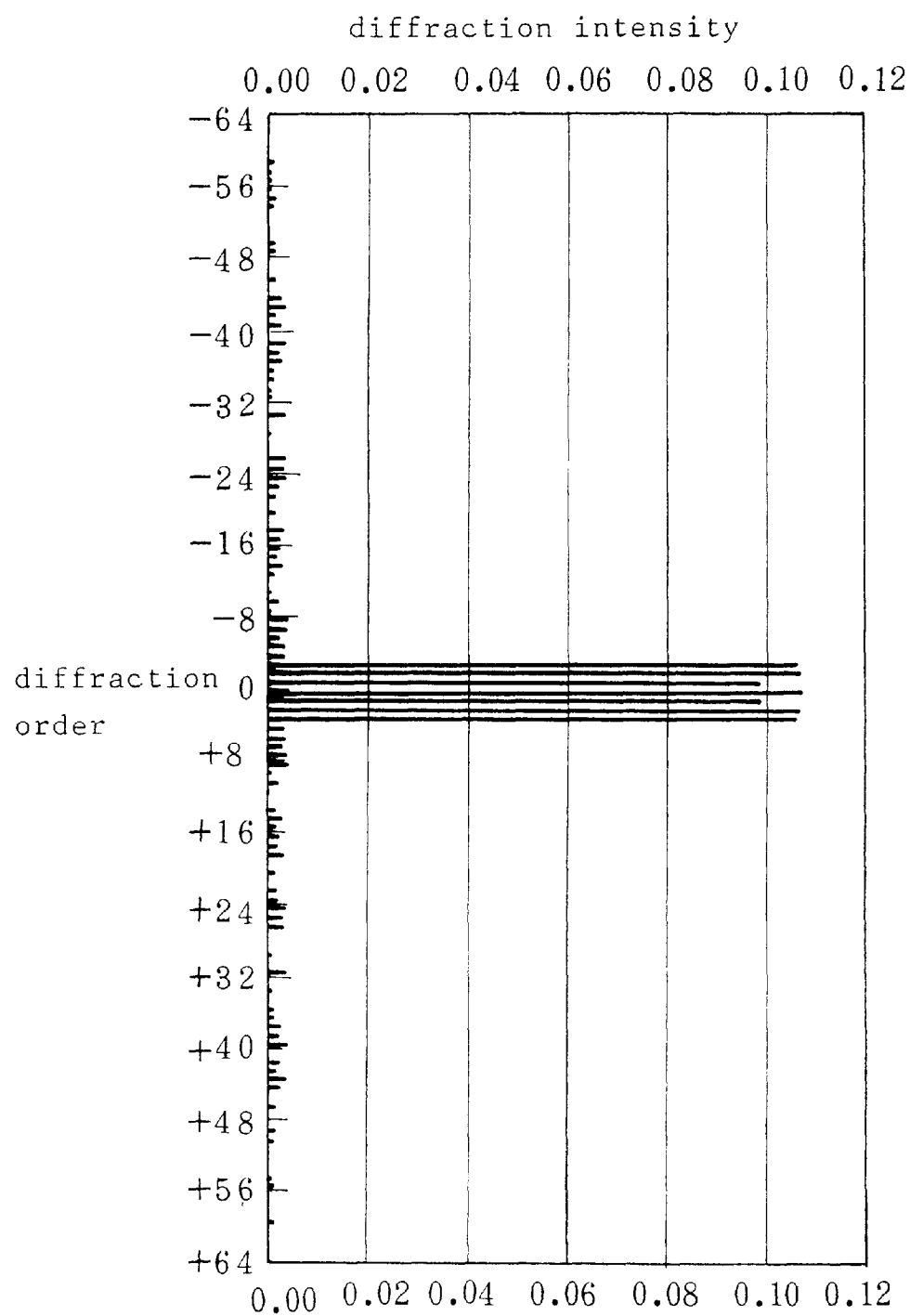
FIG. 35 is a graph of the distribution of the diffraction powers from the −64th order to the +64th order by the DOE having the units of FIG. 34 designed by prior art. The abscissa is the diffraction intensity. The ordinate is the diffraction order.

FIG. 35 shows diffraction intensity distributed to diffraction orders by the DOE (FIG. 34) designed by prior art. The diffraction order is the integer "n" in Bragg's relation $\Lambda \sin \theta = n\lambda$. The ordinate is the diffraction orders from the −64th order to the +64th order. The abscissa is the normalized diffraction intensities of each order. The purpose of the example DOE is to produce seven equivalent intensity peaks of the 0-th order, the ±1st order, ±2nd orders and ±3th orders and to leave the rest in darkness on the image plane.

In FIG. 35, seven diffraction spots have stronger intensities than the rest (noise). Among the seven, ±1st diffraction intensities are weaker than the other five diffraction intensities. 0th order, ±2nd order and ±3rd order diffractions are equal. The intensity fluctuation is 3.6%. The diffraction efficiency is a ratio of the sum of seven diffracted energy to the whole incidence light energy. The objective $\eta_{obj}$ is 75%. The efficiency $\eta$ of the DOE designed by the prior art is 73.2%. An ideal DOE could annihilate higher order diffraction than ±3rd orders. The DOE allows higher orders of diffraction. Some diffraction appears between the ±4th orders and ±8th orders. Weak diffraction occurs near ±16th orders, ±24th orders and ±40th orders. These diffractions are noise. The noise intensity is 4.5% of the average intensity of signals in the prior art designed DOE.

These are ideal properties on calculation of the DOE designed by the prior art method. In practice, it is impossible to produce DOEs having the parameters (heights, width, side angles) of the exact, calculated values. Production errors, e.g., step height errors, height fluctuation errors and so on, accompany manufactured DOEs. The production errors degrade the performance to be lower than the designed one. How much do the errors decrease the performance of the prior-art designed DOE? At first, the influence of the step height error is considered among the step height error and the step width error, the side slanting error in FIG. 31 and FIG. 33.

The example has two kinds of heights of steps. All the phase $\pi$ steps are assumed to have height errors of 2, 4, 6, 8 and 10%. These are commonly-given errors. The phase errors are equivalent to the height errors, since the height difference is $\lambda/2(n-1)$ for $\pi$. Giving a 2% error to the height error means to change the height to be $1.02\lambda/2(n-1)$.

Figure 36:
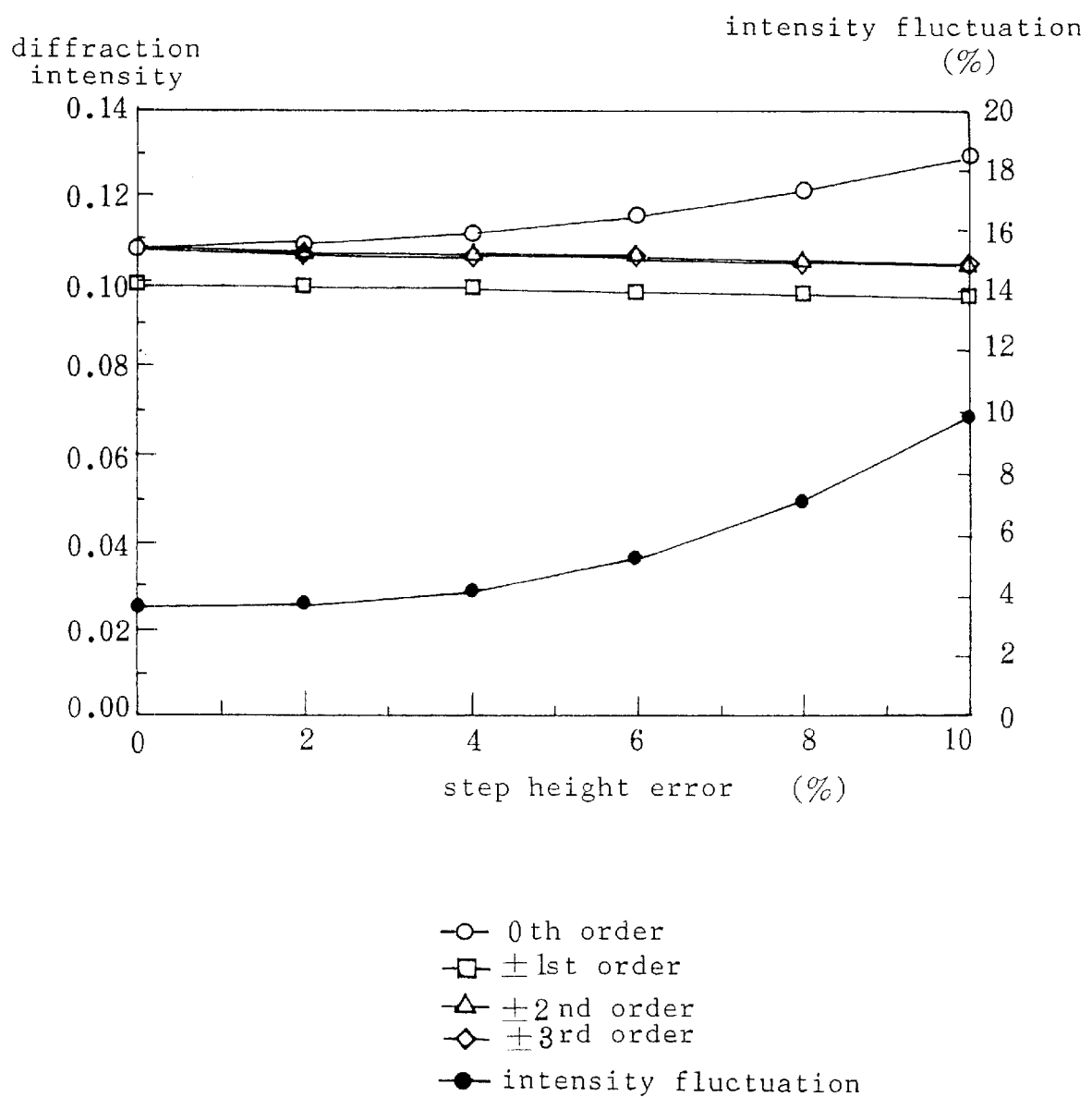
FIG. 36 is a graph of the power fluctuation of the seven signal spots and the diffraction intensities of seven signal spots of the DOE designed by prior art as function of the step height errors of 2, 4, 6, 8 and 10%. The abscissa is the step height error (%). The left ordinate is the diffraction intensity. The right ordinate is the intensity fluctuation (%).

The variations of the 0th order, the ±1st order, the ±2nd order and the ±3rd order diffraction intensities are calculated for errors 2%, 4%, 6%, 8% and 10% of step heights. FIG. 36 shows the result of the calculation. The abscissa is the step height errors (2% to 10%). The left ordinate is the diffraction intensity. The right ordinate is the intensity fluctuation. An increment of the step height error raises the 0th diffraction intensity. The other order diffraction intensities decrease. The intensity fluctuation of the seven diffraction signal spots rises from 3.6% (0 error) to 7% at a 8% step error. A 10% step error pushes the intensity fluctuation up to 10%. This result means that the prior art design is suffering from small tolerance of height errors.

Figure 37:
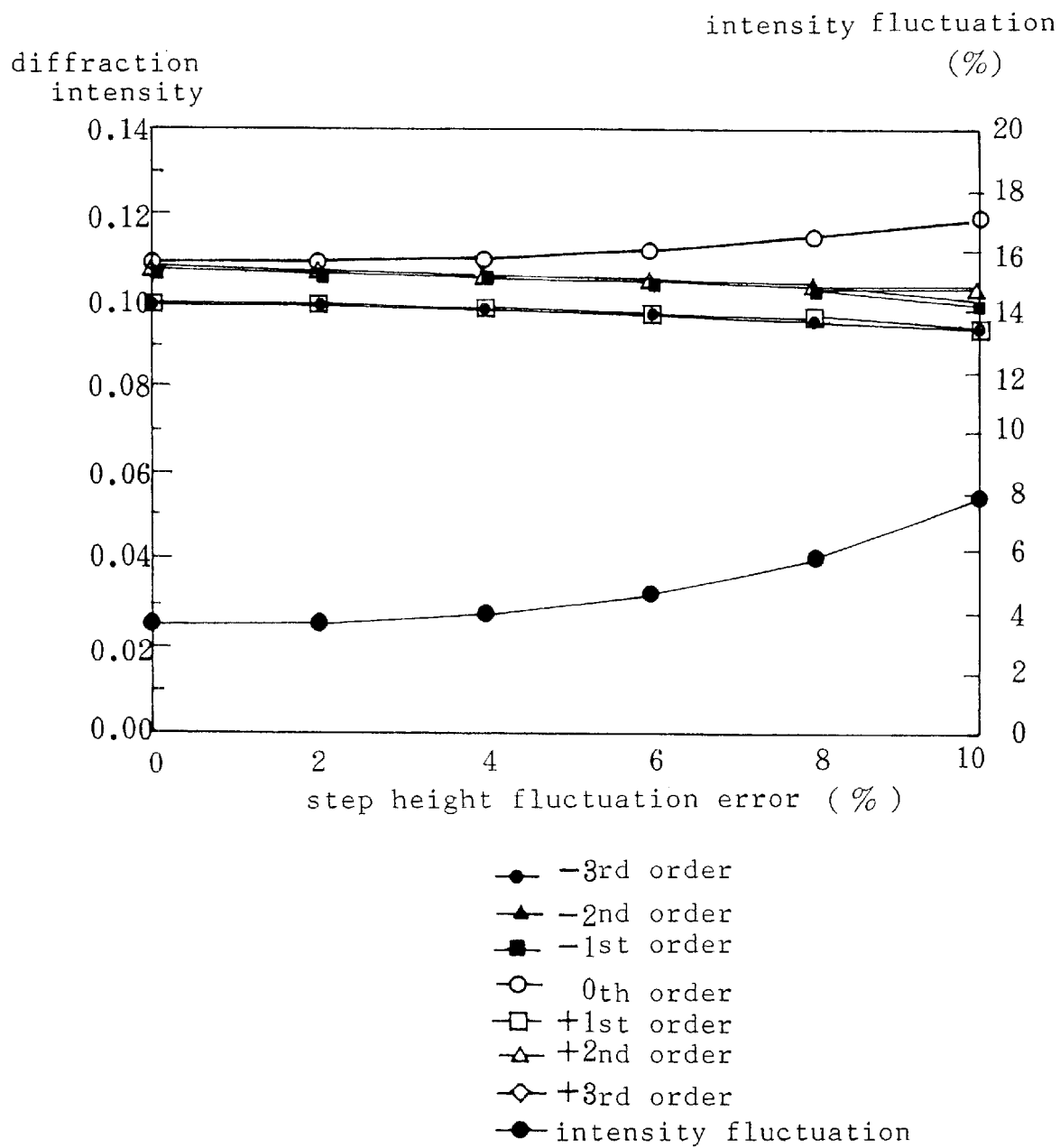
FIG. 37 is a graph of the intensity fluctuation of the seven signal spots and the diffraction intensities of seven signal spots of the DOE designed by prior art as function of the height fluctuation errors of 2, 4, 6, 8 and 10%. The abscissa is the step height fluctuation error (%). The left ordinate is the diffraction intensity. The right ordinate is the intensity fluctuation (%).

The second problem is in the height fluctuation error. The former height error is assigned uniformly to all the steps. Height fluctuation means that individual steps have random heights. The degree of the random distribution is defined by the standard deviation $\sigma$ of heights of the steps. Seven diffraction intensities and the intensity fluctuation are calculated under the height fluctuation of 2, 4, 6, 8 and 10% in standard deviations. FIG. 37 denotes the result. The abscissa is the standard deviation $\sigma$ of the height fluctuation. The right hand ordinate is the intensity fluctuation among seven signal diffraction lines. The left hand ordinate is the diffraction intensities of the seven lines. An increase in height fluctuation enhances the 0th order diffraction but lowers the other higher order diffractions. The step height fluctuation raises the intensity fluctuation. Without the height fluctuation, the intensity fluctuation is 3.6%. 6% of height fluctuation produces a 4.4% intensity fluctuation. 10% of height fluctuation raises the intensity fluctuation to 8%. This result signifies that the prior art design is suffering also from low allowability for the step height fluctuation. The prior art design turns out to be weak both against height errors and height fluctuation errors.

Embodiment 10 (Allotting ±10% Step Height Errors)

Embodiment 10 takes account of a state $S_1$ allotted with a +10% height error, a state $S_2$ allotted with a −10% height error in addition to the non-error state $S_0$. $E_0$ is a merit function of $S_0$. $E_1$ is a merit function of $S_1$, and $E_2$ is a merit function of $S_2$. The present invention seeks preferable parameters by assuming error-allotted states, adding the error-allotted merit functions to the non-error merit function, producing an integrated merit function and minimizing the integrated merit function. The integrating merit function E is defined by $$E=W_0E_0+W_1E_1+W_2E_2. \qquad (33)$$

Figure 38:
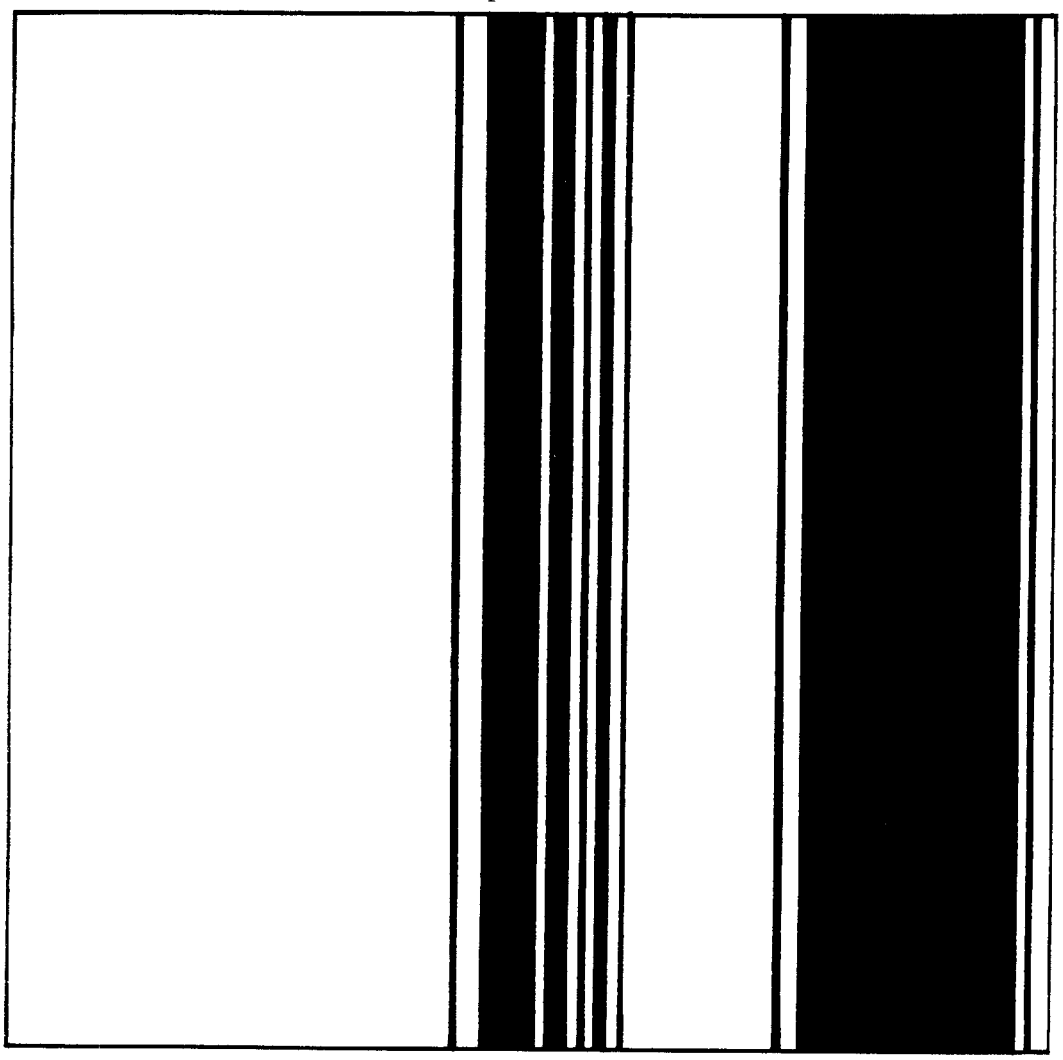
FIG. 38 is a phase (step height) pattern of a DOE unit consisting of 128 cells×128 cells designed by Embodiment 10 including the states allotting ±10% step height errors for diffracting a plane wave into seven equi-parted, equivalent parallel spots on an image plane. Black regions denote assemblies of the cells of phase 0. Blank regions denote assemblies of the cells of phase $\pi$.

Here $W_0$, $W_1$ and $W_2$ are weights for three states. Embodiment 10 takes $W_0=1$, $W_1=0.3$ and $W_2=0.3$. Minimizing the integrated merit function yields optimum values to variables. FIG. 38 is a unit pattern obtained by the optimizing calculation. Other units have all the same pattern. Surprisingly, the unit pattern of FIG. 38 is entirely different from the unit pattern of FIG. 34. Black regions prevail far over blank regions in FIG. 34 pattern (prior art). On the contrary, FIG. 38 shows another unit pattern having blank regions surpassing black regions. The unit pattern (prior art) of FIG. 34 is quite different from the unit pattern (Embodiment 10) of FIG. 38. Although two patterns have been designed for accomplishing a common object of making seven diffraction spots with the same size, the same period and the same intensity, the two are entirely different.

Figure 39:
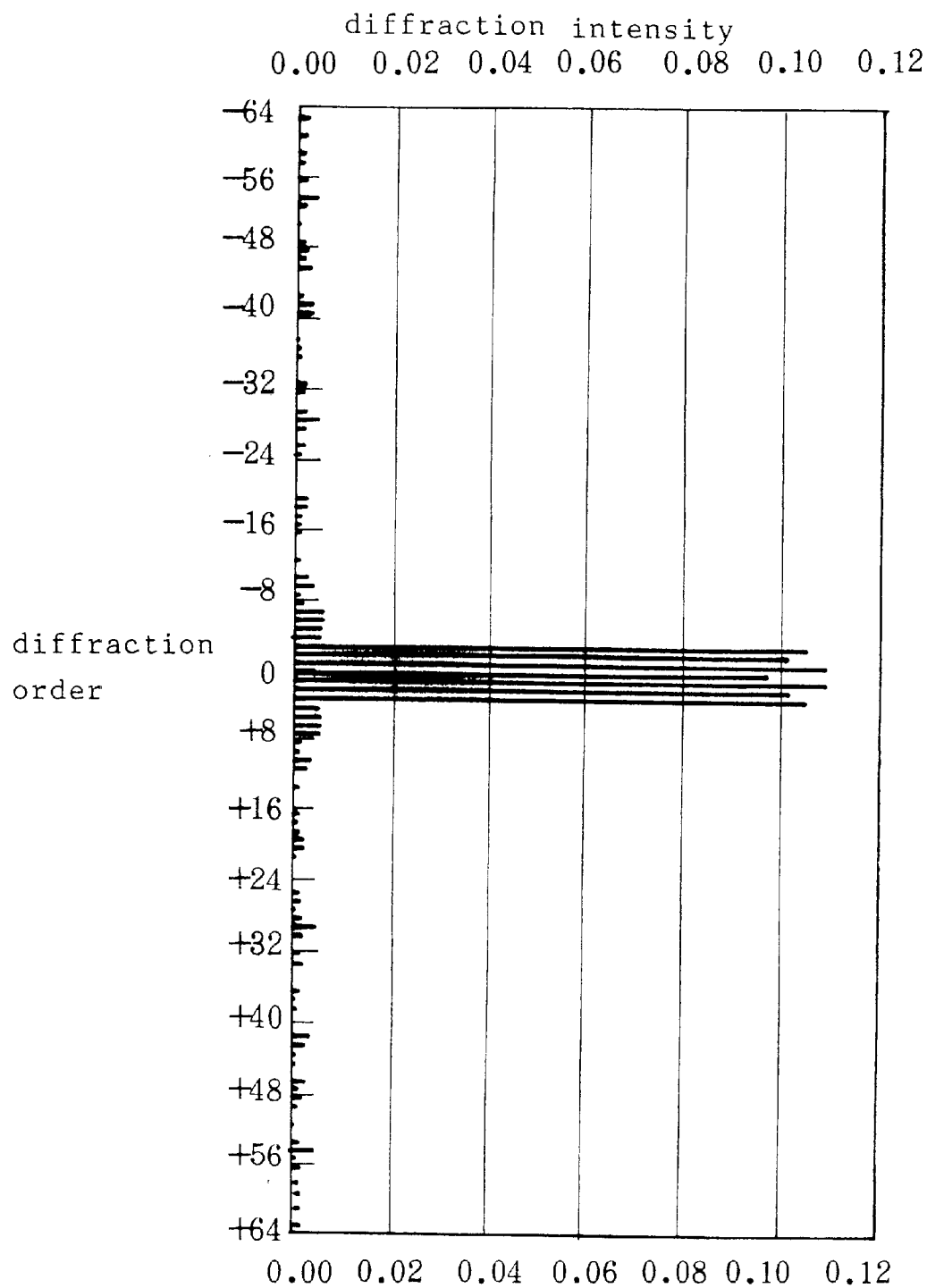
FIG. 39 is a graph of the distribution of the diffracted powers from the −64th order to the +64th order by the DOE having the units of FIG. 38 designed by Embodiment 10. The abscissa is the diffraction intensity. The ordinate is the diffraction order.

FIG. 39 shows the diffraction intensities of the −64th order to the +64th order of Embodiment 10. The 0th order, the ±1st orders, the ±2nd orders and the ±3rd orders (about 0.1) are stronger than the others. Among seven diffraction signals, the 0th order is a bit weaker than the other six signals. Embodiment 10 differs on this point from the prior art of FIG. 35. The ±1st order diffractions are the strongest. The diffraction efficiency is 73.4% which is nearly equal to 73.2% of prior art. The intensity fluctuation is 3.9% which is rather bigger than 3.6% of the prior art. Noise power is 5.7% which is larger than 4.5% of prior art. In particular, eight noise spots between the ±7th orders and the ±4th orders reveal 0.005 of diffraction. The error-free, ideal DOE designed by Embodiment 10 is inferior to the error-free ideal DOE designed by the prior art. However, production errors accompany actual DOEs. What is more important is the fact that the performance does not degrade so much in spite of production errors.

Figure 40:
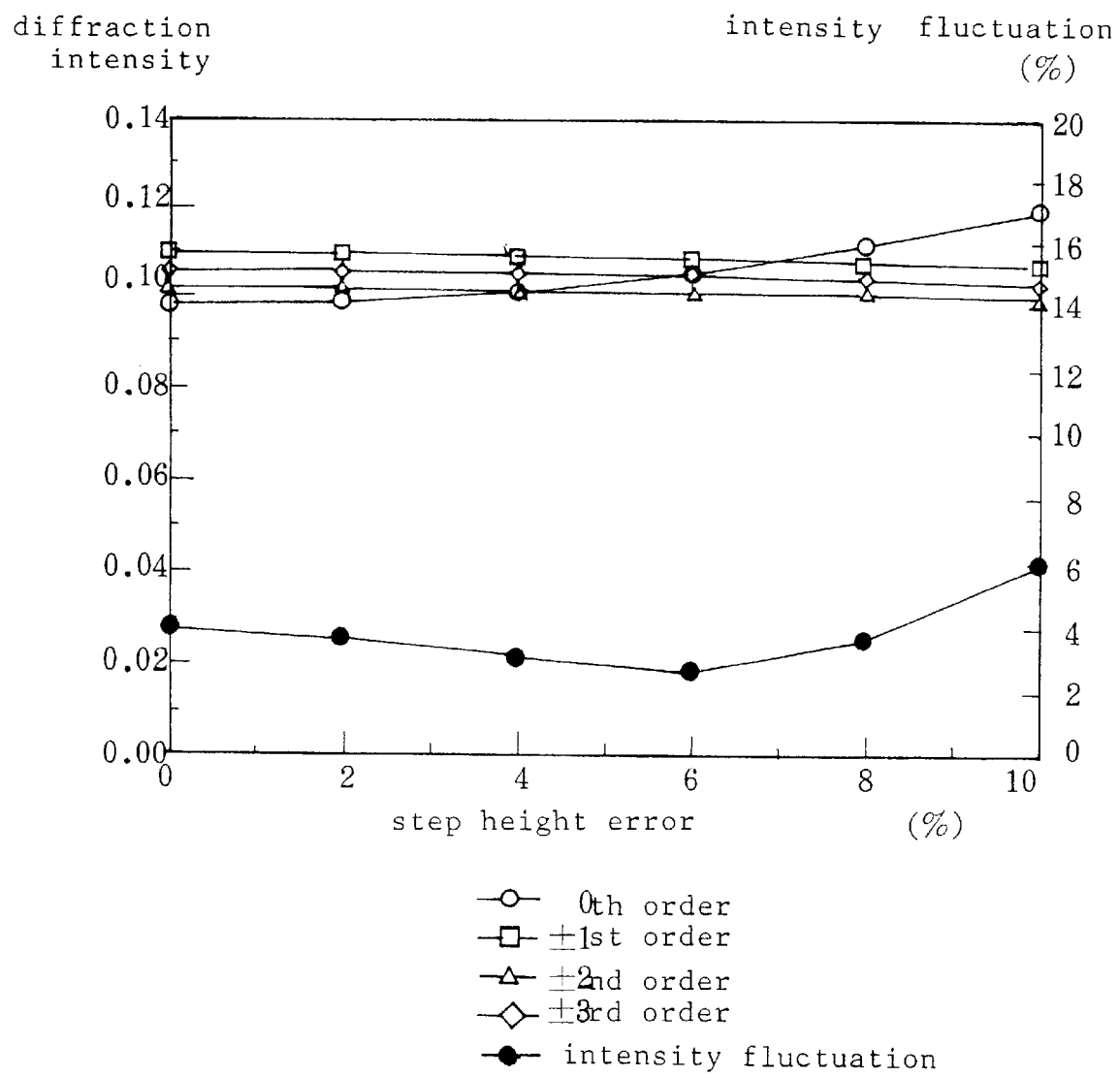
FIG. 40 is a graph of the intensity fluctuation of the seven signal lines and the diffraction intensities of seven signal lines of the DOE designed by Embodiment 10 as function of the step height errors of 2, 4, 6, 8 and 10%. The abscissa is the step height error (%). The left ordinate is the diffraction intensity. The right ordinate is the intensity fluctuation (%).

The intensity fluctuation and the diffraction intensities of the 0th, ±1st, ±2nd, ±3rd orders are calculated under the step height errors of 2, 4, 6, 8 and 10% for confirming the strength of Embodiment 10 against the production errors. FIG. 40 shows the result. The abscissa is the step height error which is assigned to all the steps uniformly. Unlike the prior art DOE, an increase of the step height error decreases the intensity fluctuation. 6% of height error yields a 2.8% intensity fluctuation. An 8% height error brings about a 3.6% intensity fluctuation. Both are smaller than 3.9% of the non-height error.

The decline of the intensity fluctuation originates from the low initial 0th diffraction. The initial 0th diffraction is less than 0.1 which is smaller than other order signal diffractions. An increase of the step height error raises the 0th order diffraction. Since the initial 0th order is the smallest among seven signal diffractions, an increase of the step height error raises the 0th order up to the average of the other six signals. An approach of the 0th order to the average suppresses the intensity fluctuation among the seven signals. In fact, a 6% height error equalizes the 0th order with the ±3rd orders. The intensity fluctuation assumes the minimum 2.8% at the 6% height error. The intensity fluctuation is a measure of performance. 2% to 8% step height error induces no rise of the intensity fluctuation above 3.9% at the 0% height error. Effectively, the tolerance of the step height is raised. Embodiment 10 has an advantage of high resistance against height errors.

Embodiment 11 (Allotting 5%, 10% Height Fluctuation Errors)

Embodiment 10 introduced uniform step height errors to error-allotted states. Embodiment 11 allots height fluctuation errors. $S_0$ is non-error state without height fluctuation. $S_1$ is a state allotted with 5% height fluctuation error which means that the heights of steps are dispersed at random but the standard deviation of the height distribution is 5%. $S_2$ is a state allotted with 10% height fluctuation error. The fluctuation is positive. A negative error cannot be allotted in the case of fluctuation unlike the height error. $E_0$, $E_1$ and $E_2$ are the merit functions of the states $S_0$. $S_1$ and $S_2$. The integrated merit function E is given by $$E=W_0E_0+W_1E_1+W_2E_2 \qquad (34)$$

Figure 41:
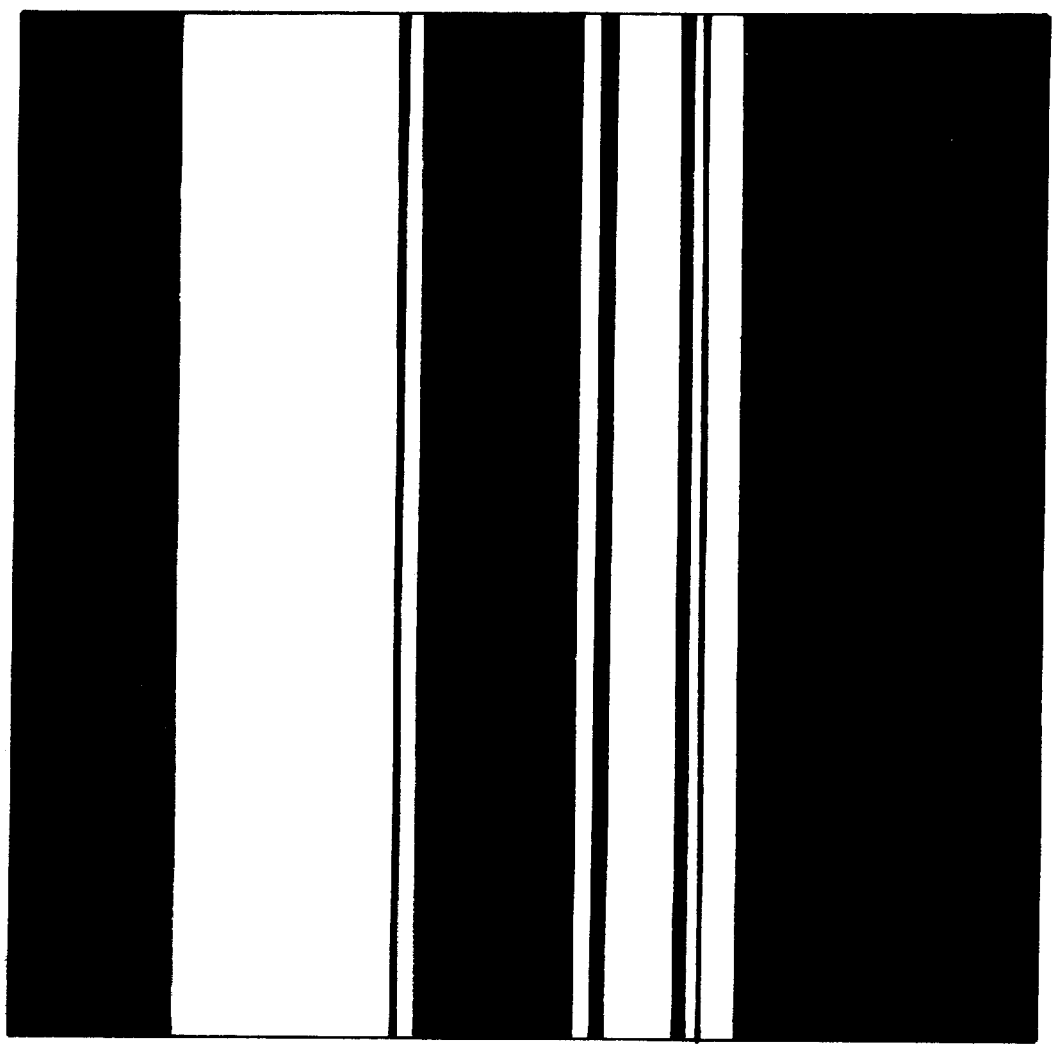
FIG. 41 is a phase (step height) pattern of a DOE unit consisting of 128 cells×128 cells designed by Embodiment 11 including the states allotting 5% and 10% height fluctuation errors for diffracting a plane wave into seven equi-parted, equivalent parallel lines on an image plane. Black regions denote assemblies of the cells of phase π. Blank regions denote assemblies of the cells of phase 0.

A solution, an assembly of preferable parameters, is sought by minimizing the integrated merit function by repeating the steps of altering phases, calculating the integrated merit function, comparing the new merit function with the previous one and accepting the new phase when the merit function decreases or rejecting the phase alteration when the merit function does not decrease. FIG. 41 is the unit pattern defined by the solution. The FIG. 41 unit pattern is entirely different form the FIG. 38 unit pattern of Embodiment 10. FIG. 41 rather resembles FIG. 34 of the prior art. There is a black region on the left side. A blank zone follows the black region. A middle part is occupied by a black zone which is followed by blank stripes. Another black zone exists on the right side. The pattern of FIG. 41 differs from the pattern of FIG. 34 in the blank stripes.

Figure 25:
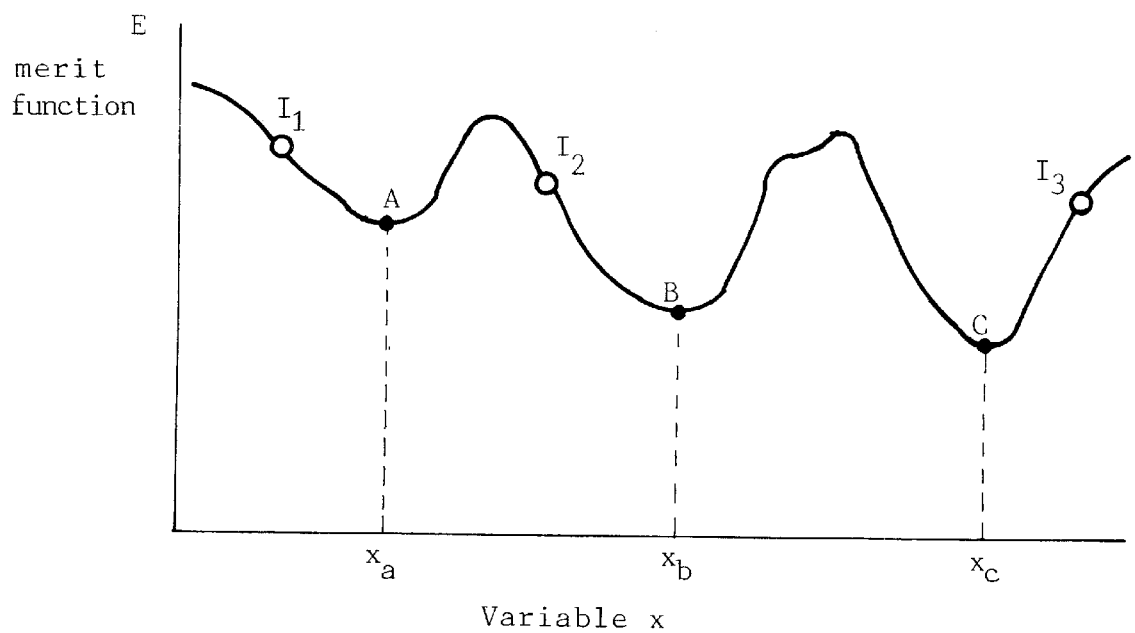
FIG. 25 is a graph of a merit function as a function of a variable x for explaining different initial values guiding the merit function to different minimums.
Figure 26:
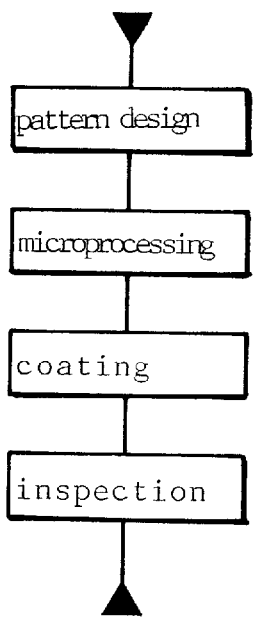
FIG. 26 is a diagram of the steps of pattern design, microprocessing, coating and inspection for producing DOEs.
Figure 27:
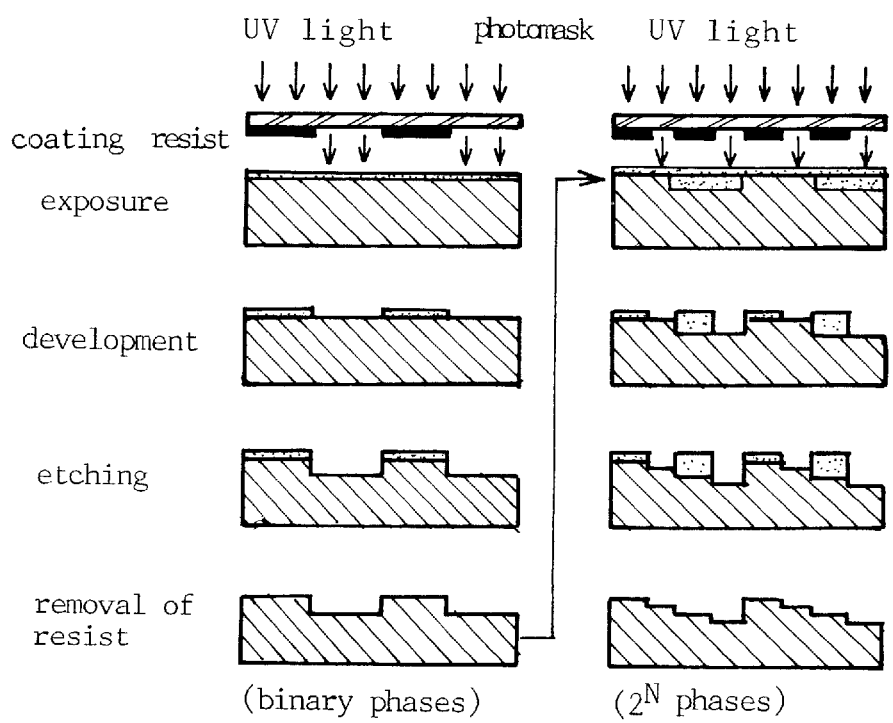
FIG. 27 is sectional views of substrates in the process of the microprocessing including photolithography.

FIG. 34, FIG. 38 and FIG. 41 aim at making the same diffraction pattern. The units of the DOEs have different patterns. The diffraction cannot be treated by the perturbation theory which presumes that a small difference between initial states will assure a small difference between final states. One reason is the nonlocalized property of the diffraction phenomenon like the Fourier transformation. Another reason is a plurality of minima of the merit function which leads the calculations starting from different initial values to different minima, as explained in FIG. 25. The minima have different unit patterns. When something small changes the merit function curve slightly, the next deepest minimum will fall to the deepest minimum. The change of minima may realize a drastic change of the unit pattern.

Figure 42:
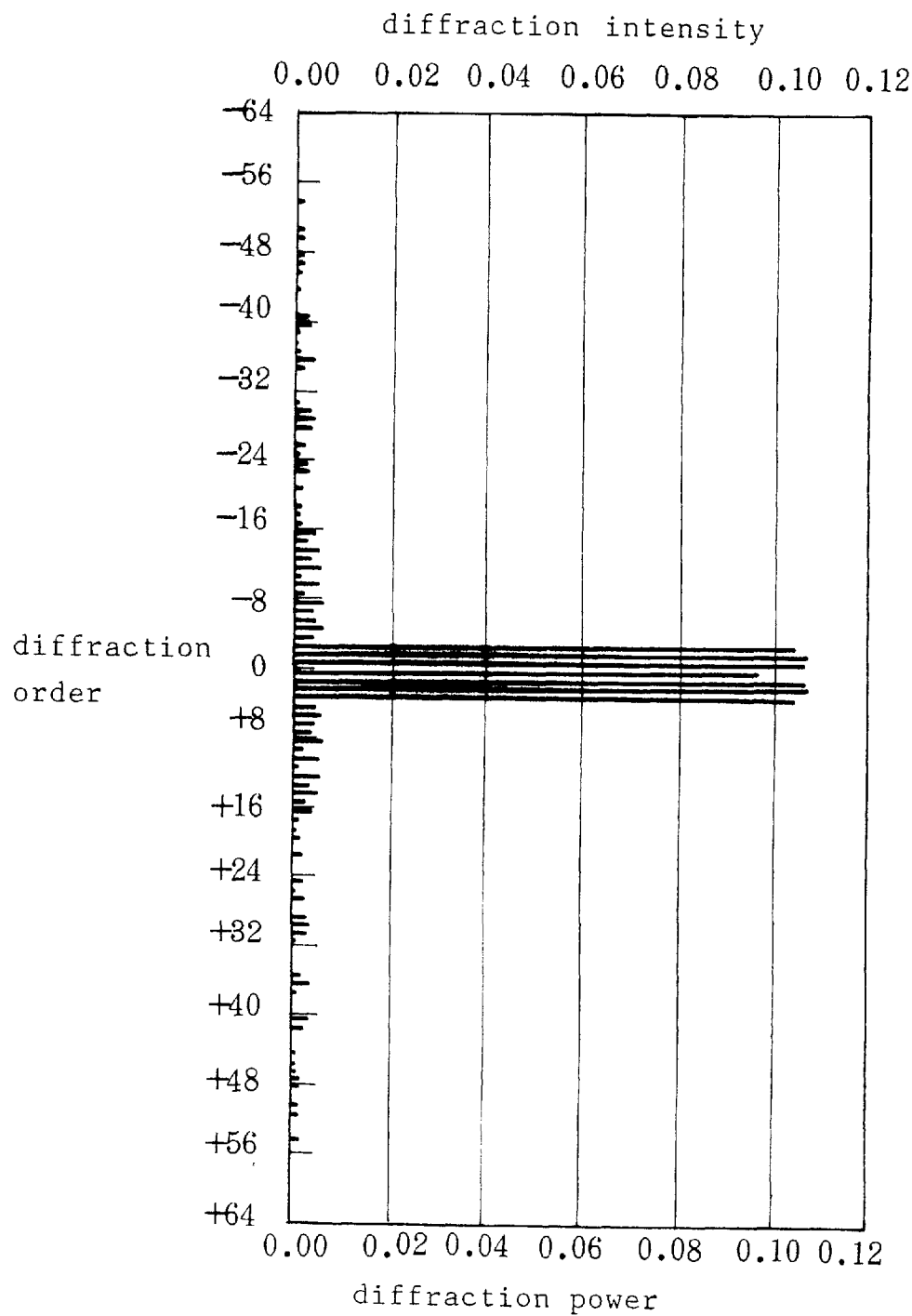
FIG. 42 is a graph of the distribution of the diffracted intensities from the −64th order to the +64th order by the DOE having the units of FIG. 41 designed by Embodiment 11. The abscissa is the diffraction intensity. The ordinate is the diffraction order.
Figure 43:
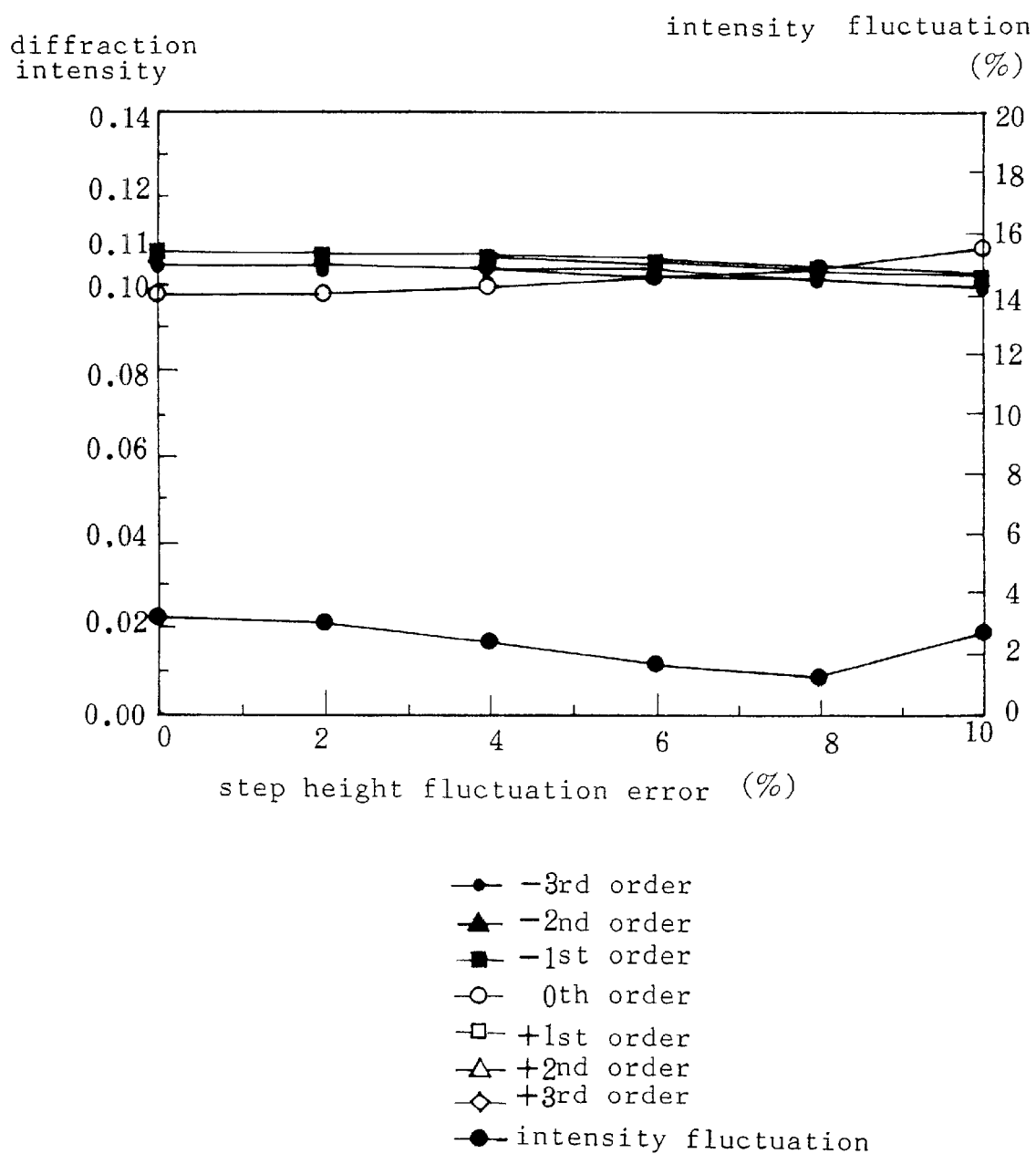
FIG. 43 is a graph of the intensity fluctuation of the seven signal spots and the diffraction intensities of seven signal spots of the DOE designed by Embodiment 11 as function of the step height fluctuation errors of 2, 4, 6, 8 and 10%. The abscissa is the height fluctuation error (%). The left ordinate is the diffraction intensity. The right ordinate is the intensity fluctuation (%).

FIG. 42 shows the diffraction intensities ranging from the −64th order to the +64th order. The 0th diffraction being less than 0.1 is the smallest among the seven signal diffractions. The ±2nd and the ±1st order diffractions are a bit stronger than the ±3rd order diffractions. Noise from the ±4th orders to the ±15th orders is not negligible. The diffraction efficiency is 73.7%. The intensity fluctuation is 3.2%. Noise power is 6.1%. Embodiment 11 (73.7%, 3.2%) is similar to prior art (73.2%, 3.6%) in the diffraction efficiency and the intensity fluctuation. But the noise (6.1%) of Embodiment 11 is larger than that (4.5%) of prior art. These are imaginary properties for an ideal DOE just designed. Production errors degrade actual DOEs. The influence of the step height fluctuation is calculated. FIG. 43 is the result of the calculation. The abscissa is the step height fluctuation(%) which is denoted by the standard deviation σ.

As mentioned before, Embodiment 11 has the weaker 0th order diffraction and the stronger ±2nd and ±1st order diffractions without errors, The step height error gradually raises the 0th order diffraction but decreases the other higher order signal diffractions more slowly. But the 0th order has been initially the lowest among the seven. An increase of the 0th order has a tendency of converging the seven signals to an average. An increment of the height fluctuation rather lowers the intensity fluctuation. 6% of height fluctuation equalizes the 0th order with the ±3rd orders and lowers the intensity fluctuation to 1.6%. 8% of height fluctuation lifts the 0th order to the ±1st and the ±2nd orders. The 8% height fluctuation brings the intensity fluctuation to the minimum of 1.2%. The intensity fluctuation will attain to the level of the non-error state at 10% height fluctuation. The fall of the intensity fluctuation between 2% and 9% height fluctuation enlarges the allowable scope of the height fluctuation errors. Namely, Embodiment 11 enjoys a large tolerance of the height fluctuation. Embodiment 11 enables manufactures to produce desirable DOEs in spite of the production error of height fluctuation.

I claim:

1. A method of designing a lens and optical system, which are required to have numerically-definable optical characteristics, by determining a set of values of optical parameters which includes curvature radius and aspheric coefficients of a surface, refractive index and dispersion of a lens material, thickness and spacing, and wedge, decenter and tilt, comprising the steps of:

defining a non-error allotted state $S_0$ of said lens and optical system, which is a state where all of said optical parameters have definite values without any predetermined errors;

defining a plurality of error-allotted states $S_1, S_2, \ldots$, each state being a state that a predetermined error is intentionally allotted to an optical parameter which has a small tolerance in comparison with actual fabrication errors, the predetermined allotted error being larger than the tolerance and one of a decenter error, a tilting error, a wedge error, a curvature error, a refractive index error, a thickness error, a non-uniform refractive index, an aspherical coefficient error and a surface distortion;

formulating a common merit function by $E=\Sigma_j \omega_j (p_j-p_{j0})^2$, where $p_j$ is a current value of the j-th optical parameter, $p_{j0}$ is a target value of the j-th optical parameter, $\omega_j$ is a weighting factor, and $\Sigma_j$ means a sum of all optical parameters $\{p_j\}$;

formulating a plurality of said merit functions $E_0=\Sigma_j \omega_j (p_j-p^0_{j0})^2$, $E_1=\Sigma_j \omega_j(p_j-p^1_{j0})^2$, $E_2=\Sigma_j \omega_j(p_j-p^2_{j0})^2$, $E_3=\Sigma_j \omega_j(p_j-p^3_{j0})^2 \ldots$ for the corresponding states $S_0, S_1, S_2, S_3, \ldots$ respectively, where $p_j$ is a current value of the j-th optical parameter, $p^k_{j0}$ is a target value of the j-th optical parameter in the k-th state, $\omega_j$ is a weighting factor common for all the states, and $\Sigma_j$ means a sum of all said optical parameters $\{p_j^k\}$ pertaining to the k-th state, wherein at least one target value of the parameters $\{p_j^k\}$ of the k-th state is different from the corresponding target value of the parameters $\{p_j^0\}$ of the non-error allotted state;

summing up all said merit functions $E_0, E_1, E_2, \ldots, E_k \ldots$ with weighting factors $w_k$ for defining an integrated merit function $E=\Sigma_k w_k E_k = w_0 E_0 + w_1 E_1 + w_2 E_2 + \ldots = \Sigma_j \omega_j(p_j-p^0_{j0})^2 + \Sigma_j (p_j-p^1_{j0})^2 + \Sigma_j \omega_j (p_j - p^2_{j0})^2 \ldots$;

changing a value of the integrated merit function by changing the values of the parameters $\{p_j\}$;

seeking a set of parameters which minimizes the integrated merit function; and obtaining the set of parameters minimizing the integrated merit function which yields an optimum solution of the parameters of designing the lens and optical system having at least one increased tolerance for some parameter which is wider than the tolerance of the parameter which is obtained by minimizing only the non-error allotted merit function $E_0=\Sigma_j \omega_j (p_j - p^0_{j0})^2$.

2. A method of designing a diffractive optical element whose surface is microstructured with an array of cells having multi-steps of heights, said element being required to have numerically-definable optical characteristics, by determining a set of values of optical parameters which includes a distribution of step heights and width of cells, side wall slant angle, refractive index and dispersion of a diffractive optical element material, thickness of a substrate, comprising the steps of:

defining a non-error allotted state $S_0$ of said diffractive optical element, which is a state where all said optical parameters have values without any predetermined errors;

defining a plurality of error-allotted states $S_1, S_2, \ldots$, each state being a state that a predetermined error is intentionally allotted to an optical parameter which has a small tolerance in comparison with actual fabrication errors, the predetermined allotted error being larger than the tolerance and one of a step height error, a step width error, a wall slanting error, a refractive index error, a thickness error and a non-uniform refractive index;

formulating a common merit function by $E=\Sigma_j \omega_j(p_j-p_{j0})^2$, where $p_j$ is a current value of the j-th optical parameter, $p_{j0}$ is a target value of the j-th optical parameter, $\omega_j$ is a weighting factor, and $\Sigma_j$ means a sum of all optical parameters $\{p_j\}$;

formulating a plurality of said merit functions $E_0=\Sigma_j \omega_j (p_j-p^0_{j0})^2$, $E_1=\Sigma_j \omega(p_j-p^1_{j0})^2$, $E_2=\Sigma_j \omega_j(p_j-p^2_{j0})^2$, $E_3 \Sigma_j \omega_j (p_j-p^3_{j0})^2 \ldots$ for the corresponding states $S_0, S_1, S_2, S_3, \ldots$ respectively, where $p_j$ is a current value of the j-th optical parameter, $p^k_{j0}$ is a target value of the j-th optical parameter in the k-th state, $\omega_j$ is a weighting factor common for all the states, and $\Sigma_j$ means a sum of all said optical parameters $\{p_j^k\}$ pertaining to the k-th state, wherein at least one target value of the parameters $\{p_j^k\}$ of the k-th state is different from the corresponding target value of the parameters $\{p_j^0\}$ of the non-error allotted state;

summing up all said merit functions $E_0, E_1, E_2, \ldots, E_k \ldots$ with weighting factors $w_k$ for defining an integrated merit function $E=\Sigma_k w_k E_k = w_0 E_0 + w_1 E_1 + w_2 E_2 + \ldots = \Sigma_j \omega_j (p_j - p_j^0 0)^2 + \Sigma_j \omega_j (p_j - p^1_{j0})^2 + \Sigma_j \omega_j (p_j - p^2_{j0})^2 \ldots$;

changing a value of the integrated merit function by changing the values of the parameters $\{p_j\}$;

seeking a set of parameters which minimizes the integrated merit function; and obtaining the set of parameters mimimizing the integrated merit function which yields an optimum solution of the parameters of designing the diffractive optical element having at least one increased tolerance for some parameter which is wider than the tolerance of the parameter which is obtained by minimizing only the non-error allotted merit function $E_0=\Sigma_j \omega_j (p_j - p^0_{j0})^2$.

3. The method as claimed in claim 2, wherein the diffractive optical element comprises the array of the cells taking $2^M$ steps of heights which yield phase differences of multiples of $\pi/2^{M-1}$ to passing light or reflected light at different cells.

4. The method as claimed in claim 3, wherein the allotted error is a common step height error which is uniformly allotted to height differences of steps.

5. The method as claimed in claim 3, wherein the allotted error is a step height fluctuation error which is randomly allotted to height differences of steps.

6. The method as claimed in claim 3, wherein the allotted error is a step width error which is uniformly allotted to the steps.

7. The method as claimed in claim 3, wherein the allotted error is a side wall slanting which is uniformly allotted to the steps.

* * * * *